US012726563B2

(12) United States Patent
Takura et al.

(10) Patent No.: US 12,726,563 B2
(45) Date of Patent: Sep. 1, 2026

(54) INFORMATION PROCESSING DEVICE, INFORMATION PROCESSING SYSTEM, AND INFORMATION PROCESSING METHOD

(71) Applicant: SONY GROUP CORPORATION, Tokyo (JP)

(72) Inventors: Kento Takura, Tokyo (JP); Kumiko So, Tokyo (JP); Fumihiko Nishio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 321 days.

(21) Appl. No.: 18/551,234

(22) PCT Filed: Jan. 24, 2022

(86) PCT No.: PCT/JP2022/002359

§ 371 (c)(1),
(2) Date: Sep. 19, 2023

(87) PCT Pub. No.: WO2022/209209

PCT Pub. Date: Oct. 6, 2022

(65) Prior Publication Data

US 2024/0171671 A1 May 23, 2024

(30) Foreign Application Priority Data

Mar. 31, 2021 (JP) ................................ 2021-061550

(51) Int. Cl.
*H04M 1/72463* (2021.01)
*H04M 1/72427* (2021.01)
*H04M 1/72454* (2021.01)

(52) U.S. Cl.
CPC . *H04M 1/724631* (2022.02); *H04M 1/72427* (2021.01); *H04M 1/72454* (2021.01)

(58) Field of Classification Search
CPC ....... H04M 1/724631; H04M 1/72427; H04M 1/72454; A63F 13/422; A63F 13/85; G06F 9/44; G06F 9/455; G06N 20/00
See application file for complete search history.

(56) References Cited

U.S. PATENT DOCUMENTS 10,279,264 B1 * 5/2019 Aghdaie ................ A63F 13/67
2013/0173513 A1 * 7/2013 Chu ........................ G06F 9/451
706/14

(Continued)

FOREIGN PATENT DOCUMENTS

JP 2015-506617 A 3/2015
JP 2017-188833 A 10/2017

OTHER PUBLICATIONS

Shin, et al., "Understanding and prediction of mobile application usage for smart phones", Proceedings of the 2012 ACM Conference on Ubiquitous Computing, Sep. 5, 2012, pp. 173-182.

(Continued)

*Primary Examiner* — Farid Seyedvosoghi
(74) *Attorney, Agent, or Firm* — CHIP LAW GROUP

(57) ABSTRACT

Provided are a device and a method for determining optimal control according to a processing state of an application being executed in an information processing device and a device state based on learning data and executing the determined processing. A control unit that controls the information processing device uses learning data to determine optimal control processing according to a processing state of an application being executed and a device state, and executes the determined processing. The learning data is learning data for each application, and the control unit determines optimal control by referring to the learning data of an application that is the same as or similar to the application being executed in the information processing (Continued)

device, and executes the determined optimal control processing. For example, screenshots and search processing are automatically executed.

20 Claims, 41 Drawing Sheets

(56) References Cited

U.S. PATENT DOCUMENTS

| | | | | |
|---|---|---|---|---|
| 2015/0355716 | A1* | 12/2015 | Balasubramanian | G06F 3/04186 345/173 |
| 2019/0009178 | A1* | 1/2019 | Nakagawa | A63F 13/35 |
| 2019/0379822 | A1* | 12/2019 | Leong | G06F 3/012 |
| 2020/0233554 | A1* | 7/2020 | Li | G06F 3/04883 |
| 2021/0241203 | A1* | 8/2021 | Kwatra | G06N 20/00 |

OTHER PUBLICATIONS

International Search Report and Written Opinion of PCT Application No. PCT/JP2022/002359, issued on Apr. 12, 2022, 09 pages of ISRWO.

* cited by examiner

GAME APPLICATION a
10 INFORMATION PROCESSING DEVICE

GAME APPLICATION b

GAME APPLICATION c

OPERATION UNIT UI EXAMPLE 1

X Game enhancer

GAME MODE

FOCUS SETTING

MENU TYPE

SEARCH

SCREENSHOT

RECORD

OPERATION UNIT UI EXAMPLE 2

INFORMATION PROCESSING DEVICE, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2022/002359 filed on Jan. 24, 2022, which claims priority benefit of Japanese Patent Application No. JP 2021-061550 filed in the Japan Patent Office on Mar. 31, 2021. Each of the above-referenced applications is hereby incorporated herein by reference in its entirety.

TECHNICAL FIELD

The present disclosure relates to an information processing device, an information processing system, an information processing method, and a program. More specifically, the present invention relates to an information processing device, an information processing system, an information processing method, and a program that realize optimal control using learning data, for example, in an execution terminal of a game application or the like.

BACKGROUND ART

In recent years, many users enjoy various game applications using information processing devices such as game terminals and smartphones.

Game applications require different user operations depending on their types, and often require complex operations.

In addition, an increasing number of users perform processing such as publishing screenshot images and moving images obtained by capturing images during a game using SNS or the like.

For example, PTL 1 (JP 2017-188833A) discloses a conventional technique related to image distribution processing.

Recently, game applications have become complicated, and various user operations are required. In many cases, it is necessary to continuously perform a plurality of operations during a game, and delays in user operations often hinder the progress of the game.

CITATION LIST

Patent Literature

[PTL 1]
JP 2017-188833A

SUMMARY

Technical Problem

The present disclosure has been made in view of the above-mentioned problems, for example, and an object thereof is to provide an information processing device, an information processing system, and an information processing method, and a program that realize optimal control using learning data in an execution terminal of a game application or the like.

Solution to Problem

A first aspect of the present disclosure provides an information processing device including: a control unit that controls the information processing device, wherein the control unit determines optimal control processing according to at least one of a processing state of an application being executed in the information processing device and a device state using learning data generated in advance, and executes the determined optimal control processing.

A second aspect of the present disclosure provides an information processing system including a user terminal for executing an application and a server for providing learning data to the user terminal, wherein the user terminal determines optimal control processing according to at least one of a processing state of an application being executed in the user terminal and a device state using learning data stored in the server, and executes the determined optimal control processing.

A third aspect of the present disclosure provides an information processing method executed in an information processing device, the method including: allowing a control unit to determine optimal control processing according to at least one of a processing state of an application being executed in the information processing device and a device state using learning data generated in advance, and execute the determined optimal control processing.

A fourth aspect of the present disclosure provides an information processing method executed in an information processing system including a user terminal for executing an application and a server for providing learning data to the user terminal, the method including: allowing the user terminal to transmit at least one of a processing state of an application being executed in the user terminal and a device state to the server; allowing the server to execute learning processing using at least one of the processing state of the application and the device state received from the user terminal to execute learning data generation processing and update processing; and allowing the user terminal to determine optimal control processing according to at least one of the processing state of an application being executed in the user terminal and the device state using learning data stored in the server, and execute the determined optimal control processing.

A fifth aspect of the present disclosure provides a program for causing an information processing device to execute information processing including: allowing a control unit to determine optimal control processing according to at least one of a processing state of an application being executed in the information processing device and a device state using learning data generated in advance, and execute the determined optimal control processing.

The program of the present disclosure is, for example, a storage medium provided in a computer-readable form or a program that can be provided by a communication medium, the storage medium or the program being provided to an information processing device or a computer system that can execute various program codes, for example. By providing such a program in a computer-readable form, processing according to the program can be realized on an information processing device or a computer system.

Still other objects, features and advantages of the present disclosure will become apparent by more detailed description on the basis of the embodiments of the present disclosure and the accompanying drawings described below. In the present specification, the system is a logical set of configurations of a plurality of devices, and the devices having each configuration are not limited to those in the same housing.

According to the configuration of an embodiment of the present disclosure, a device and a method for determining optimal control according to the processing state of an application being executed in an information processing device and the device state based on learning data and executing the determined processing are realized.

Specifically, for example, a control unit that controls the information processing device uses learning data to determine optimal control processing according to the processing state of the application being executed and the device state, and executes the determined processing. The learning data is learning data for each application, and the control unit determines optimal control by referring to the learning data of an application that is the same as or similar to the application being executed in the information processing device, and executes the determined optimal control processing. For example, screenshots and search processing are automatically executed.

By these kinds of processing, a device and a method for determining optimal control according to the processing state of an application being executed in an information processing device and the device state based on learning data and executing the determined processing are realized.

Note that the effects described in the present specification are merely exemplary and not limited, and may have additional effects.

DESCRIPTION OF EMBODIMENTS

Figure 1:
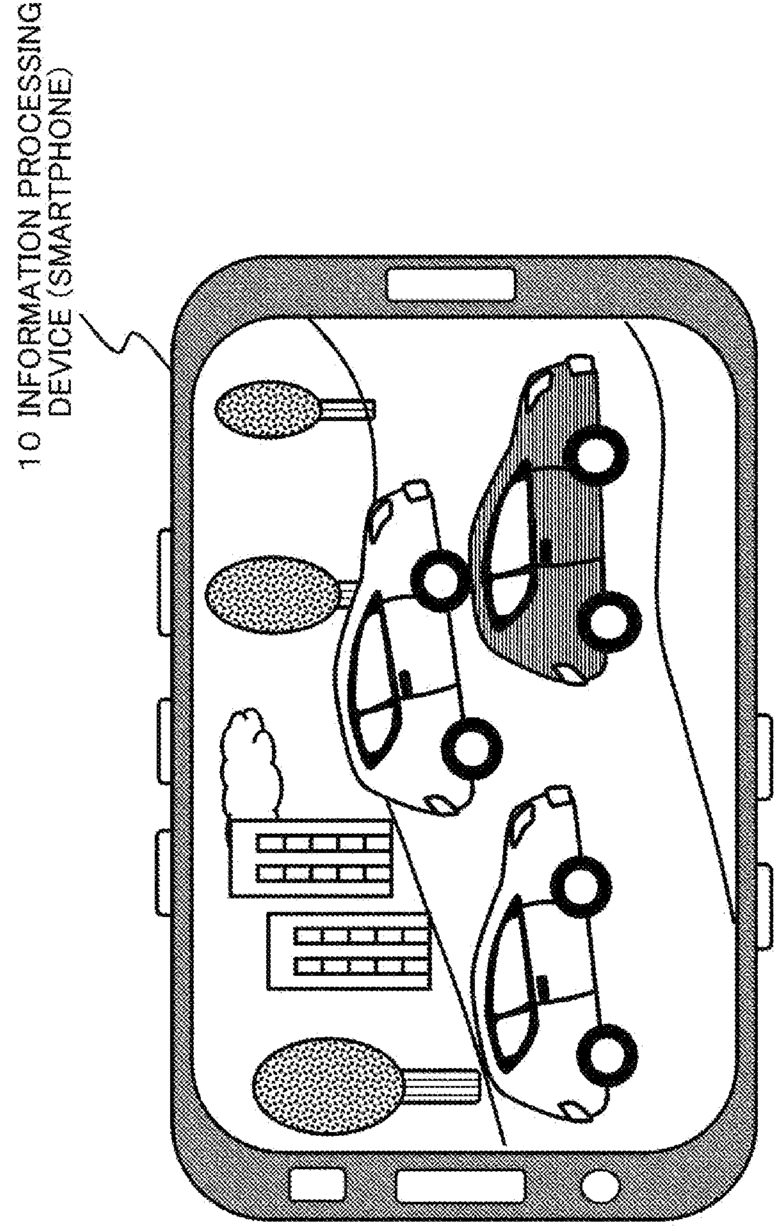
FIG. 1 is a diagram for explaining an example of a game application execution processing using an information processing device.

Hereinafter, an information processing device, an information processing system, an information processing method, and a program of the present disclosure will be described in detail with reference to the accompanying drawings. The descriptions will be given in the following order.

1. General execution example of game application in information processing device
2. Processing executed by information processing device of present disclosure
3. Specific examples of learning data generation processing and optimal control using generated learning data 3-(1) Processing example of applying learning data to disable camera activation switch during execution of game application 3-(2) Processing example of setting and resetting competition set that allows players to concentrate on game, such as non-display of notifications and incoming calls, fixed applications, non-display of navigation bar, and the like, and user touch insensitive body that disables user's touch on screen 3-(3) Processing example of executing screenshot and uploading screenshot image to SNS 3-(4) Processing example for controlling UI output mode 3-(5) Processing example for automatically executing search processing 4. Learning processing sequence and execution sequence of optimal control processing that applies learning data
5. Example of optimal control processing of information processing device when game application is not executed
6. Configuration example of information processing device
7. Hardware configuration example of information processing device and server
8. Summary of configuration of present disclosure

1. General Execution Example of Game Application in Information Processing Device First, a general execution example of a game application in an information processing device will be described.

FIG. 1 shows a smartphone as an example of an information processing device 10. Users can enjoy various game applications using information processing devices such as smartphones and game terminals.

Note that the processing of the present disclosure is applicable not only to smartphones but also to other information processing devices in general such as game terminals or PCs, and the information processing device of the present disclosure includes these various devices.

A game application execution screen is displayed on a display unit of the information processing device 10 shown in FIG. 1.

The user proceeds with the game by performing various operations while viewing the display data of the game application displayed on the display unit.

The game application being executed in the information processing device 10 shown in FIG. 1 is a car racing-related application, but there are various types of game applications that can be executed in the information processing device 10.

Figures 2A, 2B, 2C:
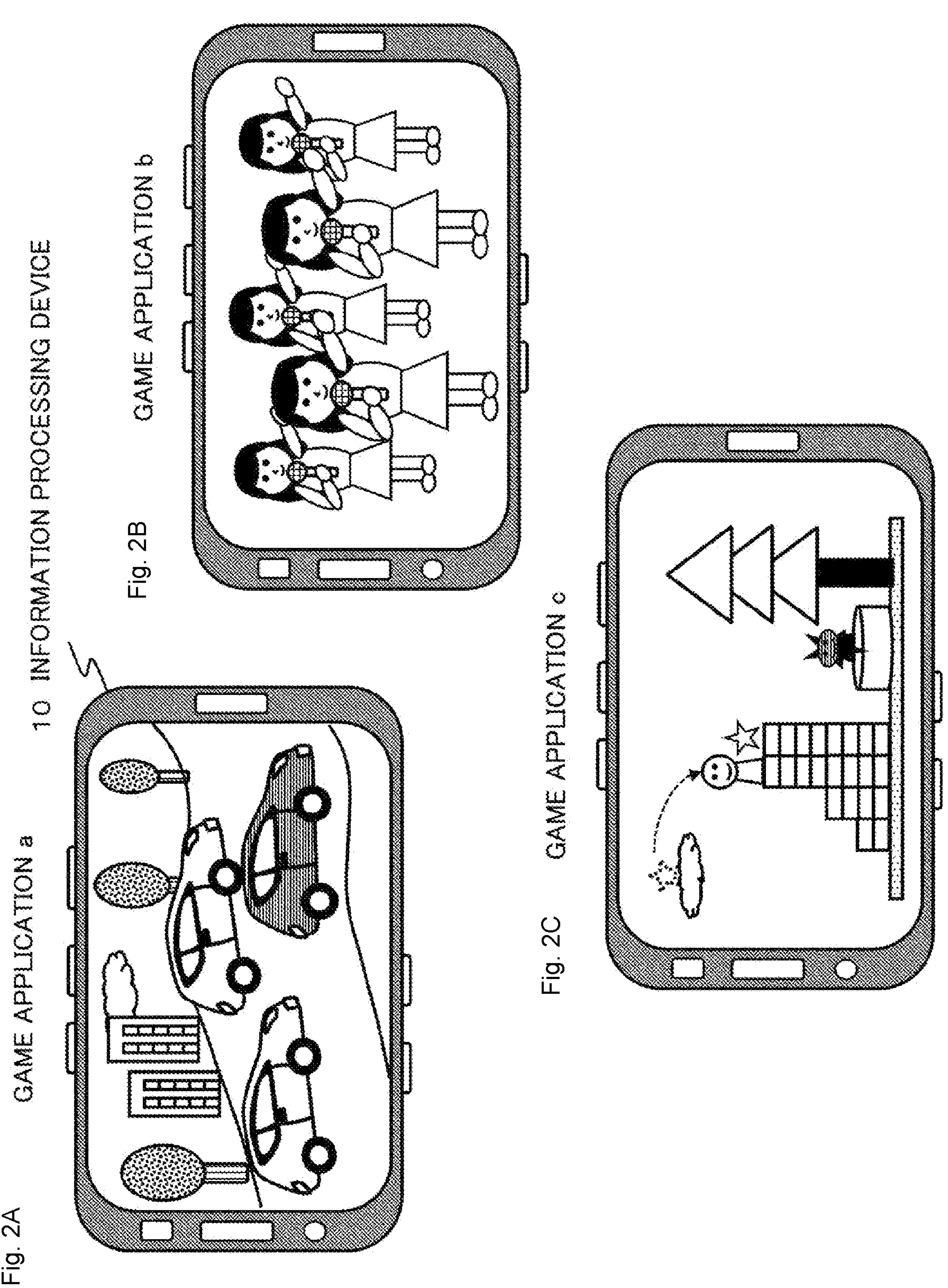
FIGS. 2A, 2B, and 2C are diagrams for explaining an example of a game application execution processing using an information processing device.

For example, there are many types of game applications as shown in FIGS. 2A, 2B, and 2C. These various game applications often require unique operations corresponding to each application.

In order to perform a user operation on the game application being executed, the user can display an operation unit UI on the display unit of the information processing device 10 and perform the operation, for example.

However, a predetermined user operation is required to display the operation unit UI.

Figure 3:
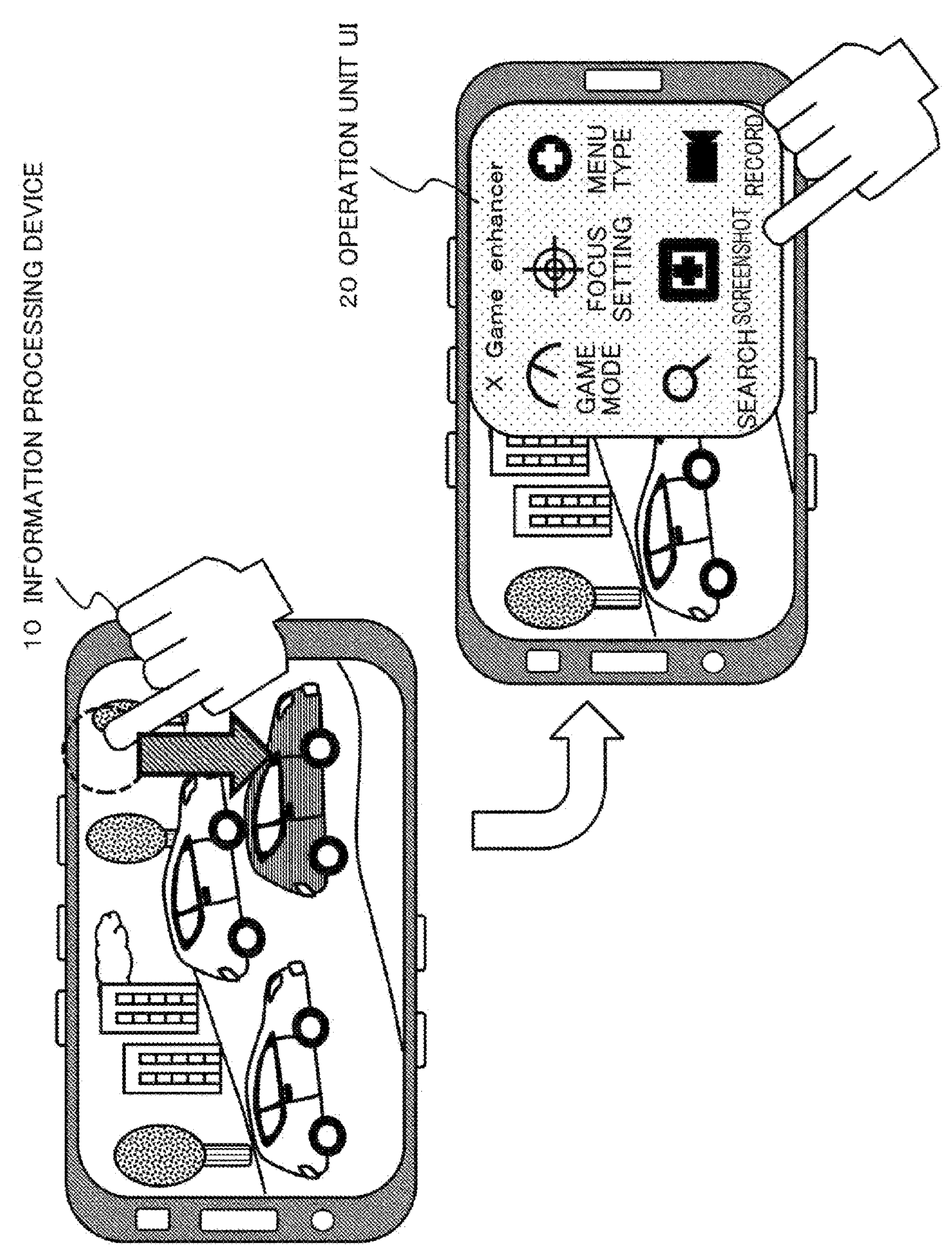
FIG. 3 is a diagram for explaining an operation example for displaying an operation unit UI on the information processing device.

For example, as shown in FIG. 3, the user displays an operation unit UI 20 by swiping the user's finger downward from the upper right of the screen of the information processing device 10.

The user can perform various kinds of processing on the game being executed by performing operations such as touching icons on the displayed operation unit UI 20.

Figures 4A, 4B:
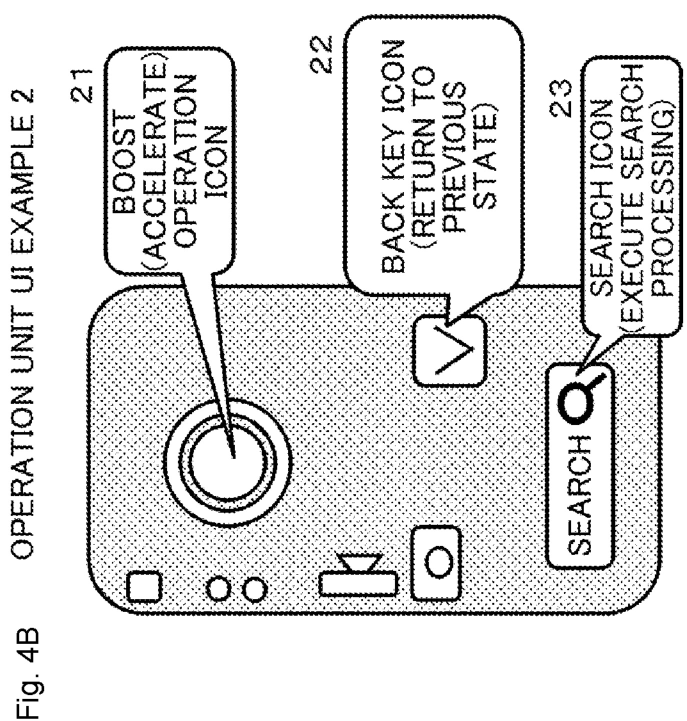
FIGS. 4A and 4B are diagrams for explaining an example of the operation unit UI.

Note that, as shown in FIGS. 4A and 4B, for example, various types of operation unit UIs are prepared depending on the game. The user may have to perform multiple steps of processing, such as selectively displaying a UI corresponding to an operation that the user wants to perform, and then performing an operation on an icon on the displayed UI.

In FIG. 4A operation unit UI example 1 shown in FIGS. 4A and 4B, icons corresponding to each processing of game mode, focus setting, menu type, search, screenshot, and record are set. The user can execute processing corresponding to each icon by operating (touching) one of these icons.

FIG. 4B Operation unit UI example 2 shown in FIGS. 4A and 4B is an operation unit UI including a boost (acceleration) operation icon 21, a back key icon 22, a search icon 23, and the like, and the user can execute processing corresponding to each icon by operating (touching) any one of these icons.

For example, in a game application in which a plurality of operation unit UIs are set, a user has to perform multiple steps of processing, such as selectively displaying a UI corresponding to an operation that the user wants to perform, and then performing an operation on an icon on the displayed UI. In the meantime, the game will be interrupted.

A specific example of a user operation will be described with reference to FIG. 5 and the subsequent figures.

Figure 5:
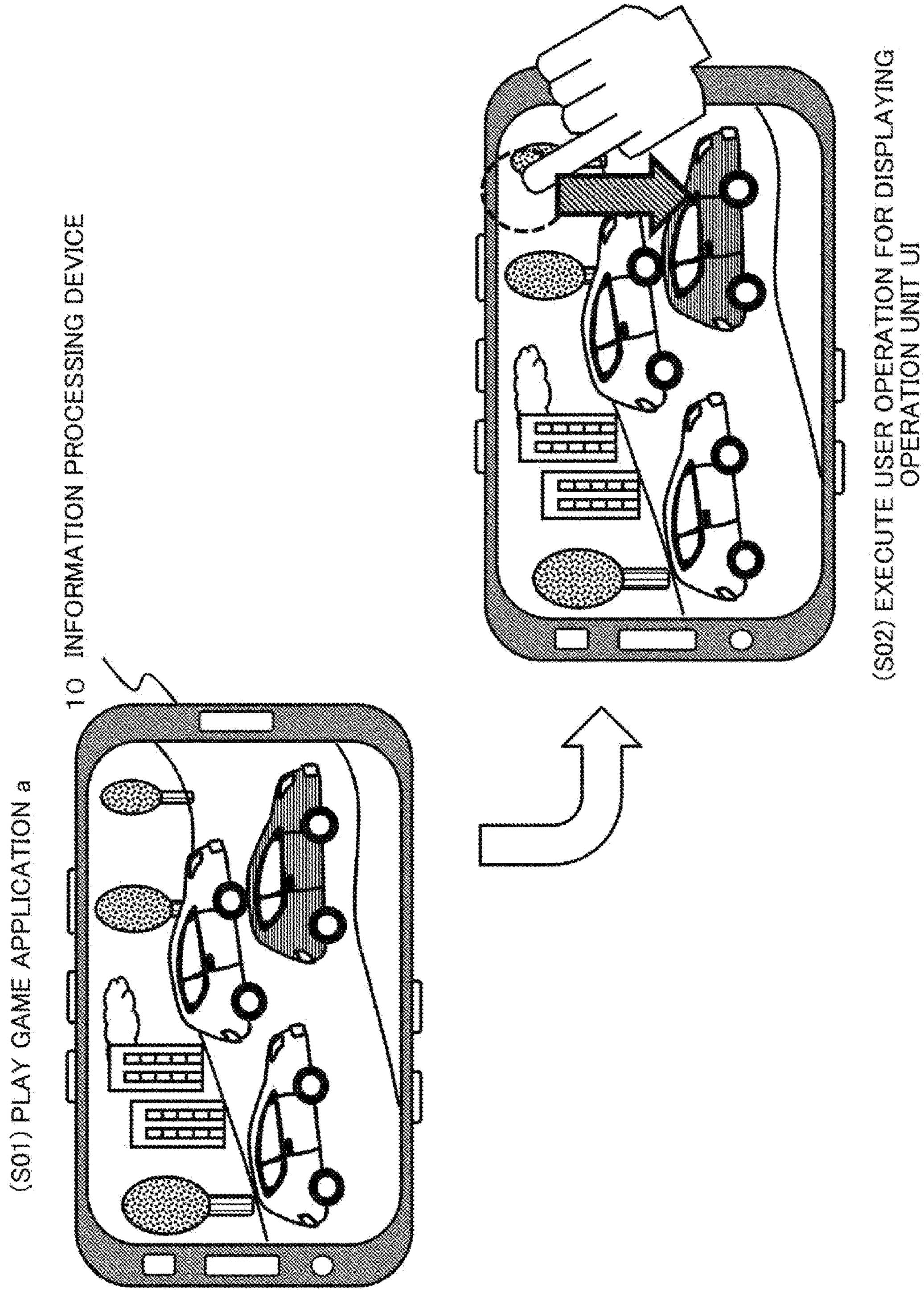
FIG. 5 is a diagram for explaining an example of an operation performed by a user when executing a game application using an information processing device.
Figure 7:
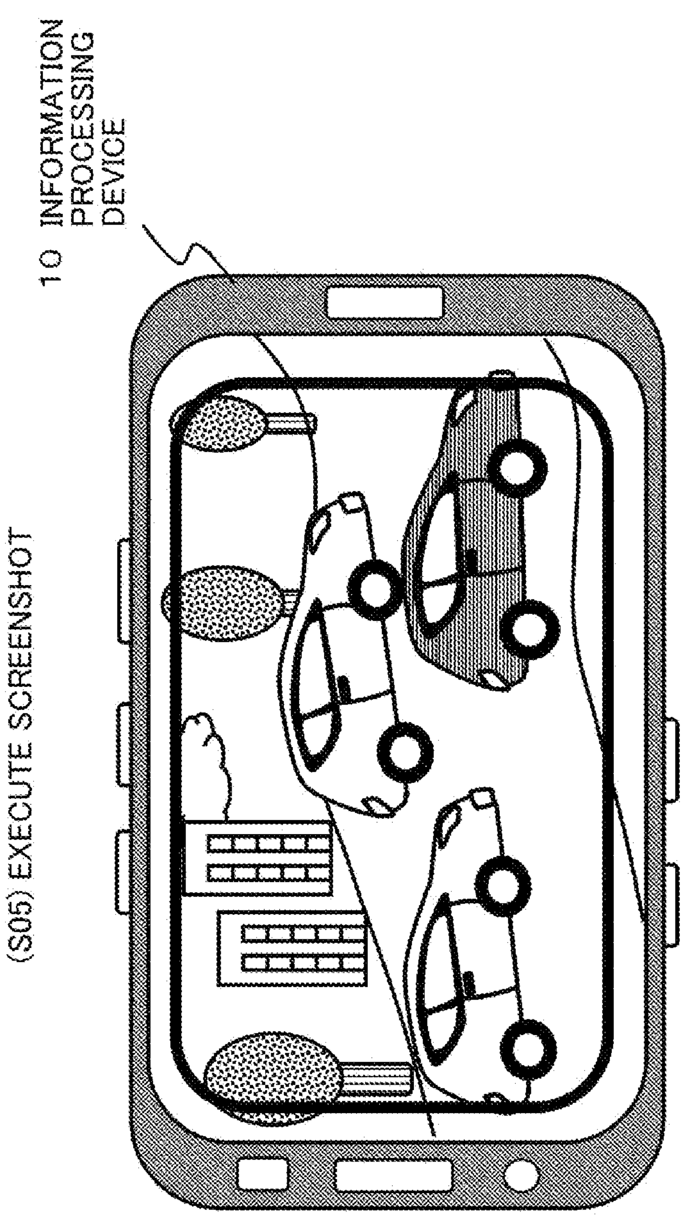
FIG. 7 is a diagram for explaining an example of an operation performed by a user when executing a game application using an information processing device.

The processing proceeds sequentially from step S01 shown in FIG. 5 to step S05 shown in FIG. 7.

First, step S01 in FIG. 5 shows a state in which the user is playing a game application a on the information processing device 10, and the game screen of the game application a is displayed on the display unit of the information processing device 10.

Step S02 in FIG. 5 shows a state in which the user who is executing the game application a performs a user operation for displaying the operation unit UI.

As shown in the figure, the user swipes the user's finger downward from the upper right of the screen of the information processing device 10.

Figure 6:
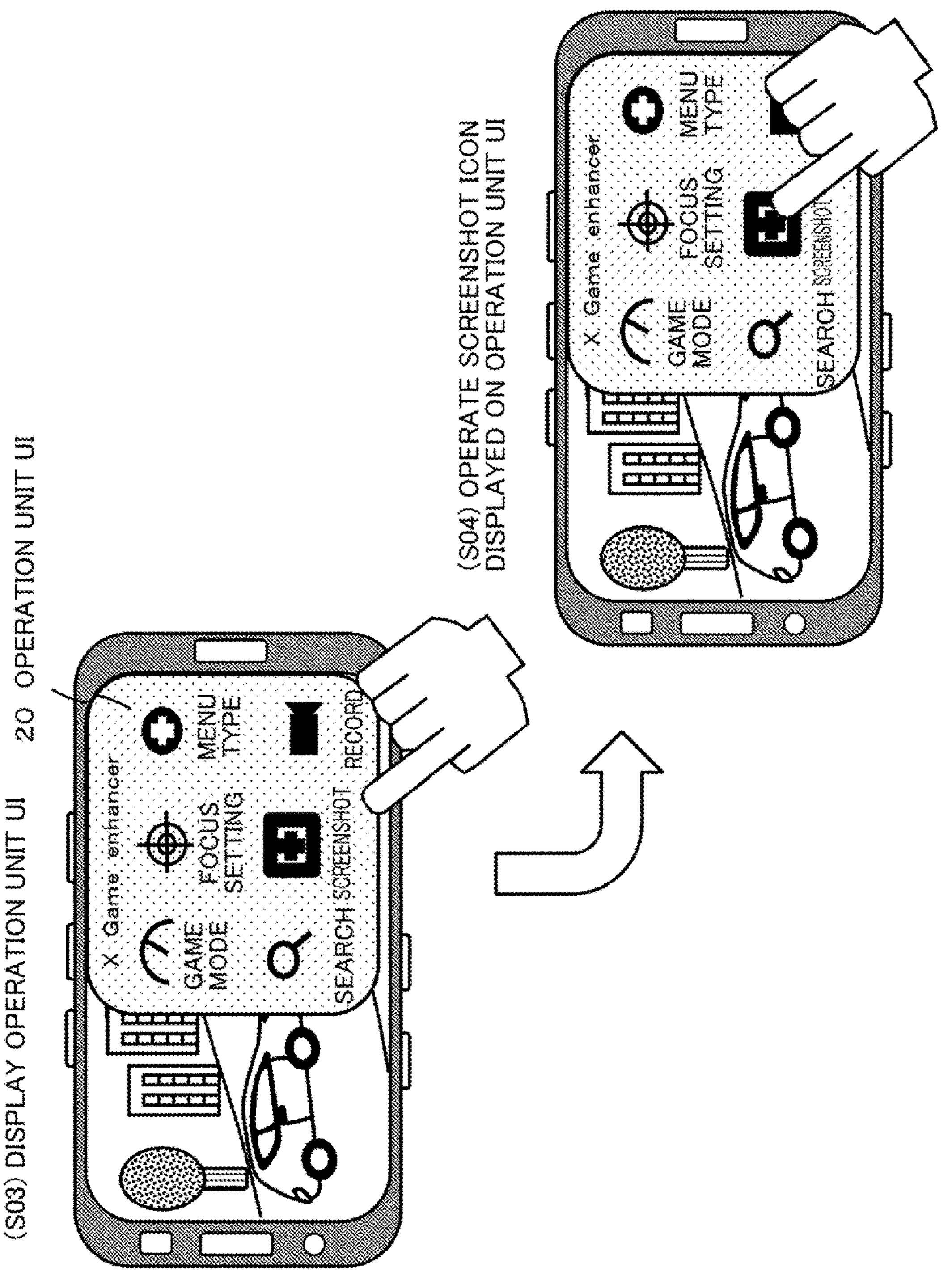
FIG. 6 is a diagram for explaining an example of an operation performed by a user when executing a game application using an information processing device.

Step S03 in FIG. 6 shows a state in which the operation unit UI 20 is displayed according to the user operation.

The operation unit UI 20 is displayed in a partial area of the display unit of the information processing device 10.

Step S04 of FIG. 6 shows a state in which the user operates (touches) one icon, that is, a screenshot execution icon, from among a plurality of icons displayed on the operation unit UI 20 displayed in a partial area of the display unit of the information processing device 10.

Step S05 in FIG. 7 shows a screenshot execution screen in response to the user's operation (touch) on the screenshot execution icon.

The image displayed on the display unit of the information processing device 10 in FIG. 7 is taken and stored in the memory.

Thus, even when performing processing such as taking a screenshot of the game screen, the user needs to display the operation unit UI and further operate icons on the displayed UI.

Figure 8:
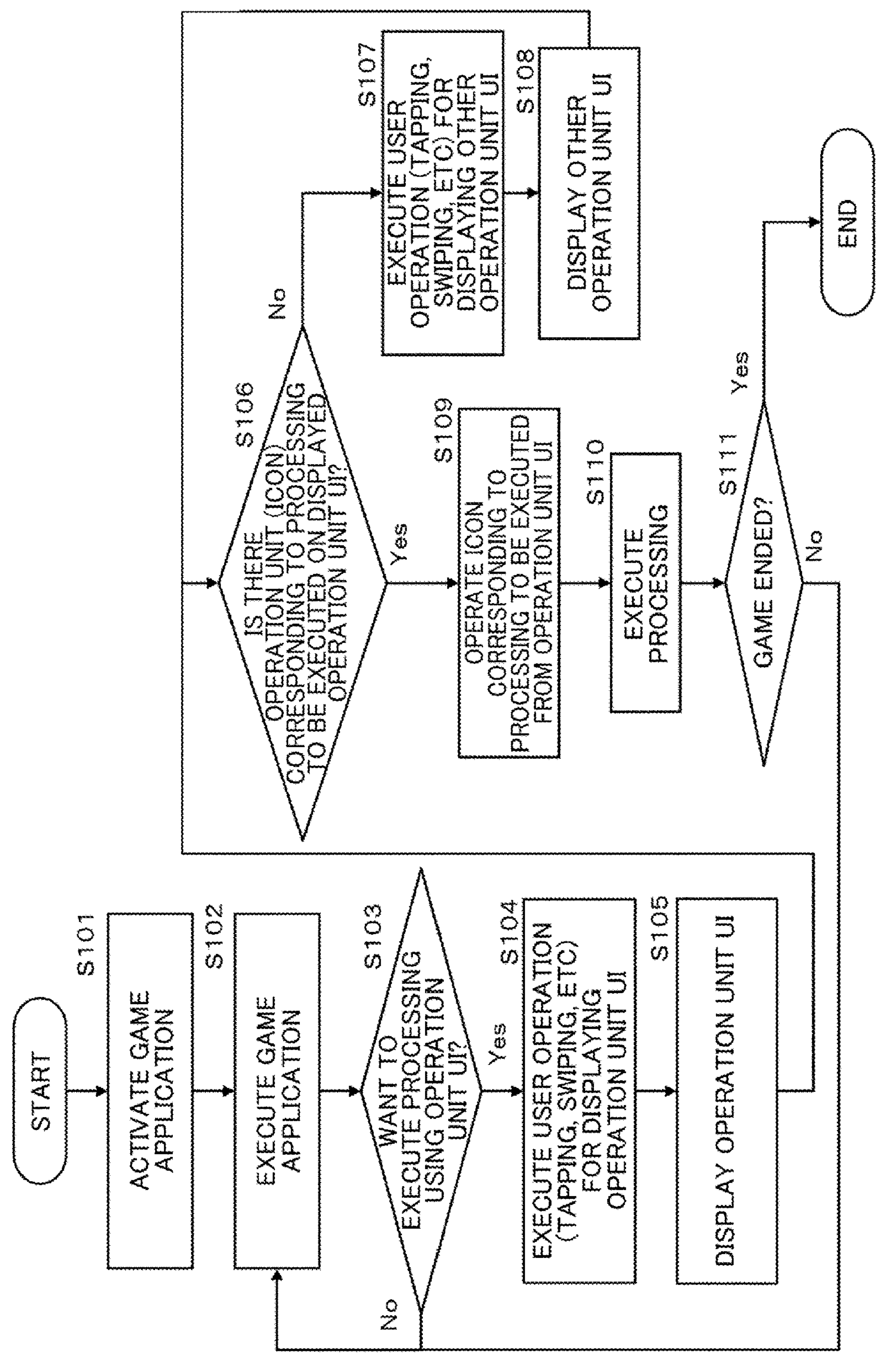
FIG. 8 is a diagram showing a flowchart for explaining an example of a processing sequence of user processing and processing executed by an information processing device when performing a user operation on the operation unit UI.

An example of a processing sequence of the user processing and the processing executed by the information processing device 10 when performing such a user operation on the operation unit UI will be described with reference to the flowchart shown in FIG. 8.

Processing of each step of the flow shown in FIG. 8 will be described.

(Step S101)

First, in step S101, the user uses the information processing device 10 to activate a game application. For example, the game application a described with reference to FIG. 5 is activated.

(Step S102)

Next, the user executes the activated game application in step S102. For example, the car racing type game application a described with reference to FIG. 5 is started.

(Step S103)

Next, in step S103, the user determines whether he/she wants to execute processing using the operation unit UI, and proceeds to step S104 if he/she wants to execute processing using the operation unit UI.

If the processing using the operation unit UI is not to be executed, execution of the game application is continued in step S102.

(Step S104)

If it is determined in step S103 that the user wants to execute processing using the operation unit UI, the user executes a user operation for displaying the operation unit UI in step S104.

This processing is the processing described above in step S02 of FIG. 5, and is, for example, processing of swiping the user's finger downward from the upper right of the display screen of the information processing device 10.

(Step S105)

Next, in step S105, the operation unit UI is displayed on the display unit of the information processing device 10.

This processing is in the state described earlier in step S03 in FIG. 6. An operation unit UI is displayed in a partial area of the display screen of the information processing device 10.

(Step S106)

Next, in step S106, the user checks whether there is an icon corresponding to the processing that the user wants to operate on the operation unit UI displayed on the display unit of the information processing device 10.

If present, the processing proceeds to step S109.

If absent, the processing proceeds to step S107.

(Steps S107 and S108)

The processing of steps S107 and S108 is executed when it is determined in in step S106 that there is no icon corresponding to the processing that the user wants to operate on the operation unit UI displayed on the display unit of the information processing device 10.

In this case, the user executes a user operation for displaying another operation unit UI in step S107, and displays the other operation unit UI in step S108.

Thereafter, the processing returns to step S106.

In step S106, it is checked whether there is an icon corresponding to the processing that the user wants to operate on the displayed operation unit UI. If absent, the processing of steps S107 and S108 is repeatedly executed.

After checking that there is an icon corresponding to the processing that the user wants to operate on the finally displayed operation unit UI, the processing proceeds to step S109.

(Step S109)

In step S109, the user selects and operates an icon corresponding to the processing the user wants to execute from the operation unit UI displayed on the display unit of the information processing device 10. For example, an operation such as touch is executed.

This processing is processing corresponding to the screenshot icon operation processing described above with reference to FIG. 5 (step S04), for example.

(Step S110)

Next, in step S110, the information processing device 10 executes processing corresponding to the icon operated by the user.

For example, a screenshot is taken.

This processing is, for example, the processing corresponding to the execution of the screenshot described above with reference to FIG. 6 (step S05).

(Step S111)

Next, in step S111, the user determines whether to end the game, and if the game is to be ended, the processing ends.

If not, the processing returns to step S102 to continue the game.

As described above, when the user wants to execute various kinds of processing using the operation unit UI while a game application is being executed in the information processing device 10, the user needs to display the operation unit UI including an operation icon associated with the processing that the user wants to execute and perform operations on the icons on the displayed UI.

When there are a plurality of operation unit UIs, it may be difficult to find the desired operation icon. In such a case, the game is interrupted for a long time even though the game is in progress.

The configuration of the present disclosure, which will be described below, solves such problems, and has a configuration that makes it possible to automatically control an information processing device using learning data.

2. Processing Executed by Information Processing Device of Present Disclosure Next, processing executed by the information processing device of the present disclosure will be described.

Figure 9:
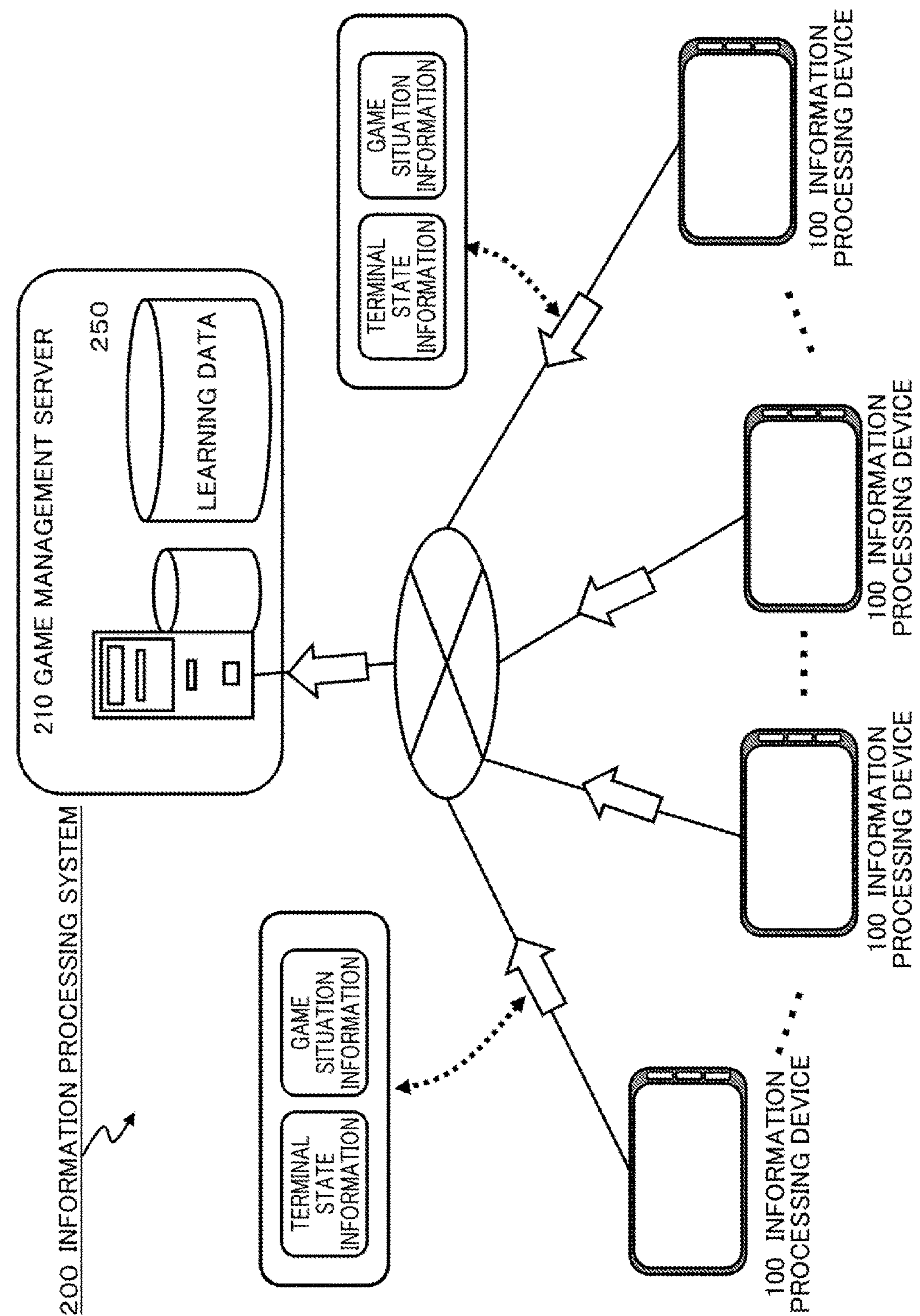
FIG. 9 is a diagram showing a configuration example of an information processing system having an information processing device such as a smartphone as a user terminal and a game management server.

FIG. 9 is a diagram showing a configuration example of an information processing device 100 such as a smartphone that is a user terminal that executes various applications such as game applications, and an information processing system 200 having a game management server 210.

The game management server 210 and the information processing devices 100 such as smartphones possessed by many users are connected by a communication network and can communicate with each other. Communication using a communication network is also possible between the information processing devices 100.

Various game applications are executed in each of the information processing devices 100, which are user terminals.

The information processing device 100 transmits the terminal state information and the game situation information during execution of the game application to the game management server 210.

The game management server 210 performs learning (machine learning) processing using the terminal state information and the game situation information received from many information processing devices 100, generates learning data 250, and stores the learning data 250 in a storage unit.

The learning data 250 is learning data for obtaining optimal control according to at least one of the terminal state and the game situation during execution of the game application in the information processing device 100.

That is, the learning data is learning data in which the input is at least one of the terminal state of the information processing device 100 and the game situation, and the output is the optimal control in the information processing device 100.

The game management server 210 sequentially receives the terminal state information and the game situation information from the information processing device 100, continuously executes learning processing, and generates and updates the learning data 250.

The game management server 210 generates learning data for each game application.

Alternatively, a user ID or a terminal ID (information processing device ID) may be received from the information processing device 100 and learning data may be generated for each user or for each terminal.

Although the information processing system 200 shown in FIG. 9 is configured to generate the learning data 250 within the game management server 210, it may be configured to generate and store the learning data 250 within the information processing device 100.

Figure 10:
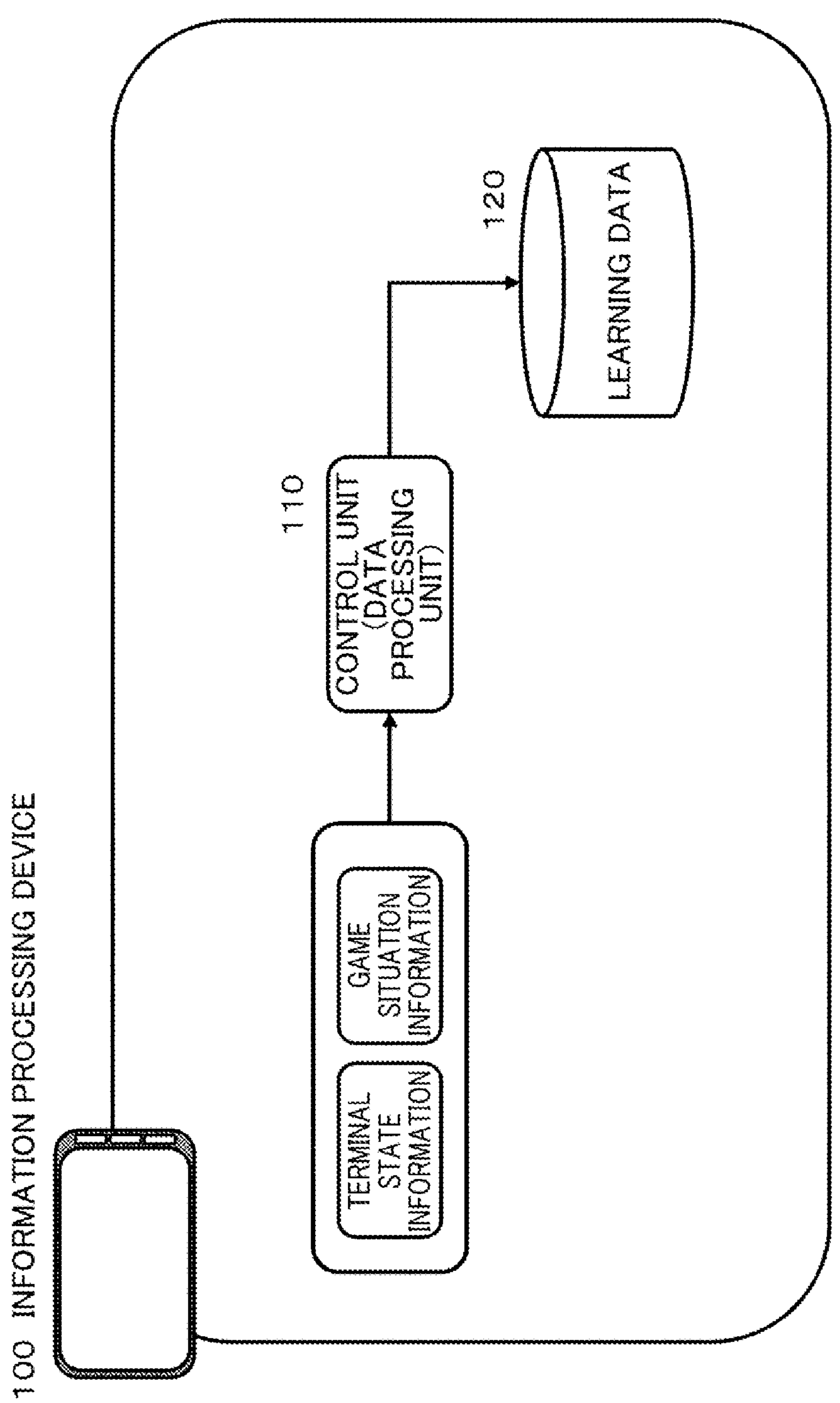
FIG. 10 is a diagram for explaining an example in which a control unit (data processing unit) in an information processing device generates learning data and stores it in a storage unit in the information processing device.

For example, as shown in FIG. 10, a control unit (data processing unit) 110 in the information processing device 100 generates learning data 120 unique to the information processing device 100 and stores it in a storage unit in the information processing device 100.

In this case, the control unit (data processing unit) 110 of the information processing device 100 acquires the terminal state information and the game situation information during execution of the game application, executes learning (machine learning) processing using the acquired the terminal state information and the game situation information to generate learning data 120, and stores the same in the storage unit.

In this case, the learning data stored in the storage unit in the information processing device 100 is also learning data for each game application, and is basically learning data for each user.

The learning data stored in the storage unit of the game management server 210 or the storage unit of the information processing device 100 is used when the information processing device 100 executes the game application.

When the information processing device 100 executes a game application, the control unit 110 of the information processing device 100 first acquires the real-time terminal state and game situation. Furthermore, the learning data closest to the acquired real-time terminal state and game situation (at least one of the terminal state information and the game situation information) is selected. Furthermore, the optimal control information recorded in association with the selected learning data (at least one of the terminal state information and the game situation information) is acquired, and control is executed according to the acquired optimal control information.

Specific examples of learning data generation processing and optimal control processing using the generated learning data will be described with reference to FIGS. 11 and 12.

Figure 11:
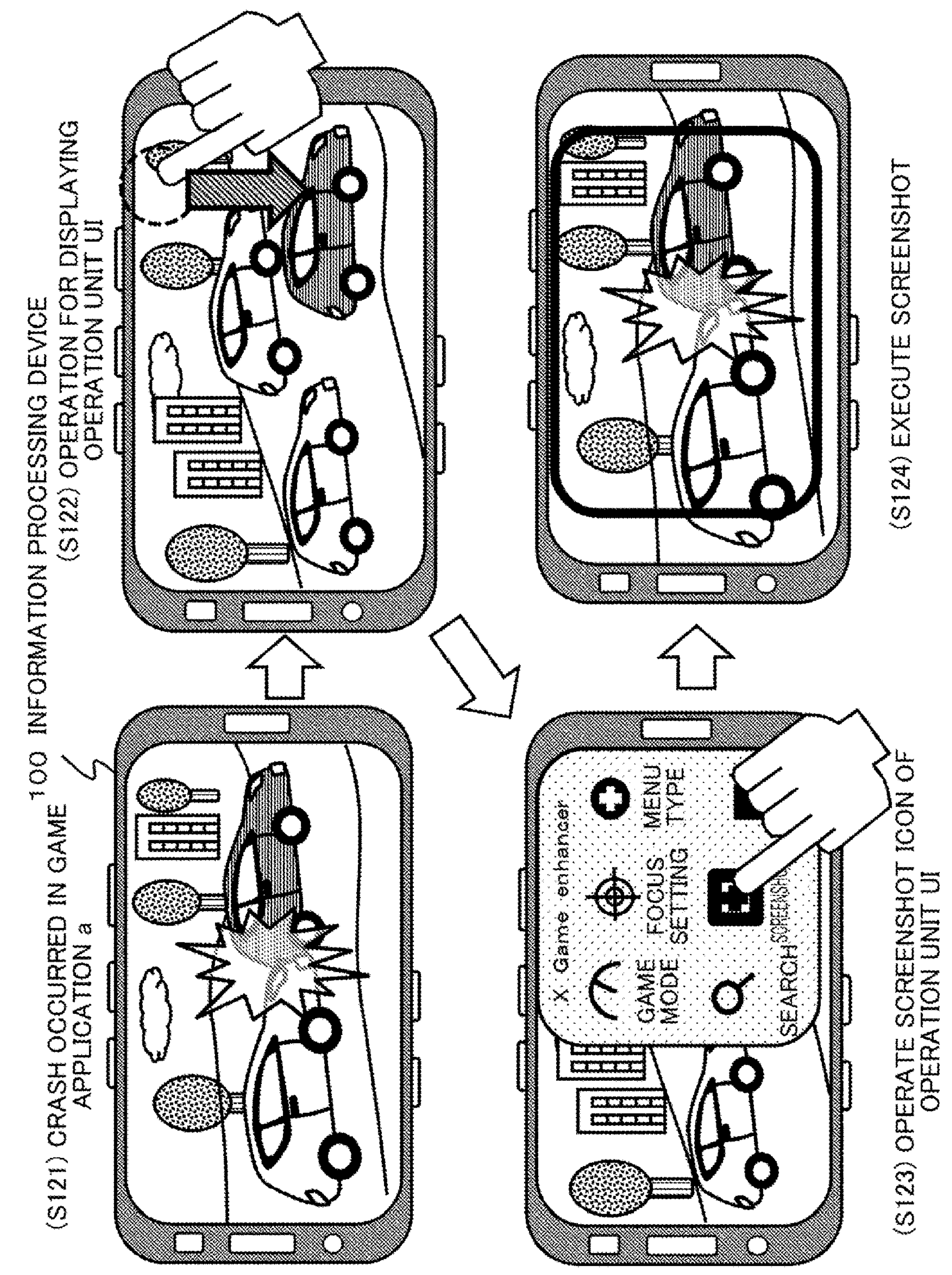
FIG. 11 is a diagram for explaining a specific example of learning data generation processing and optimal control processing using the generated learning data.

FIG. 11 is a diagram for explaining a specific example of learning data generation processing.

FIG. 11 is a diagram showing the transition of the game state and the terminal state during execution of the game application a in the information processing device 100, which is the user terminal. Specifically, the following transitions occur.

(S121) Crash occurred during execution of game application a (S122) User executes user operation for displaying operation unit UI (S123) User operates screenshot icon on operation unit UI (S124) Execute screenshot The game management server 210 or the information processing device 100 executes learning processing according to the transition of these game situations and terminal states to generate learning data.

As a result of this learning processing, for example, the following learning data is generated.

Input value (terminal state information, game state information)=crash occurred during execution of game application a Output value (optimal control information)=screenshot execution In other words, learning processing is performed such that "the user takes a screenshot when a crash occurs during execution of the game application a". As a result, learning data is generated indicating that the optimal control when a crash occurs during execution of the game application a is the "screenshot taking processing".

When such learning data is generated, optimal control processing can be performed using this learning data.

Figure 12:
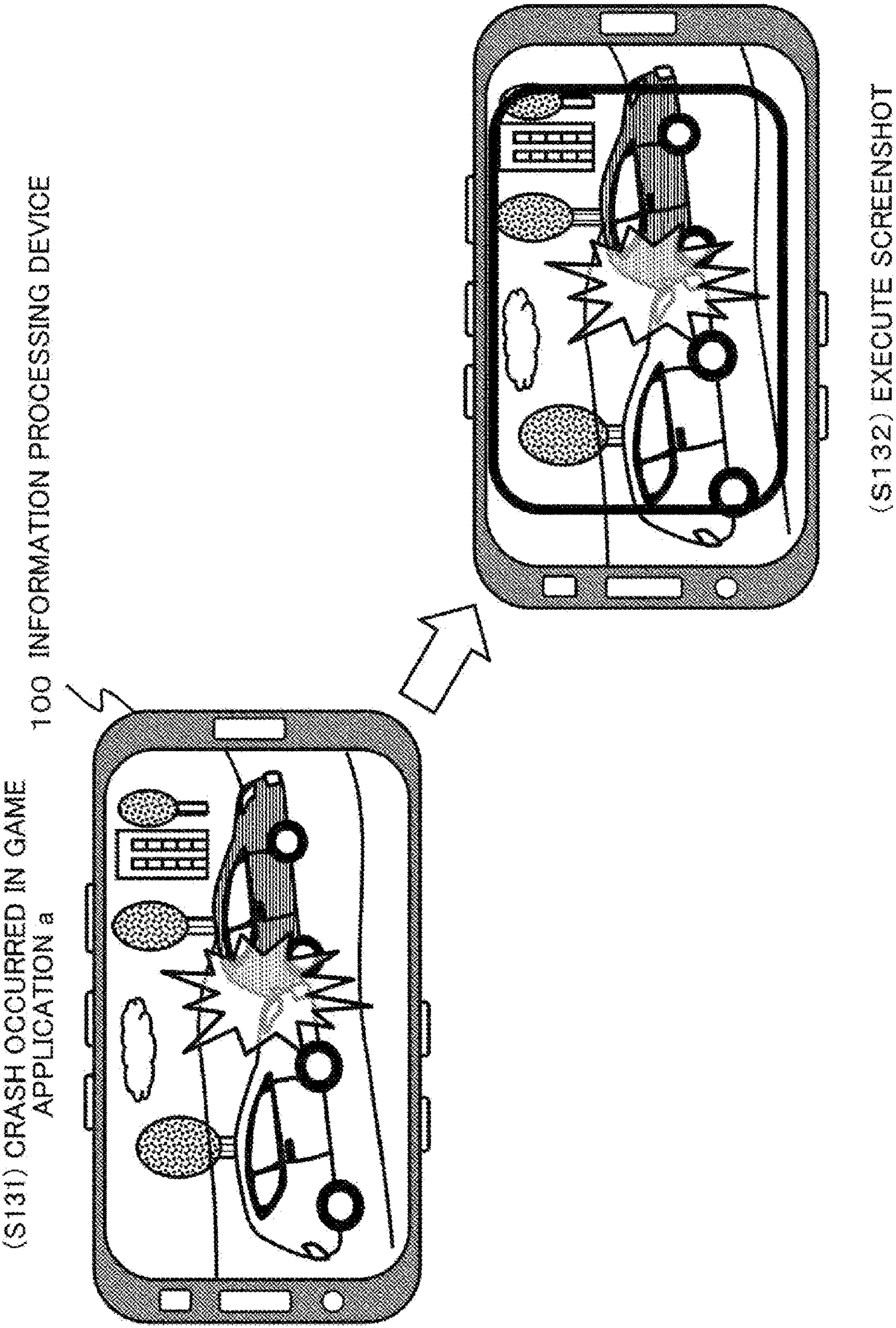
FIG. 12 is a diagram for explaining a specific example of learning data generation processing and optimal control processing using the generated learning data.

FIG. 12 is a diagram for explaining a specific example of optimal control processing using generated learning data.

Assume that a crash occurs while the user is executing game application a, as shown in FIG. 12 (step S131).

The control unit of the information processing device 100 detects that "a crash has occurred during execution of game application a" as real-time information. That is, as the terminal state information or game situation information, "a crash has occurred during execution of game application a" is input.

Based on this input, the control unit of the information processing device 100 selects registration data of similar data (terminal state, game situation) from the learning data, and acquires and executes optimal control information registered in association with the selected registration data.

The following data is registered as learning data.

Input value (terminal state information, game state information)=crash occurred during execution of game application a Output value (optimal control information)=screenshot execution The control unit of the information processing device 100 performs optimal control, that is, takes a screenshot, based on this registration data.

That is, as shown in FIG. 12 (step S132), the screenshot is taken.

That is, the control unit 110 of the information processing device 100 automatically takes a screenshot of the screen when the crash occurred.

By using the learning data in this way, optimal control processing is automatically executed according to the real-time terminal state and game situation.

The optimal control processing executed automatically is the optimal control processing registered as learning data, and is the processing determined to be optimal according to the terminal state and game situation acquired in advance.

By the processing using such learning data, the user can take timely images while executing the game without having to perform an operation for displaying the operation unit UI in step S122 and an operation on the screenshot icon displayed on the operation unit UI in step S123 described above with reference to FIG. 11.

Figure 13:
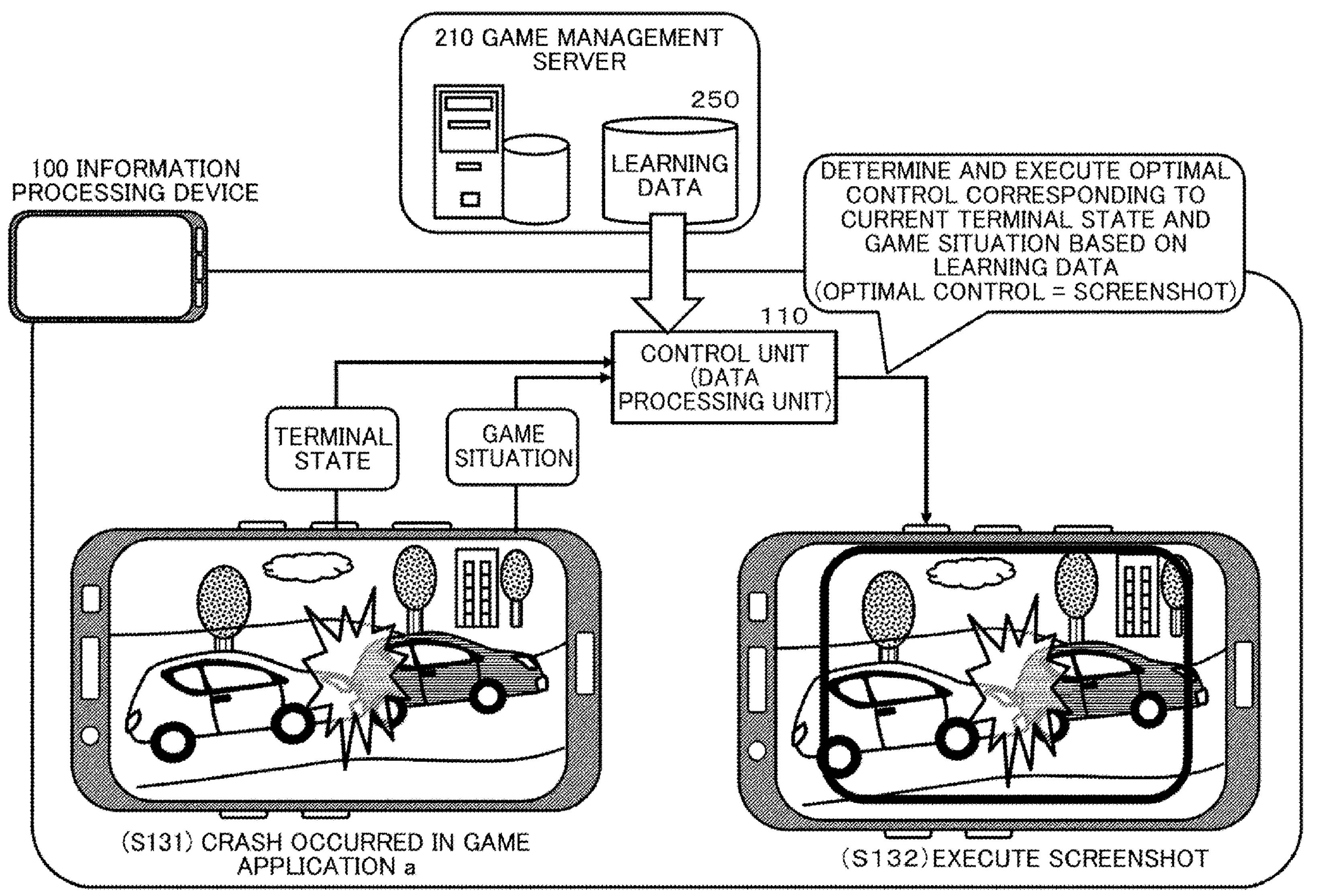
FIG. 13 is a diagram for explaining processing executed by an information processing device using learning data.

FIG. 13 is a diagram for explaining processing executed by the information processing device 100 using learning data.

The example shown in FIG. 13 is a processing example using learning data 250 generated by the game management server 210 and stored in the storage unit.

The control unit (data processing unit) 110 of the information processing device 100 shown in FIG. 13 sequentially acquires the terminal state and game situation of the information processing device 100 that is executing the game application a. This acquired data is current information, that is, real-time information.

The control unit of the information processing device 100 detects that "a crash has occurred during execution of the game application a" based on these pieces of acquired information.

Based on this input, the control unit of the information processing device 100 performs search processing of searching registration data of the learning data 250 and selects matching or similar registration data (terminal state, game situation). Furthermore, the optimal control information registered in association with the selected registration data is acquired and executed.

As a result, the screenshot taking of step S132 shown in FIG. 13 is executed.

A sequence of processing using learning data executed by the information processing device 100 will be described with reference to FIG. 14.

Figure 14:
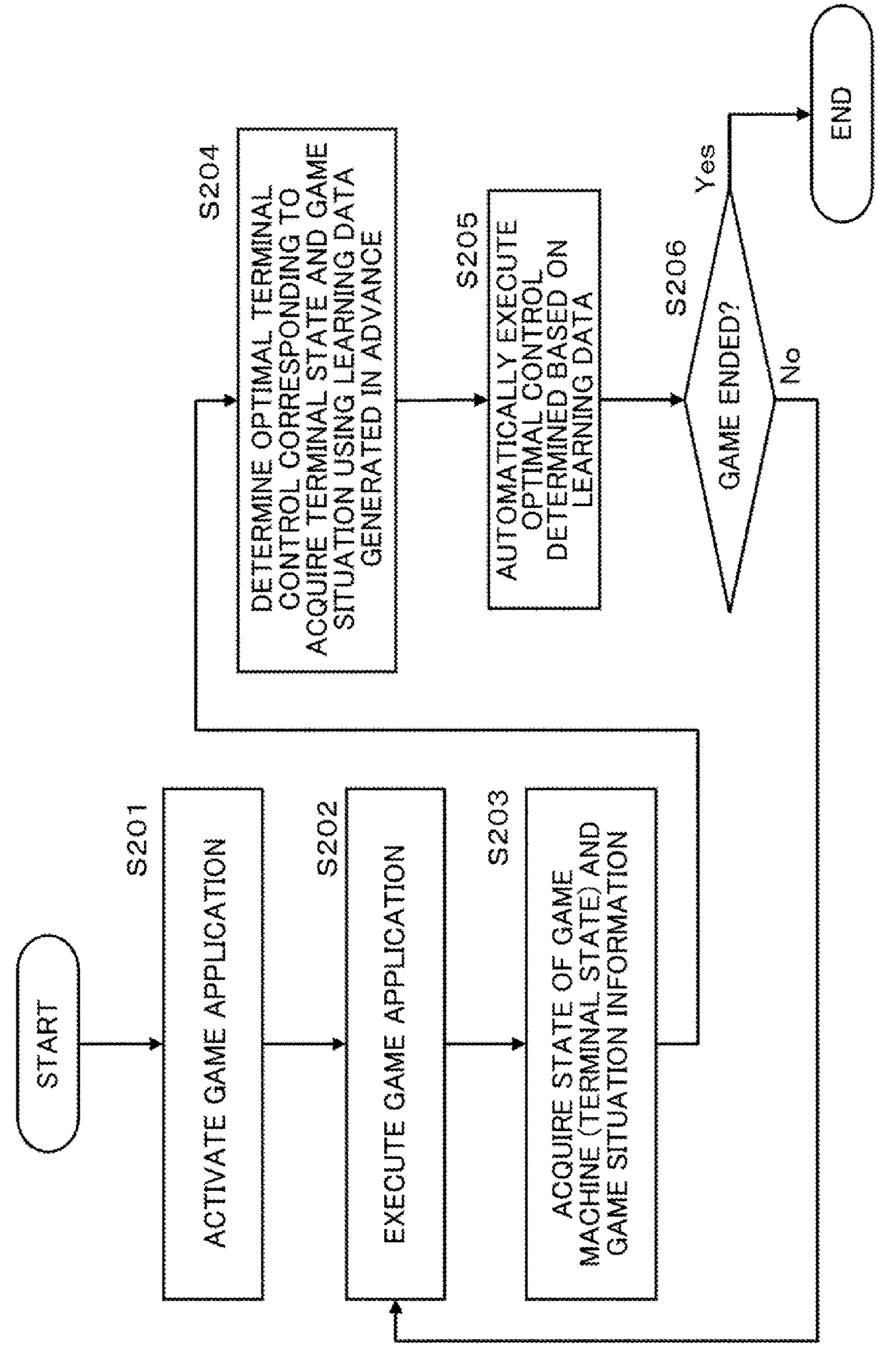
FIG. 14 is a diagram showing a flowchart for explaining a sequence of processing executed by an information processing device using learning data.

Note that the processing according to the flow shown in FIG. 14 can be executed by a control unit (data processing unit) 110 configured by a CPU or the like having a program execution function of the information processing device 100 according to a program stored in a storage unit.

Hereinafter, processing of each step of the flow shown in FIG. 14 will be described in order.

(Step S201)

First, a game application is activated in the information processing device 100.

For example, the control unit 110 of the information processing device 100 performs activation processing of activating the game application selected by the user.

(Step S202)

Next, in step S202, the control unit 110 of the information processing device 100 executes the game application activated in step S101.

For example, the car racing game application a described with reference to FIG. 1 is executed.

(Step S203)

Next, in step S203, the control unit 110 of the information processing device 100 acquires the terminal state, which is the state of the information processing device (game machine), and the game situation.

For example, the game situation such as the occurrence of a crash in the game application a as shown in step S131 of FIG. 13 is acquired.

(Step S204)

Next, in step S204, the control unit 110 of the information processing device 100 determines optimal control for the terminal corresponding to the acquired terminal state and the game situation using the learning data generated in advance.

For example, execution of a screenshot is determined as optimal control according to the game situation such as the occurrence of a crash in the game application a as shown in step S131 of FIG. 13.

(Step S205)

Next, in step S205, the control unit 110 of the information processing device 100 executes optimal terminal control determined based on the learning data.

For example, a screenshot of a crash scene as shown in step S132 of FIG. 13 is executed.

(Step S206)

Next, in step S206, the control unit 110 of the information processing device 100 determines whether the game has ended.

If the game has not ended, the processing returns to step S202 to continue executing the game application.

On the other hand, when the game has ended, the processing ends.

Figure 15:
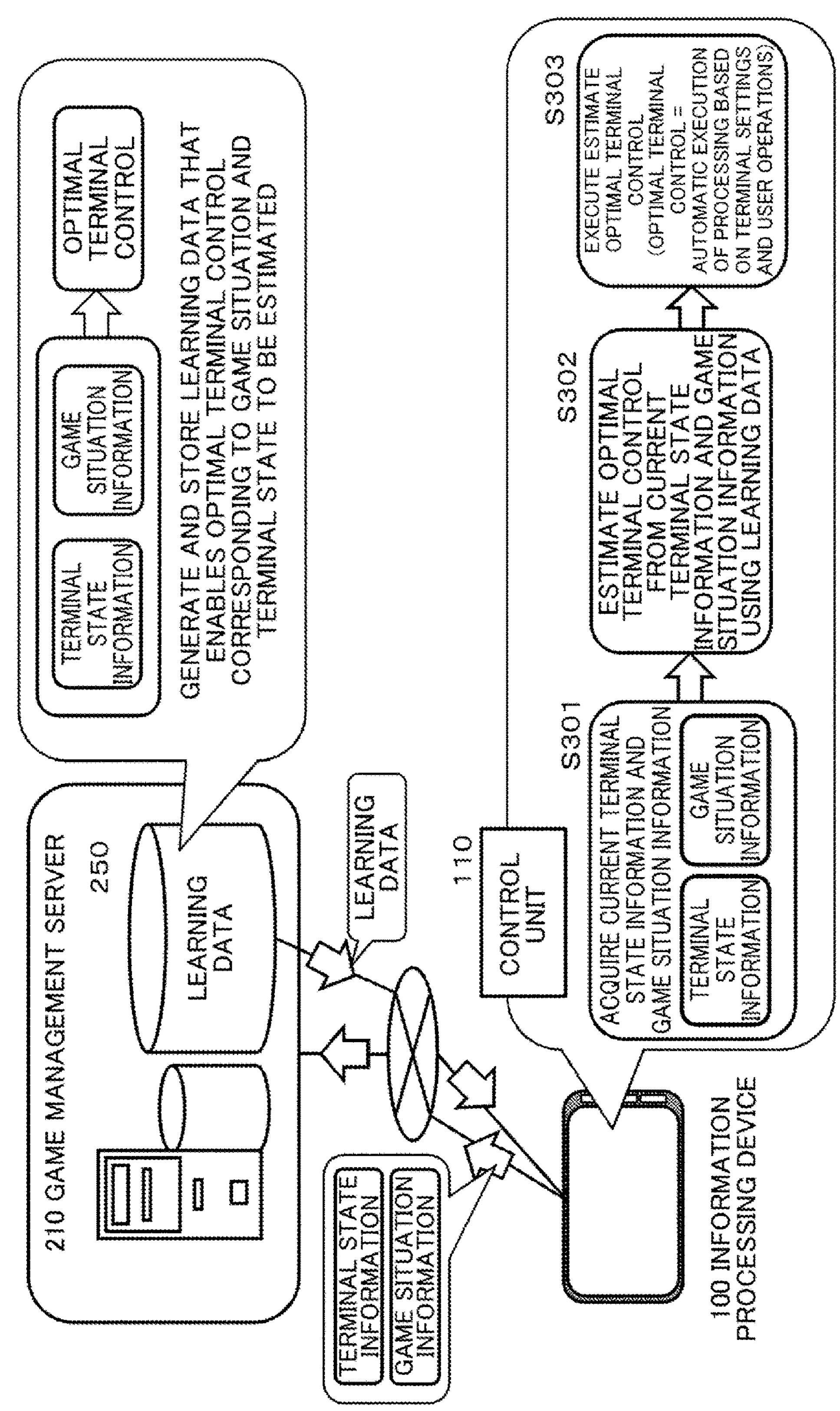
FIG. 15 is a diagram for collectively explaining the learning data generation processing and the processing using the learning data.

FIG. 15 is a diagram collectively showing the learning data generation processing and the processing using the learning data.

Note that the example shown in FIG. 15 is an example in which the game management server 210 executes processing of generating and storing learning data.

First, in the learning data generation processing, the terminal state information and the game situation information are transmitted from the information processing device 100 to the game management server 210.

Although FIG. 15 shows only one information processing device 100, the game management server 210 receives the terminal state information and the game situation information from many information processing devices 100, which are user terminals.

The game management server 210 performs learning (machine learning) processing using the terminal state information and the game situation information received from many information processing devices 100, generates learning data 250, and stores the learning data 250 in the storage unit.

As described above, the learning data 250 is learning data for obtaining optimal control according to the terminal state and the game situation during execution of the game application in the information processing device 100.

That is, the learning data is learning data in which the input is the terminal state and the game situation of the information processing device 100 and the output is the optimal control in the information processing device 100.

The game management server 210 sequentially receives the terminal state information and the game situation information from many information processing devices 100, continuously executes learning processing, and executes processing of generating and updating the learning data 250.

Note that, as described above, the game management server 210 generates learning data for each game application. Further, a user ID or a terminal ID (information processing device ID) may be received from the information processing device 100 and learning data may be generated for each user or for each terminal.

Next, the processing using the learning data stored in the storage unit of the game management server 210 will be described.

The information processing device 100 uses learning data to determine and execute optimal control processing.

Processing steps S301 to S303 of the control unit 110 of the information processing device 100 shown in the lower part of FIG. 15 indicate the processing steps of the processing using the learning data.

First, in step S301, the control unit 110 of the information processing device 100 acquires the real-time terminal state of the information processing device 100 executing the game application and the game situation.

Next, in step S302, the learning data 250 of the game management server 210 is used to determine optimal control.

That is, learning data (terminal state information, game situation information) closest to the real-time terminal state and the game situation acquired in step S301 is selected from the learning data 250 of the game management server 210.

Furthermore, the optimal control information recorded in association with the selected learning data (terminal state information, game situation information) is acquired and determined as the optimal control to be executed.

Finally, in step S303, the optimal control determined in step S302 is executed.

Although the example shown in FIG. 15 is a processing example in which learning data is generated and stored in the game management server 210, the learning data may be generated and stored in the information processing device 100 as described above.

Figure 16:
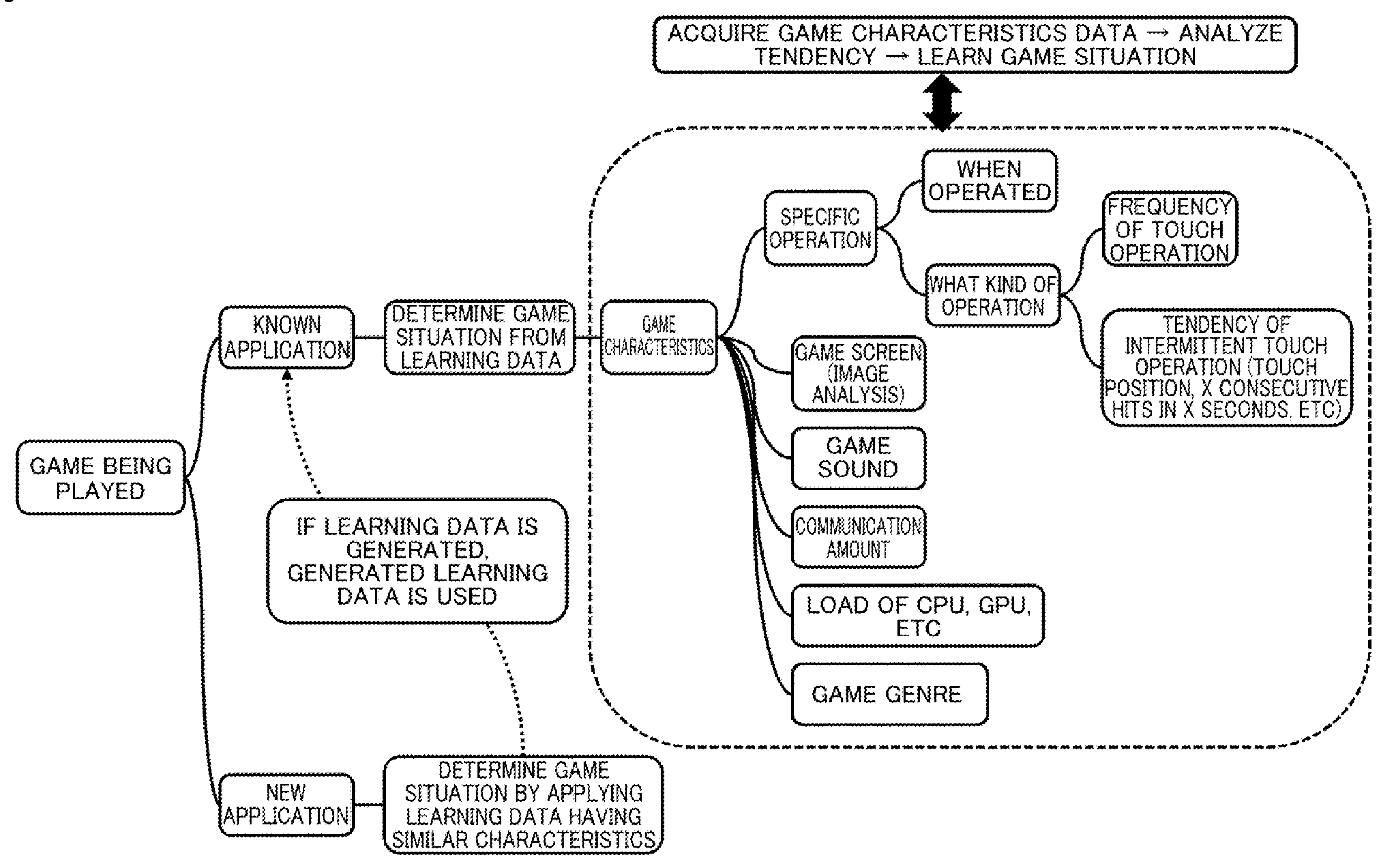
FIG. 16 is a diagram for explaining an example of data to be subjected to learning processing executed in a game management server or an information processing device.

With reference to FIG. 16, an example of data to be subjected to learning processing executed in the game management server 210 or the information processing device 100 will be described.

The game management server 210 and the information processing device 100, which is a user terminal, are connected for communication, and the game management server 210 can acquire the type and situation and the operation content of the game being executed on the information processing device 100.

Games executed by the information processing device 100, which is a user terminal, include games as known applications and games as new applications that are not known applications.

A known application refers to a game application for which a certain amount of learning data has been collected and a game situation can be determined, and a new application is a game application that is not in such a state.

For known applications, the game situation can be determined based on learning data during execution of the application.

For example, it is possible to determine changes in the user's operation content according to the progress of the game, desirable operation conditions for the user, and the like.

On the other hand, in the case of a new application, if there is a known application as a similar game, it is possible to determine the game situation by applying the learning data.

Similar games include games of the same genre, such as role-playing, fighting, racing, and puzzle games, or games with the same series title.

Alternatively, since the genre of each game may be arbitrarily determined, the user's operation tendency with respect to a new application may be detected, and applications with similar operation tendencies may be estimated as similar games.

Game characteristics to be learned include specific operations, game screens, game sounds, the amount of communication, the load of CPU/GPU (Graphics Processing Unit) and the like, game genres, and the like.

A specific operation is data indicating what kind of user operation is performed in the game.

Examples of the data include when the operation is performed in the game, what kind of operation is performed, and the like.

The information about what kind of operation is, for example, information such as touch operation frequency and intermittent touch tendency.

These pieces of information become learning data of user's operability and operation tendency.

The game screen is information such as brightness, brightness change tendency, color tendency, character type, and the like, obtained by image analysis of the game screen.

This is information such as what kind of screen state is created in what kind of game situation.

The game sound is information about sounds and music used in a game.

This is information such as what kind of sound output state is created in what kind of game situation.

The amount of communication is information on the amount of communication for game execution, and includes, for example, changes in communication charges according to game situations.

The load on the CPU/GPU and the like is information on the processing load of the game, and is, for example, changes in the processing load according to the game situation.

For example, the game management server 210 acquires such game characteristics data for a certain game application from many information processing devices 100, which are user terminals of many users.

Then, tendency analysis is performed from these pieces of data collected from multiple users to learn the game situation.

Then, for that game application, the current game state can be estimated from the current operation state, image, sound, communication amount, processing load, and the like.

By proceeding with this, it becomes possible to realize automatic processing according to the game situation and to improve processing accuracy.

For example, in the case of a car racing game, whether the current game situation is in either a situation in which the race is taking place, a situation at the stage such as selecting the type of a course and the type of a car before the race starts, and a situation at the stage of finding an opponent to race can be estimated from analysis of the game screen, game sound, and the like.

Figure 17:
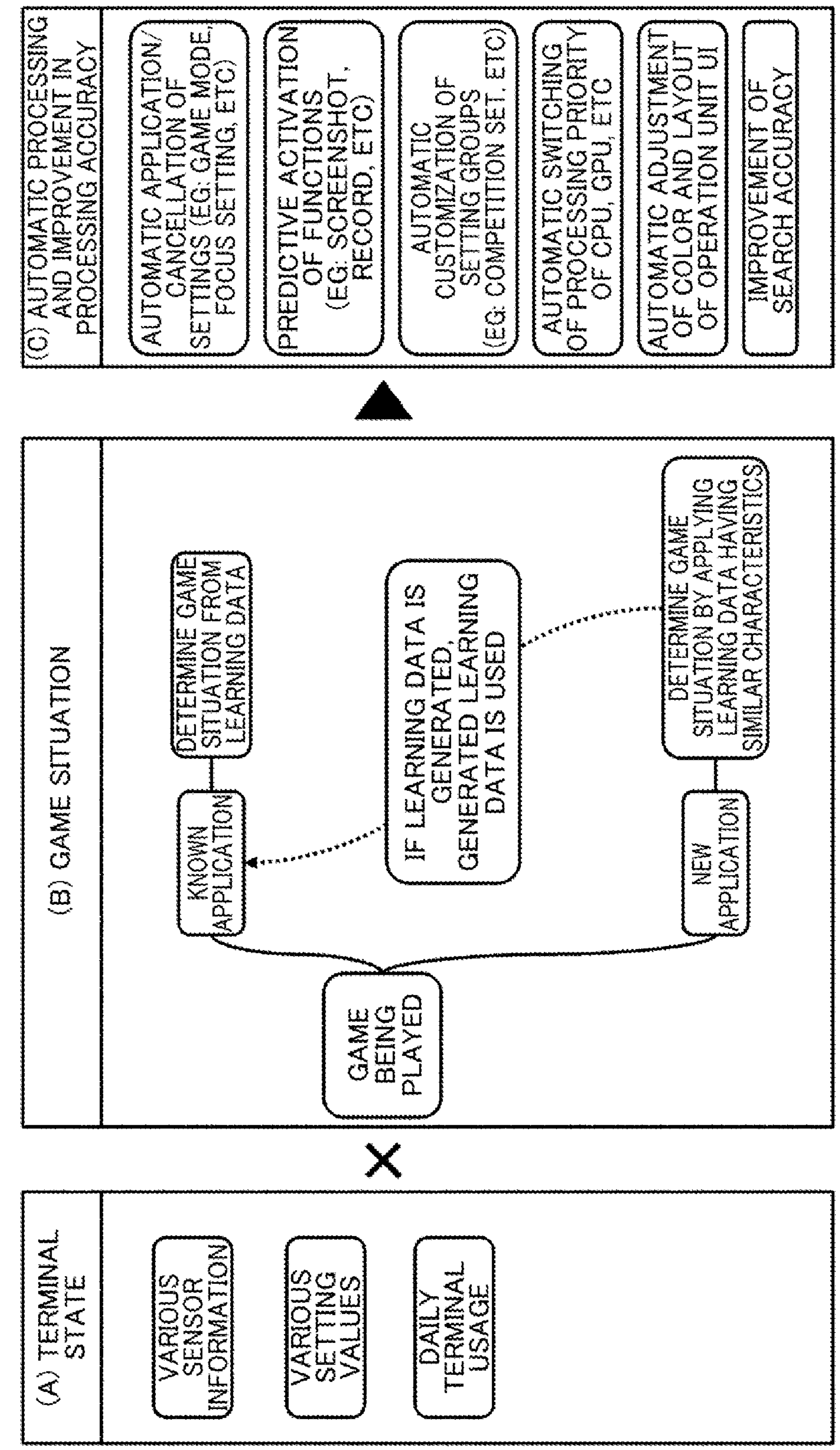
FIG. 17 is a diagram for explaining the data configuration and the like used for automatic processing according to the game situation and for improving processing accuracy.

FIG. 17 is a diagram for explaining a data configuration and the like used for automatic processing according to the game situation and improvement of processing accuracy.

The state of the information processing device 100, which is a user terminal, includes information on various sensors provided in the information processing device 100, various setting values, information on how the user uses the information processing device 100 on a daily basis, and the like.

For example, the game management server 210 acquires such information from the information processing device 100 for many users.

By using the information obtained from the information processing device 100 and the learning data described above, it is possible to estimate and determine the current game situation.

Then, it is possible to execute automatic processing according to the game situation and improve the processing accuracy.

Specifically, as shown in the figure, automatic application/cancellation of settings, predictive activation of functions, customization of setting groups, automatic switching of processing priority of CPU/GPU and the like, automatic adjustment of UI color and layout of operation unit UI, improvement of search accuracy, and the like can be realized.

Automatic application/cancellation of settings is processing of automatically applying or canceling specific settings in a specific situation of a specific game. Predictive activation of functions is processing of predicting and executing an operation function (for example, taking screenshots) performed by a user in a certain scene of a certain game.

Customization of setting groups is, for example, customization of a plurality of functions applied to the collective restriction settings described above.

For example, it is a setting of which functions are to be set collectively.

Automatic switching of processing priority of CPU/GPU and the like is processing of automatically switching the processing priority according to the game situation. Automatic adjustment of the UI color and layout of the operation unit UI is processing of automatically adjusting the color and layout of the operation unit UI according to the game situation to provide a user-friendly UI.

For example, even if the activation operation position of the operation unit UI is not set by the user, it is automatically set to an appropriate position.

Improvement of search accuracy is processing that makes it easier for the user to obtain a desired search result by setting the search range, filter setting, and the like according to the game situation.

By performing such processing, for example, it is possible to provide a more comfortable game environment for the user who uses the game application.

In addition to the configuration in which learning is performed by the game management server 210, a configuration in which learning is performed within the information processing device 100, which is the user terminal of each user, may be used.

3. Specific Examples of Learning Data Generation Processing and Optimal Control Using Generated Learning Data Next, a specific example of learning data generation processing and optimal control using the generated learning data will be described.

A plurality of processing examples below will be sequentially described.

(1) Processing example of applying learning data to disable camera activation switch during execution of game application
(2) Processing example of setting and resetting competition set that allows players to concentrate on game, such as non-display of notifications and incoming calls, fixed applications, non-display of navigation bar, and the like, and user touch insensitive body that disables user's touch on screen
(3) Processing example of executing screenshot and uploading screenshot image to SNS
(4) Processing example for controlling UI output mode
(5) Processing example for automatically executing search processing

3-(1) Processing Example of Applying Learning Data to Disable Camera Activation Switch During Execution of Game Application First, as a processing example (1), "(1) Processing example of applying learning data to disable camera activation switch during execution of game application" will be described.

For example, it is assumed that a user is executing one game application X using the information processing device 100, which is a user terminal. If the user accidentally touches and presses the camera activation switch on the side of the device main body during execution of the game application X, the camera is activated.

In this case, the game screen is switched to the image taken by the camera. The user may be surprised at the sudden switching of the screen to the image taken by the camera, and may hurriedly perform processing to restore the original game screen.

For example, for one game application X, when such an event (transition of terminal state) is transmitted from the information processing devices 100 of many users to the game management server 210, the game management server 210 learns that such an event (transition of terminal state) is an event unique to the game application X.

As a result of this learning, the game management server 210 concludes that there is a high possibility that the user will erroneously operate the camera activation switch during execution of the game application X and it is optimal control to turn off the camera activation switch during execution of the game application X and records the learning result as learning data.

This learning data generation processing sequence will be described with reference to FIG. 18 and the subsequent figures.

Figure 18:
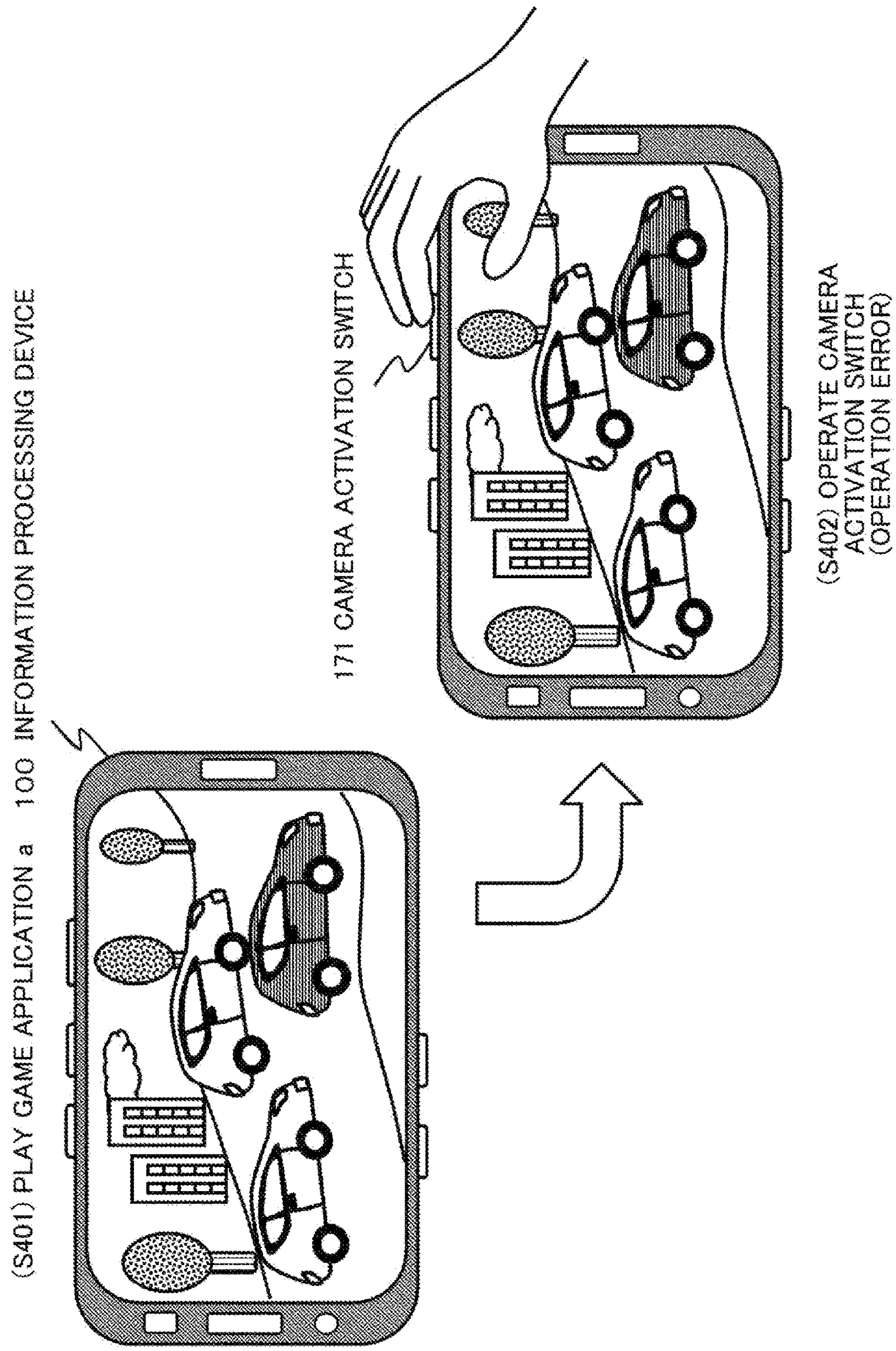
FIG. 18 is a diagram for explaining a learning data generation processing sequence.
Figure 19:
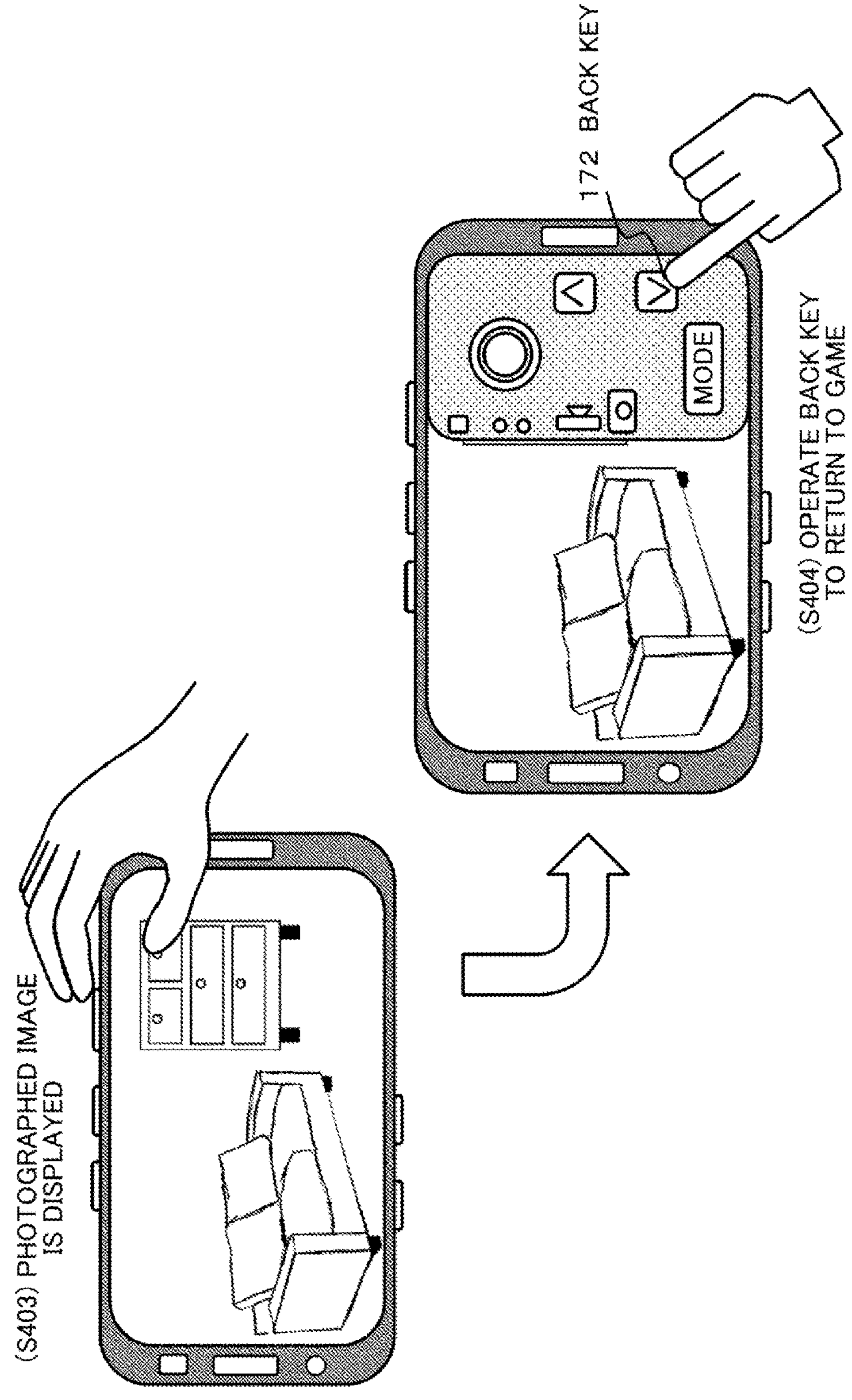
FIG. 19 is a diagram for explaining a learning data generation processing sequence.
Figure 20:
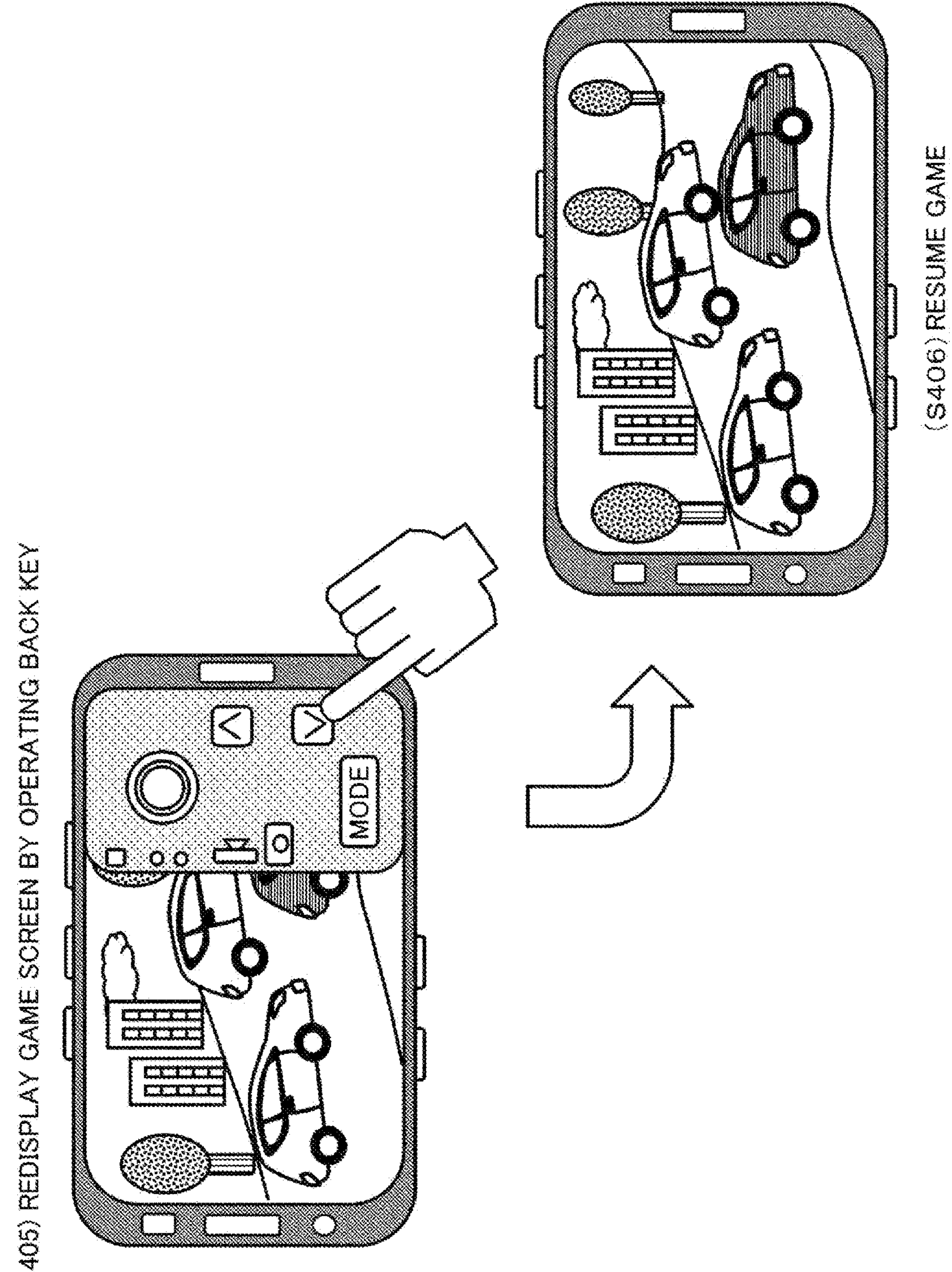
FIG. 20 is a diagram for explaining a learning data generation processing sequence.

Steps S401 to S406 shown in FIGS. 18 to 20 are diagrams for explaining state transitions in the information processing device 100 during learning data generation processing.

The terminal state information and the game situation in steps S401 to S406 shown in FIGS. 18 to 20 are sequentially transmitted from the information processing device 100 to the game management server 210, and the game management server 210 executes learning processing using the transmitted data.

Step S401 of FIG. 18 shows a state in which the game application a is being executed in the information processing device 100.

Step S402 in FIG. 18 shows a state in which the game application a in the information processing device 100 is executed, and the user touches the camera activation switch on the side of the information processing device 100 to activate the camera. It should be noted that this is an operation error by the user.

Step S403 in FIG. 19 shows a state in which the camera is activated and a photographed image is displayed.

Step S404 of FIG. 19 shows a state in which the user, knowing that the game screen has suddenly switched to a camera shooting screen, immediately displays the operation unit UI and operates the back key (an operation key for returning to the game) in order to return to the game.

Step S405 in FIG. 20 shows a state in which the game screen is redisplayed by the user operating the back key.

Step S406 in FIG. 20 shows a state in which the user resumes the game after viewing the redisplayed game screen.

The game management server 210 receives the terminal state information and the game situation information in steps S401 to S406 shown in FIGS. 18 to 20 from the information processing device 100 via a communication network and executes learning processing for estimating the optimal control based on the received data.

Figure 21:
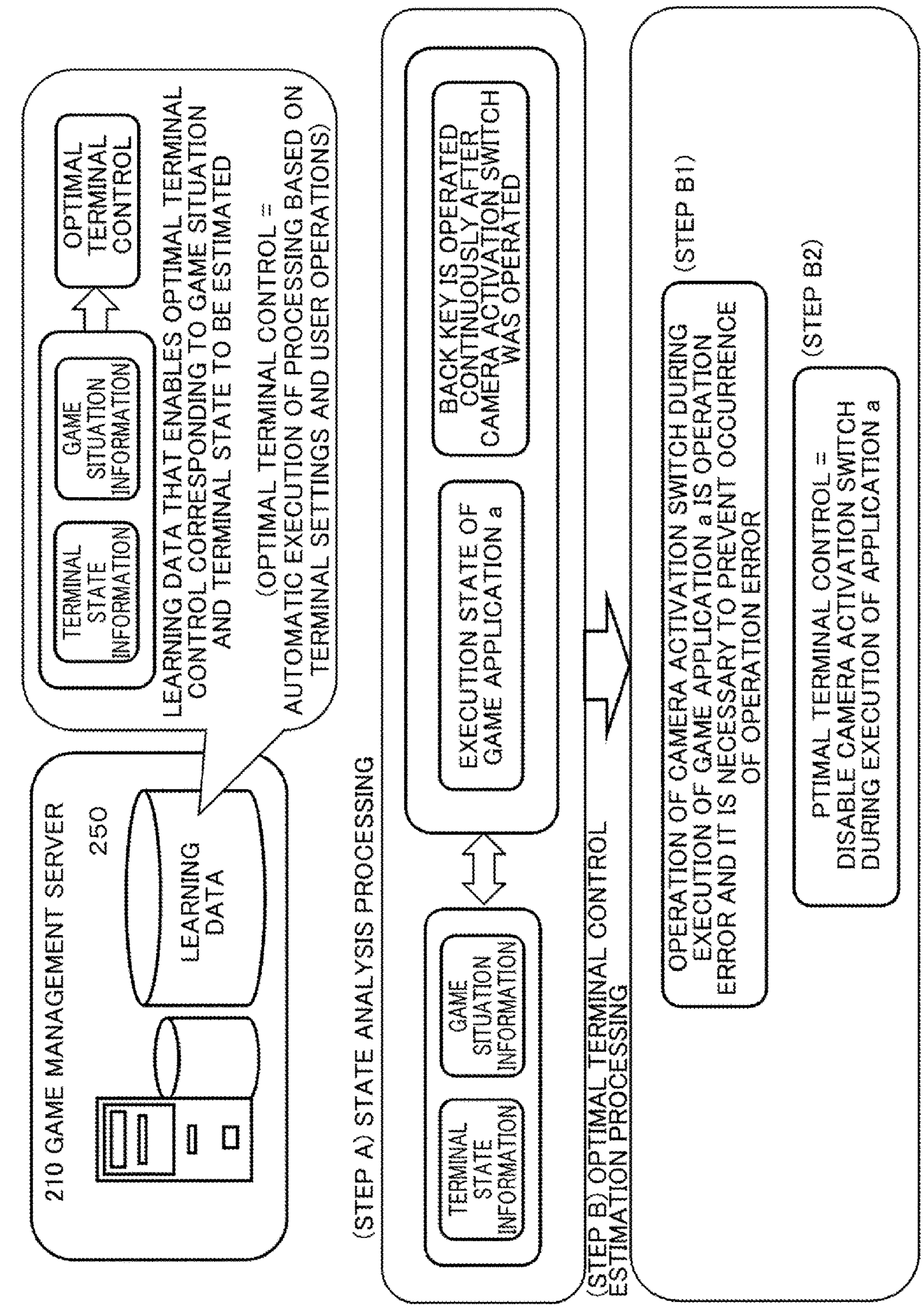
FIG. 21 is a diagram for explaining an example of learning processing in the game management server.

FIG. 21 is a diagram for explaining an example of learning processing in the game management server 210.

The game management server 210 sequentially receives the terminal state information and the game situation information in steps S401 to S406 shown in FIGS. 18 to 20.

Note that the game management server 210 receives the terminal state information and the game situation information similar to steps S401 to S406 from many user terminals, and generates learning data based on the large number of pieces of received information.

The learning data is learning data corresponding to the same game application a, and is learning data in which the terminal state and the optimal control based on the game situation are associated with each other, as shown on the upper right side of FIG. 21.

First, the game management server 210 executes analysis processing of analyzing data received from the information processing device 100 as step A shown in FIG. 21. As a result of analysis, it is analyzed that the following state transitions have occurred.

(a) The information processing device is executing the game application a.

(b) The camera activation switch is operated in the information processing device, and after the camera is activated, the back key is continuously operated to return to the game screen.

The game management server 210 checks that this state transition has occurred in many information processing devices.

Next, the game management server 210 estimates the optimal control of the terminal as step B. As shown in the figure, the following optimal control estimation processing is performed.

First, in step B1, the game management server 210 estimates that the operation of the camera activation switch during execution of the game application a is an operation error, and that it is necessary to prevent the occurrence of the operation error.

Next, in step B2, it is determined that the optimal control of the terminal is to "disable the camera activation switch during execution of application a".

That is, the game management server 210 registers the following data as learning data.

Input value (terminal state information, game state information)=game application a being executed Output value (optimal control information)=disabling of camera activation switch Registration data in which such an input value (terminal state information, game situation information) and such an output value (optimal control information) are associated is stored in the storage unit as learning data.

The control unit of the information processing device 100 executes optimal control processing based on this learning data.

Figure 22:
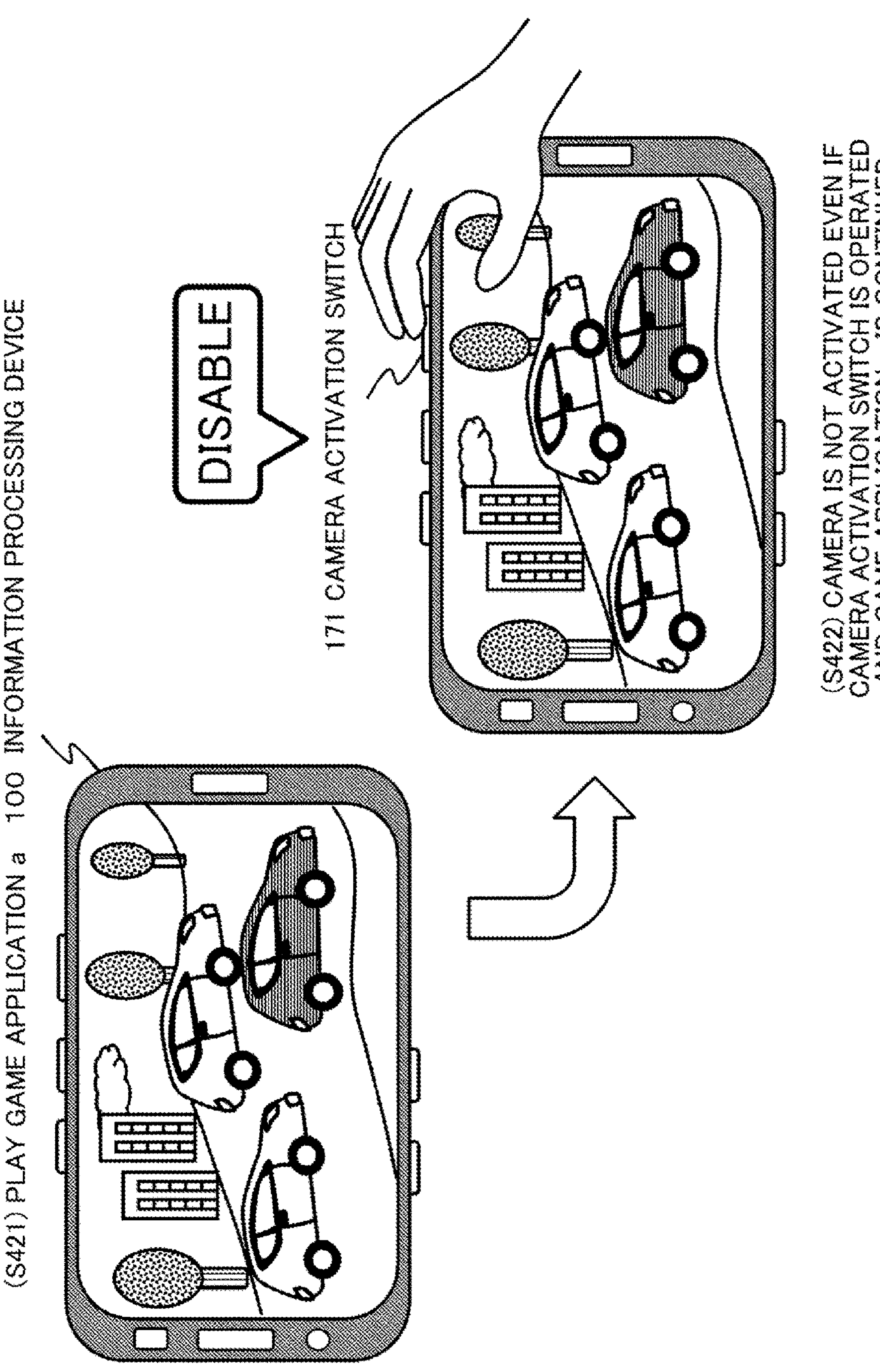
FIG. 22 is a diagram for explaining processing executed by an information processing device based on registered learning data.

FIG. 22 is a diagram showing processing executed by the information processing device 100 based on registered learning data.

Step S421 in FIG. 22 shows a state in which the game application a is being executed in the information processing device 100.

The control unit 110 of the information processing device 100 sequentially acquires the terminal state and game situation of the information processing device 100 that is executing the game application a. This acquired data is current information, that is, real-time information.

The control unit of the information processing device 100 detects that "the game application a is being executed" based on the acquired information.

Based on this input, the control unit of the information processing device 100 performs search processing of searching registration data of learning data, and selects matching or similar registration data (terminal state, game situation). Furthermore, the optimal control information registered in association with the selected registration data is acquired and executed.

As described above, the following data is registered in the game management server 210 as learning data.

Input value (terminal state information, game state information)=game application a being executed Output value (optimal control information)=disabling of camera activation switch The control unit of the information processing device 100 has acquired "the game application a being executed" as the real-time terminal state information and the game situation information of the information processing device 100, and selects learning data in which an input value that matches or is similar to this real-time acquired information is set. That is, the following learning data is selected.

Input value (terminal state information, game state information)=game application a being executed Output value (optimal control information)=disabling of camera activation switch Furthermore, the control unit of the information processing device 100 controls the information processing device 100 according to the data registered as the output value of the selected learning data, that is, Output value (optimal control information)=disabling of camera activation switch That is, the camera activation switch of the information processing device 100 is disabled.

This state is the state shown in step S422 in FIG. 22.

In this manner, the control unit 110 of the information processing device 100 executes the processing of disabling the camera activation switch as optimal control for the information processing device 100 based on the learning data.

As a result, even if the user accidentally operates the camera activation switch on the side of the information processing device 100 during execution of the game application a, the camera is not activated and the game application a can be continuously executed (played).

3-(2) Processing Examples of Setting and Resetting Competition Set That Allows Players to Concentrate on the Game, Such as Non-Display of Notifications and Incoming Calls, Fixed Applications, Non-Display of the Navigation Bar, and the Like, and User Touch Insensitive Body That Disables User'S Touch on Screen Next, as a processing example (2), "(2) Processing examples of setting and resetting competition set that allows players to concentrate on the game, such as non-display of notifications and incoming calls, fixed applications, non-display of the navigation bar, and the like, and user touch insensitive body that disables user's touch on screen" will be described.

Figure 23:
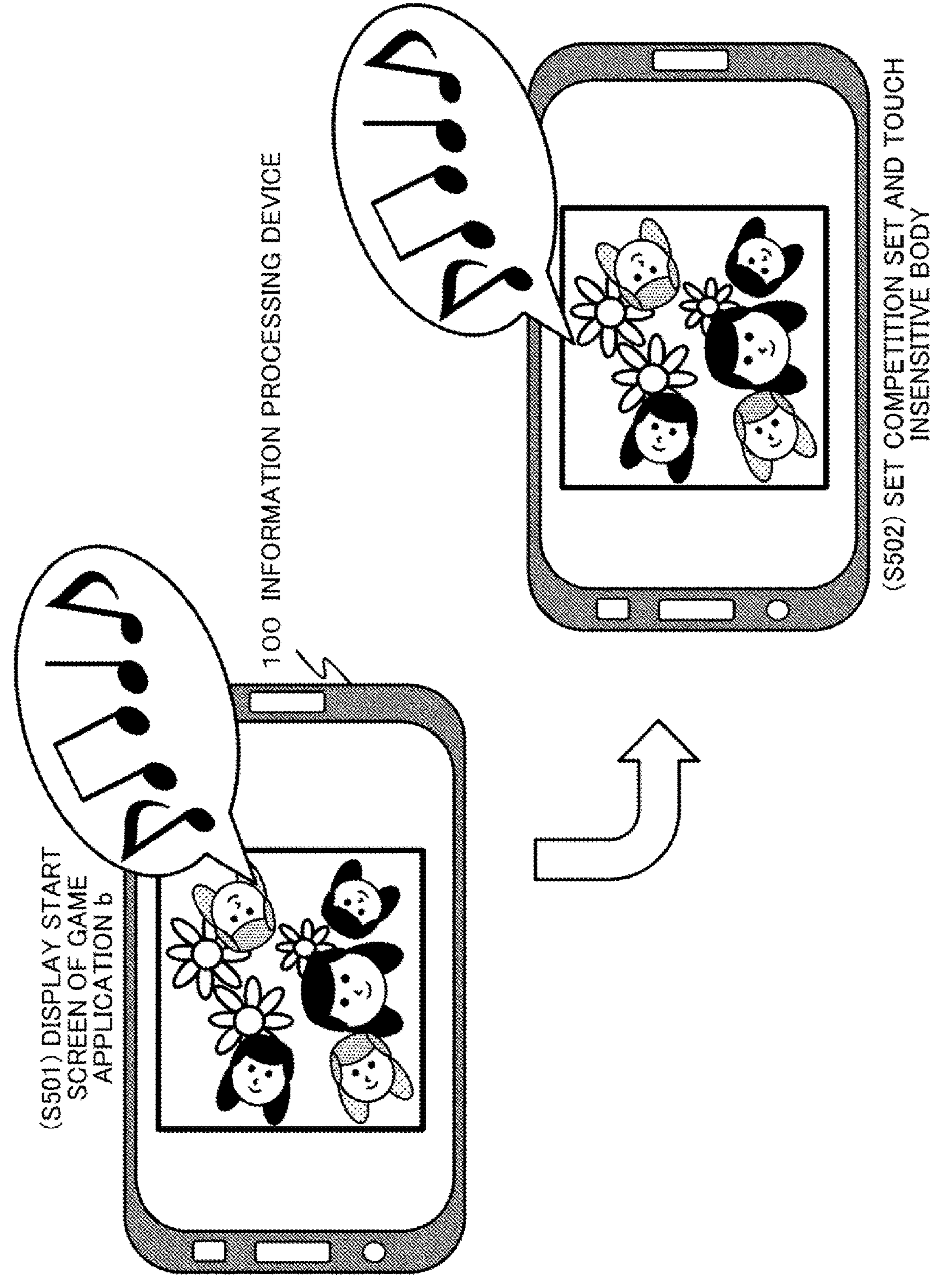
FIG. 23 is a diagram for explaining a processing sequence of optimal control processing based on already generated learning data corresponding to a game application.
Figure 24:
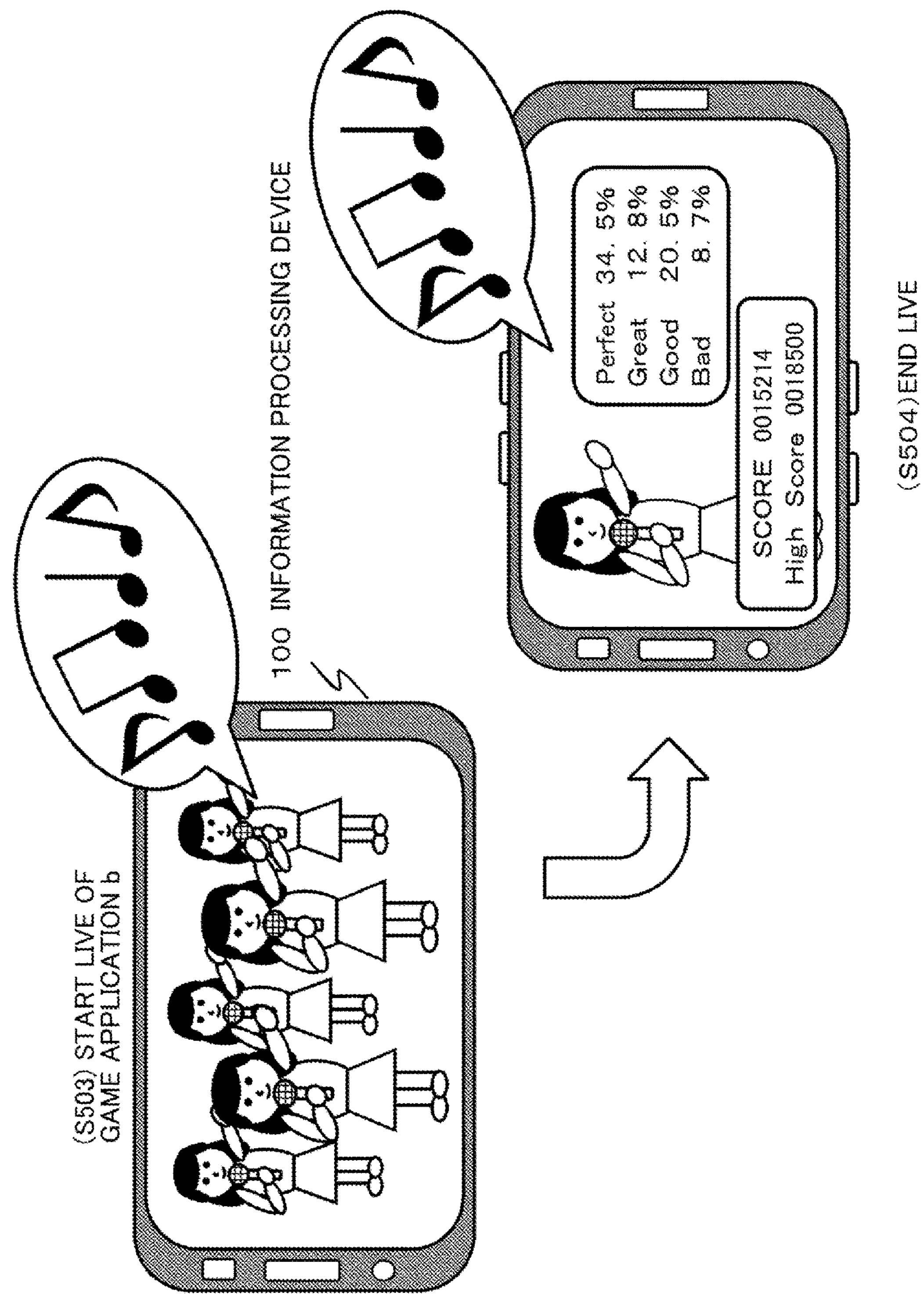
FIG. 24 is a diagram for explaining a processing sequence of optimal control processing based on already generated learning data corresponding to a game application.
Figure 25:
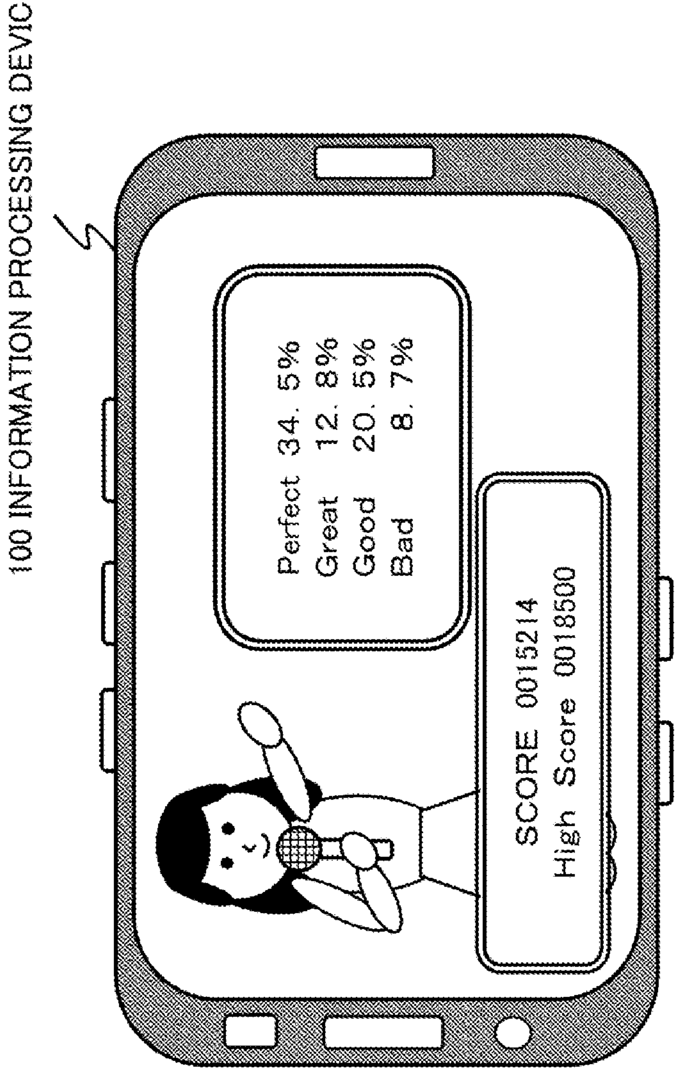
FIG. 25 is a diagram for explaining a processing sequence of optimal control processing based on already generated learning data corresponding to a game application.

Steps S501 to S505 shown in FIGS. 23 to 25 show diagrams for explaining the processing sequence of the optimal control processing based on the already generated learning data corresponding to the game application b.

The already generated learning data corresponding to the game application b has the following data.

Input value (terminal state information, game state information)=game application b being executed Output value (optimal control information)=competition set and setting of touch insensitive body The competition set is setting processing that allows players to concentrate on a game, such as non-display of notifications and incoming calls, fixed applications, non-display of navigation bar, and the like.

The setting of a touch insensitive body is setting processing of disabling the user's touch.

Both are processing for setting a mode in which the player can concentrate on the game.

This learning data, that is, the learning data composed of the following correspondence data is generated based on the observation data of a situation in which, when many users execute the game application b, processing of setting the competition set and the user touch insensitive body is performed in advance.

Input value (terminal state information, game state information)=game application b running Output value (optimal control information)=competition set and setting of touch insensitive body Steps S501 to S505 shown in FIGS. 23 to 25 describe the processing sequence of the optimal control processing based on the learning data corresponding to the game application b thus generated.

Step S501 in FIG. 23 shows a state in which the start screen of the game application b is displayed.

The control unit 110 of the information processing device 100 detects the state in which the start screen of the game application b is displayed.

This processing of detecting the start screen of the game application b is performed based on, for example, processing of monitoring the execution state of the game application b by the control unit 110, screen analysis processing of analyzing the screen displayed on the display unit of the information processing device 100, and the like.

When the control unit 110 of the information processing device 100 detects the state in which the start screen of the game application b is displayed, the control unit 110 automatically executes the processing of setting the competition set and the user touch insensitive body in step S502.

By automatically executing the processing of setting the competition set and the user touch insensitive body, the user can save the trouble of performing the setting processing, and the game application b can be started immediately.

Step S503 shown in FIG. 24 shows the execution state of a live event (a mode in which a character displayed on the screen sings and dances to music), which is a specific event of the game application b.

In this state, the processing of setting the competition set and the user touch insensitive body is completed.

As described above, the competition set is setting processing that allows players to concentrate on the game, such as non-display of notifications and incoming calls, fixed applications, non-display of the navigation bar, and the like.

The setting of a touch insensitive body is setting processing of disabling user's touches.

Both are processing for setting a mode in which the player can concentrate on the game.

Since these settings have already been completed at the execution time of the live of the game application b in FIG. 24 (step S503), the user can play the game while concentrating on the live of the game application b.

Step S504 shown in FIG. 24 shows the display state of the end screen of the live of the game application b.

The control unit 110 of the information processing device 100 detects a state in which the end screen of the live of the game application b is displayed.

The processing of detecting the end screen of the live of the game application b is performed based on, for example, the processing of monitoring the execution state of the game application b, the screen analysis processing of analyzing the screen displayed on the display unit of the information processing device 100, and the like.

Upon detecting that the end screen of the live of the game application b has been displayed, as shown in FIG. 25 (step S505), the control unit 110 of the information processing device 100 automatically execute the reset processing for restoring the processing of setting the competition set and the user touch insensitive body.

In this way, based on the learning data, the competition set and the user touch insensitive body are automatically set to the set state only when the live of the game application b is executed, and the user can concentrate on the game when the live of the game application b is executed.

3-(3) Processing Example of Executing Screenshot and Uploading Screenshot Image to SNS Next, as a processing example (3), "(3) processing example of executing screenshot and uploading screenshot image to SNS" will be described.

First, with reference to FIG. 26 and subsequent figures, a learning data generation processing sequence corresponding to this processing example (3) will be described. Steps S521 to S526 shown in FIGS. 26 to 28 are diagrams for explaining state transitions in the information processing device 100 during the learning data generation processing.

Figure 26:
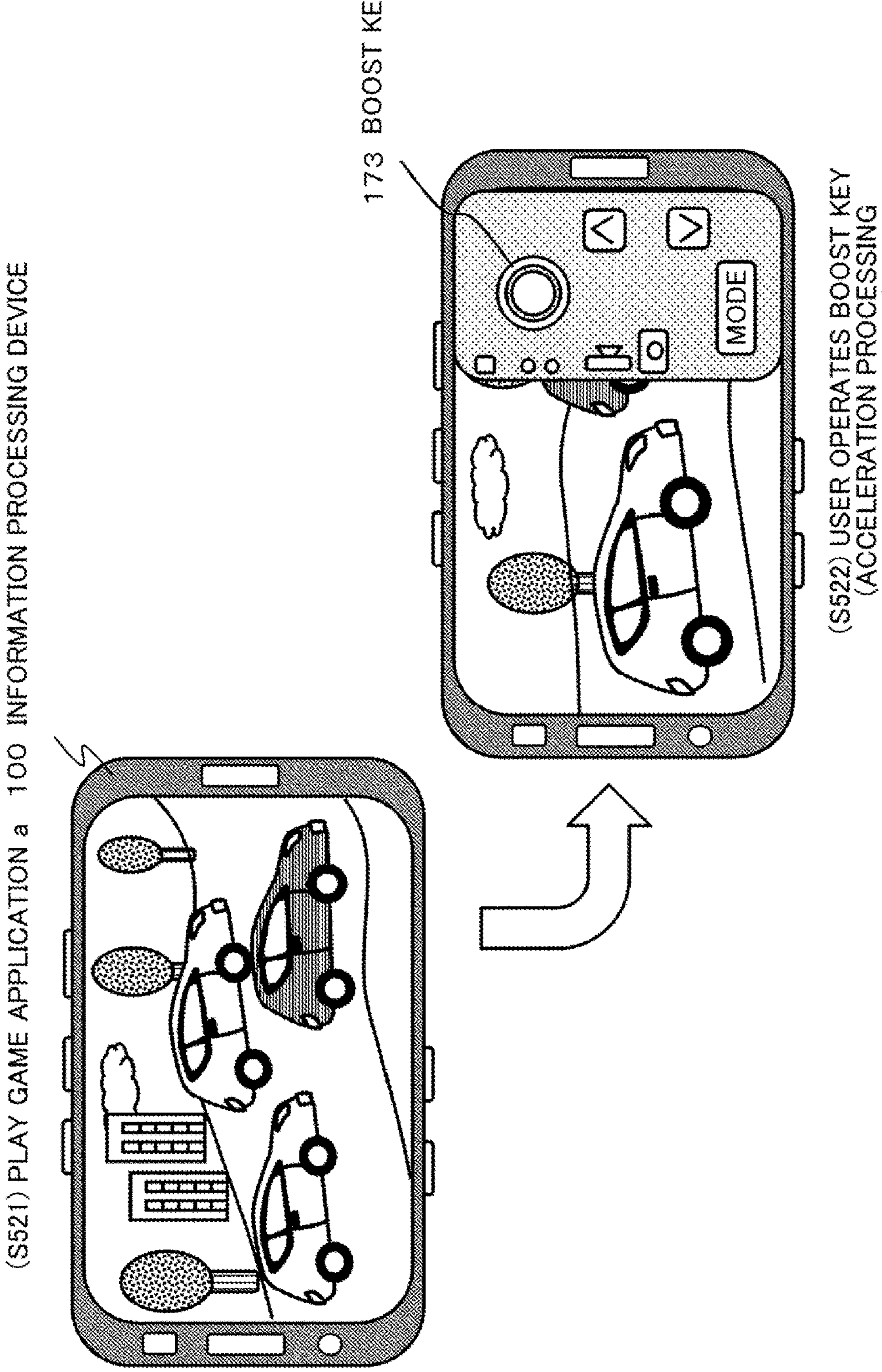
FIG. 26 is a diagram for explaining a learning data generation processing sequence.
Figure 27:
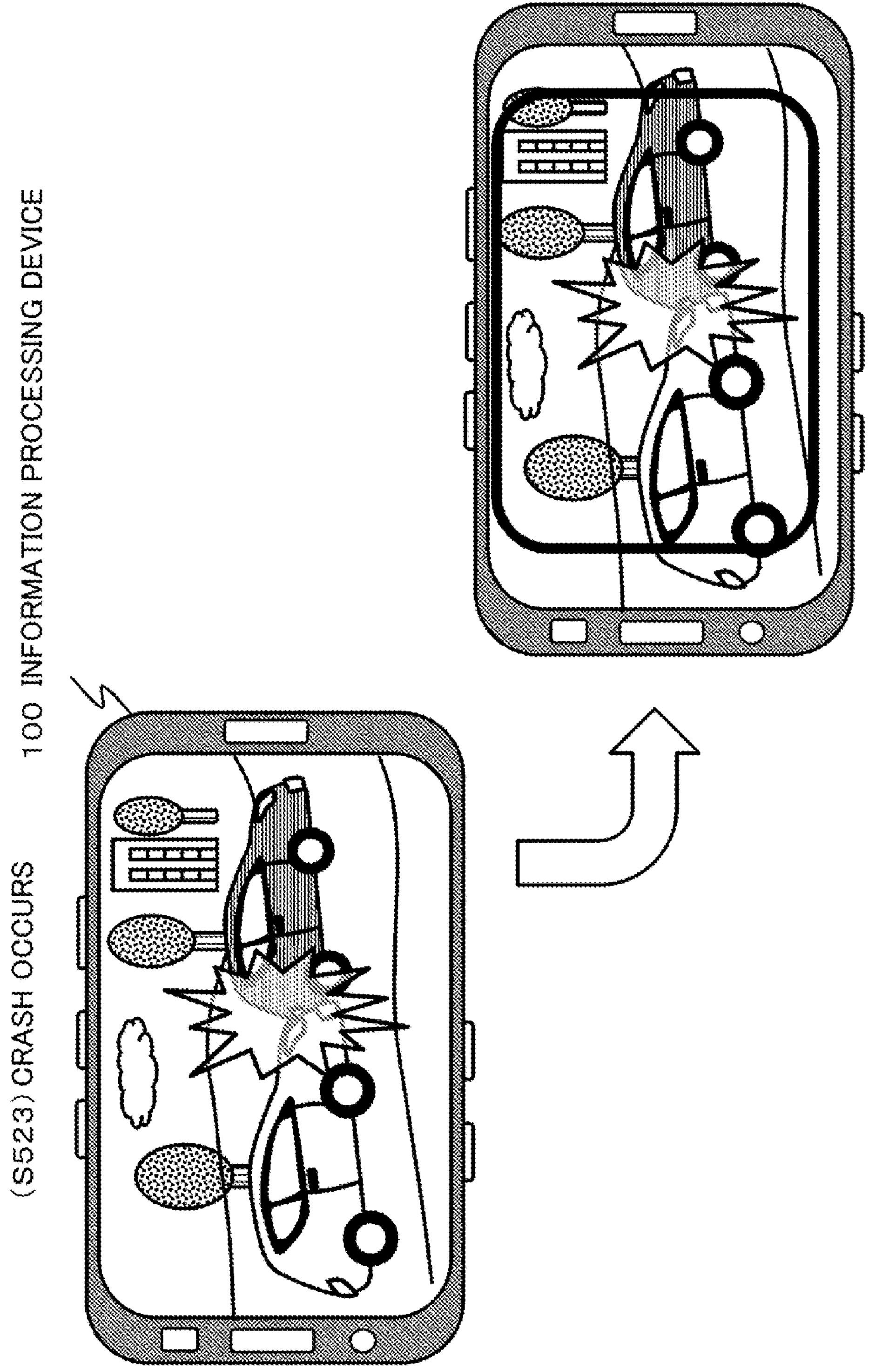
FIG. 27 is a diagram for explaining a learning data generation processing sequence.
Figure 28:
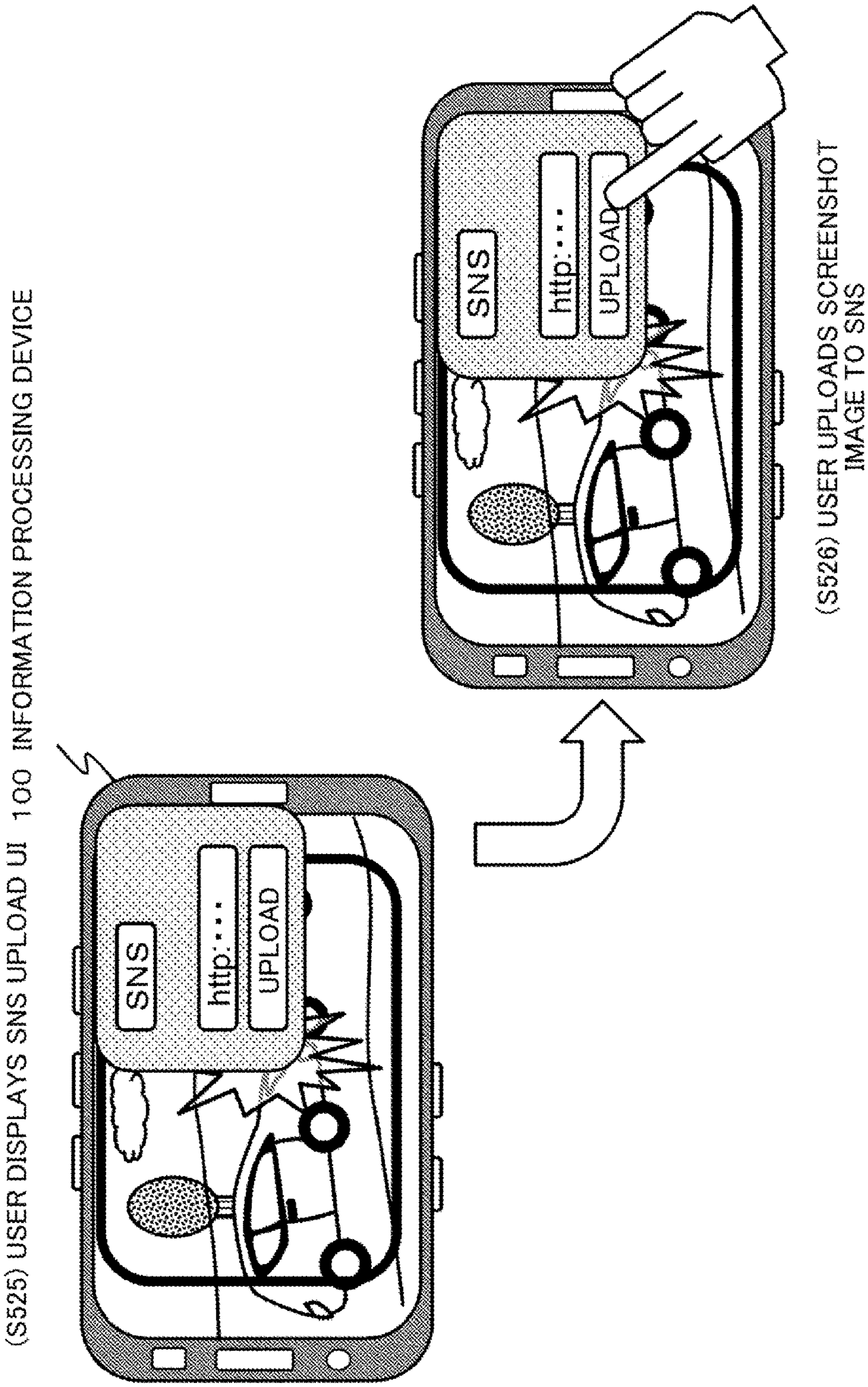
FIG. 28 is a diagram for explaining a learning data generation processing sequence.

The terminal state information and the game situation in steps S521 to S526 shown in FIGS. 26 to 28 are sequentially transmitted from the information processing device 100 to the game management server 210, and the game management server 210 executes learning processing using the transmitted data.

Step S521 in FIG. 26 shows a state in which the game application a is being executed in the information processing device 100.

Step S522 of FIG. 26 is a diagram showing a state in which the game application a in the information processing device 100 is executed, and the user displays the operation unit UI and operates the boost key 173 set on the operation unit UI.

The boost key 173 is processing for accelerating the user's own car participating in a car race being held in the game application a.

Note that the boost key 173 may be superimposed and displayed on the game application execution screen under the control of the game application a itself, instead of being displayed on the operation unit UI.

Step S523 in FIG. 27 shows a state in which cars participating in a car race in the game application a have crashed.

Step S524 in FIG. 27 shows a state in which the user has taken a screenshot of the crash scene.

FIG. 28 (step S525) is a diagram showing a state in which an operation unit UI for uploading an image taken as a screenshot to an SNS is displayed.

FIG. 28 (step S526) shows a state in which an icon in the displayed operation unit UI is operated to upload a screenshot image to the SNS.

The game management server 210 receives the terminal state information and the game situation information in steps S521 to S526 shown in FIGS. 26 to 28 from the information processing device 100 via a communication network and executes learning processing for estimating the optimal control based on the received data.

First, the game management server 210 executes analysis processing of analyzing the data received from the information processing device 100.

As a result of the analysis, it is analyzed that the user has operated the boost key during execution of the game application a to accelerate the car, and a screenshot was taken at the crash scene, and the screenshot image was uploaded to the SNS. It is analyzed that these state transitions have occurred.

The game management server 210 checks that this state transition has occurred in many information processing devices.

The game management server 210 then estimates the optimal control of the terminal.

An example of a transition observed as a transition of the terminal state or game state is as follows.

Occurrence of crash during execution of game application a→screenshot execution→SNS upload of screenshot image Based on the fact that these state transitions occur in many information processing devices (user terminals), the game management server 210 performs the following optimal control processing when a crash occurs during execution of the game application a.

Optimal control="execute screenshot and upload screenshot image to SNS"

That is, the game management server 210 registers the following data as learning data.

Input value (terminal state information, game state information)=crash occurred during execution of game application a Output value (optimal control information)=execution of screenshot and uploading of screenshot image to SNS Registration data in which such an input value (terminal state information, game situation information) and such an output value (optimal control information) are associated is stored in the storage unit as learning data.

As another example, learning data indicating that "when the boost key is operated, a screenshot is taken and the screenshot image is uploaded to the SNS" may be registered. In this case, the following data is registered as learning data.

Input value (terminal state information, game situation information)=detection of boost key operation during execution of game application a Output value (optimal control information)=execution of screenshot and uploading of screenshot image to SNS Furthermore, as another example, learning data indicating that "only a screenshot is executed when the boost key is operated" may be registered. In this case, the following data is registered as learning data.

Input value (terminal state information, game situation information)=detection of boost key operation during execution of game application a Output value (optimal control information)=screenshot execution The control unit of the information processing device 100 executes optimal control processing, for example, based on these pieces of learning data.

Figure 29:
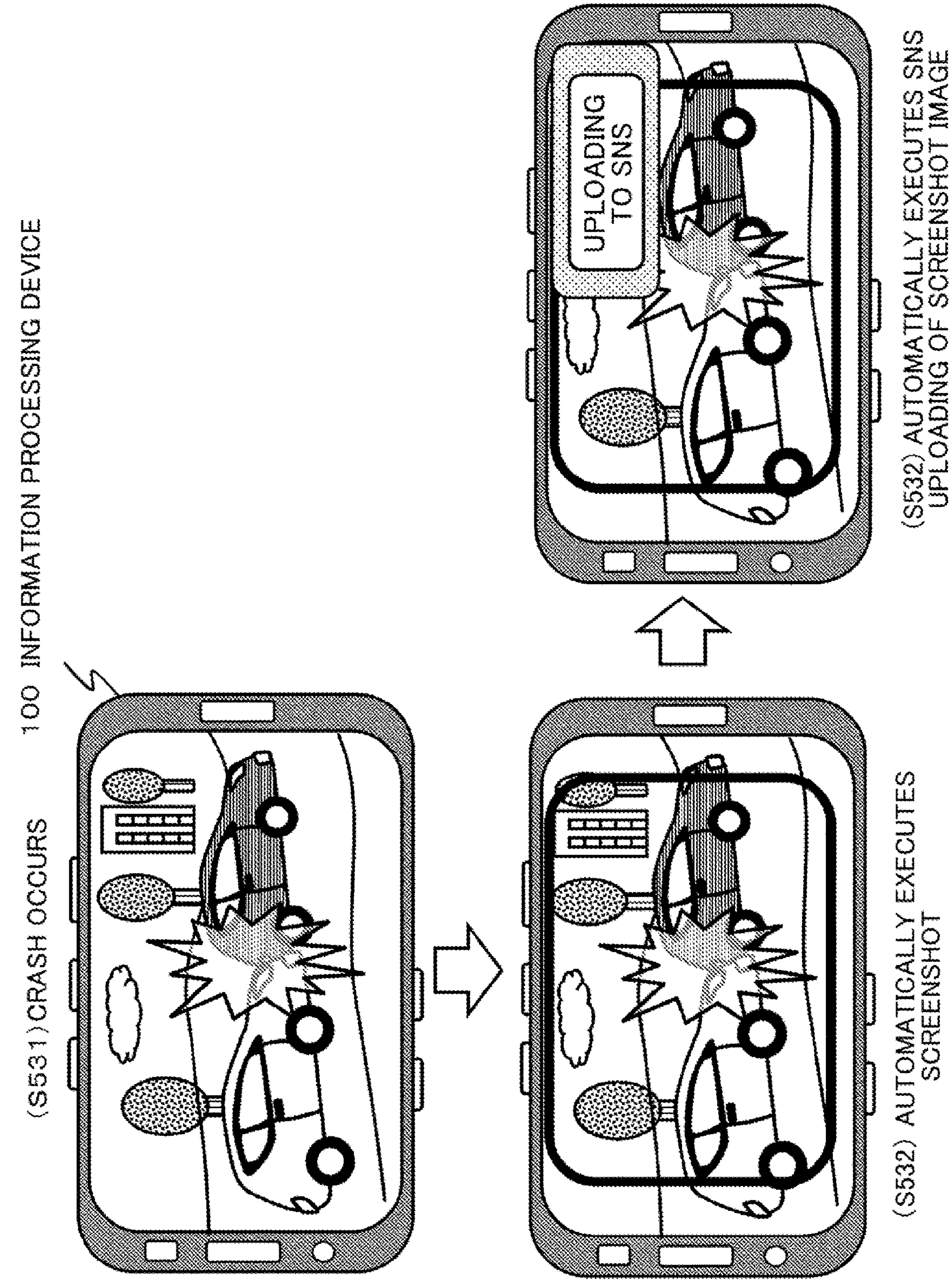
FIG. 29 is a diagram for explaining processing executed by an information processing device based on registered learning data.

FIG. 29 is a diagram showing processing executed by the information processing device 100 based on registered learning data.

FIG. 29 (step S531) shows a state in which a crash has occurred during execution of the game application a in the information processing device 100.

The control unit 110 of the information processing device 100 sequentially acquires the terminal state and game situation of the information processing device 100 that is executing the game application a. This acquired data is current information, that is, real-time information.

The control unit of the information processing device 100 detects that "a crash has occurred during execution of the game application a" based on these pieces of acquired information.

Based on this input, the control unit of the information processing device 100 performs search processing of searching registration data of the learning data and selects matching or similar registration data (terminal state, game situation). Furthermore, the optimal control information registered in association with the selected registration data is acquired and executed.

As described above, the following data is registered in the game management server 210 as learning data.

Input value (terminal state information, game state information)=crash occurred during execution of game application a Output value (optimal control information)=execution of screenshot and uploading of screenshot image to SNS The control unit of the information processing device 100 has acquired "a crash has occurred during execution of the game application a" as the real-time terminal state information and the game situation information of the information processing device 100, and selects learning data in which an input value that matches or is similar to this real-time acquired information is set. That is, the following learning data are selected.

Input value (terminal state information, game state information)=crash occurred during execution of game application a Output value (optimal control information)=execution of screenshot and uploading of screenshot image to SNS Furthermore, the control unit of the information processing device 100 controls the information processing device 100 according to the data registered as the output value of the selected learning data, that is, Output value (optimal control information)=execution of screenshot and uploading of screenshot image to SNS That is, in the information processing device 100, a screenshot is taken, and then processing of uploading the screenshot image to the SNS is executed.

This processing state is the state shown in steps S532 and S524 in FIG. 29.

In this way, the control unit 110 of the information processing device 100 executes the screenshot and the processing of uploading the screenshot image to the SNS as optimal control for the information processing device 100 based on the learning data.

As a result, when a crash occurs during the execution of the game application a, the user does not need to perform an operation for taking a screenshot or an operation for uploading the screenshot image to the SNS, but this processing is executed automatically.

Therefore, the user can concentrate on executing (playing) the game application a.

3-(4) Processing Example for Controlling UI Output Mode

Next, as a processing example (4), "(4) processing example for controlling UI output mode" will be described.

Various UIs may be displayed on the game application execution screen while the game application is being executed in the information processing device 100.

A specific example will be described with reference to FIG. 30.

Figure 30:
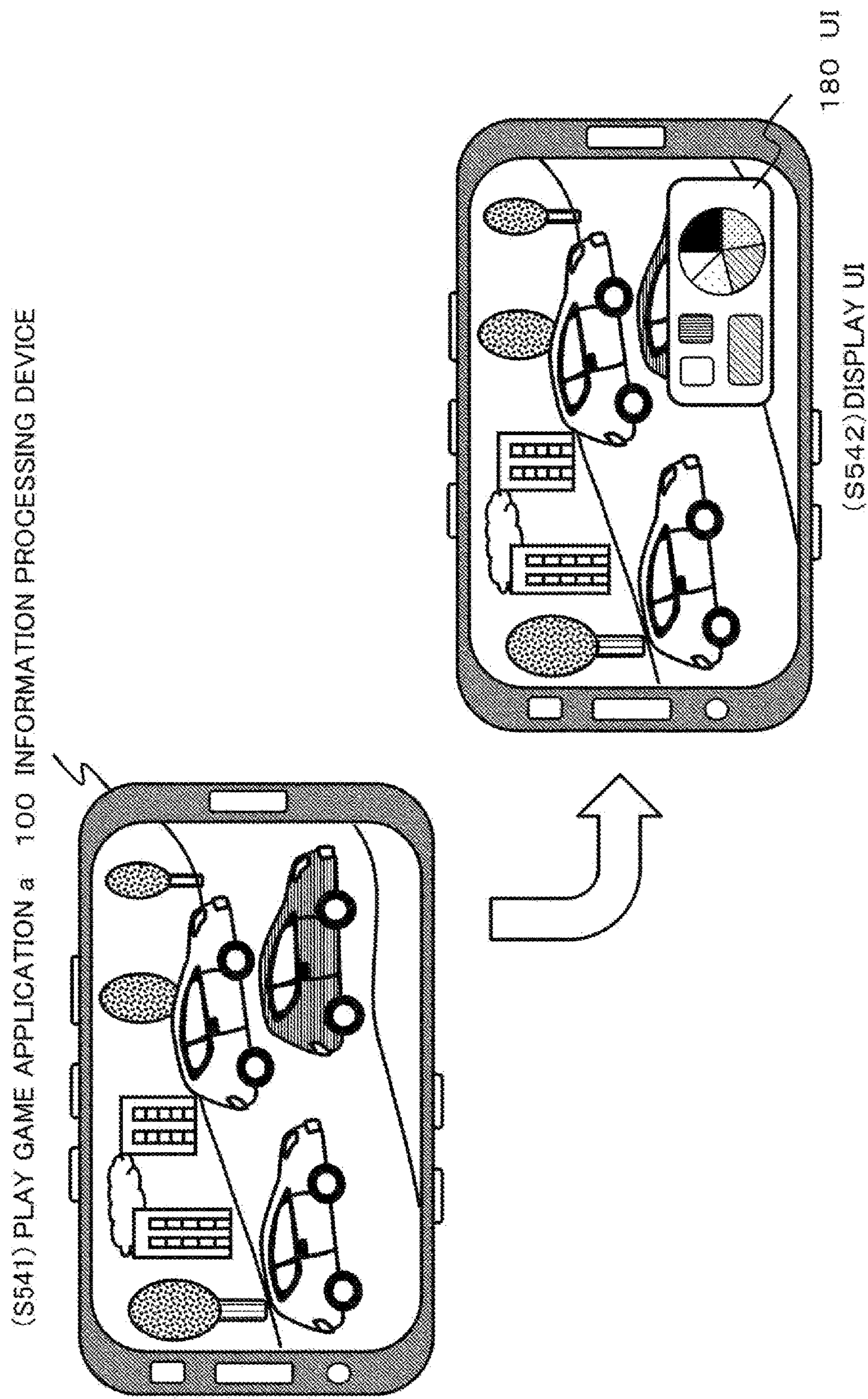
FIG. 30 is a diagram for explaining an example of a UI displayed on a game application execution screen.

Step S541 in FIG. 30 shows the execution state of the game application a. The game application a is a car racing game application, and displays cars participating in the race.

Step S542 shows an example of displaying the UI 180 during execution of the game application a.

The display position of the UI 180 shown in the figure is displayed above the car participating in the car race of the game application a, which is in a very obstructive position for the user.

The game management server 210 registers, as learning data, an optimal UI display mode according to the game situation of the game application a, for example.

The optimal display mode of the UI in the game application a, which is a car racing game application, is to display the UI at a position that does not overlap the cars participating in the car race and with the background not hidden.

Figure 31:
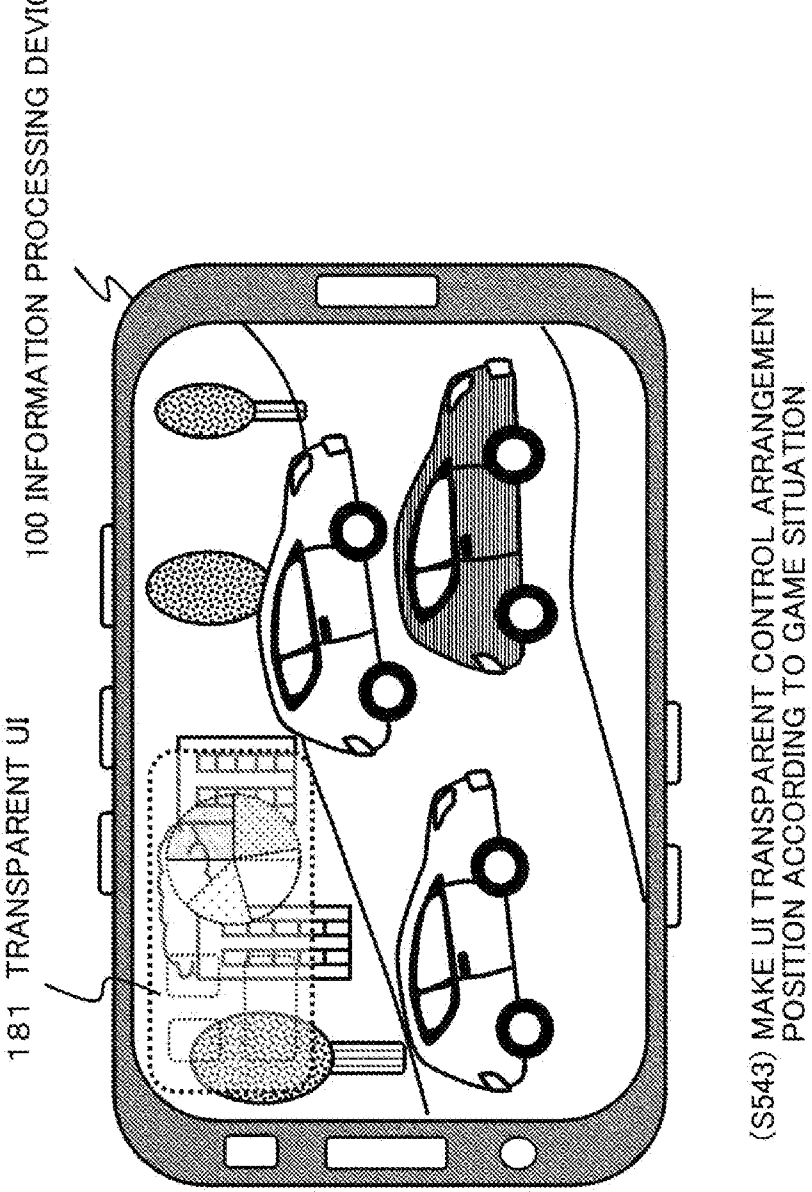
FIG. 31 is a diagram for explaining a control example when displaying a UI on the game application execution screen.

Specifically, for example, as shown in FIG. 31, a transparent UI 181 is displayed at a position that does not overlap the cars participating in the car race.

The game management server 210 registers, as learning data corresponding to the game application a, an optimal UI display mode according to the game situation. First, the control unit 110 of the information processing device 100 acquires the game situation (real-time information) of the game application a during execution of the game application a, and acquires the optimal UI display mode (color, transparency, position, and the like) according to the acquired game situation from the learning data.

Further, the control unit 110 of the information processing device 100 controls the display of the UI according to the appropriate UI display mode (color, transparency, position, and the like) acquired from the learning data.

As a result, the user can execute the game application a without being disturbed by the UI.

3-(5) Processing Example for Automatically Executing Search Processing

Next, "(5) processing example for automatically executing search processing" will be described as processing example (5).

For example, search processing may be executed in order to search for information related to the game application Z while the game application Z is being executed in the information processing device 100 or after the execution of the game application Z is finished.

Processing example (5) is a processing example of automatically executing such search processing.

First, with reference to FIG. 32 and subsequent figures, a learning data generation processing sequence corresponding to this processing example (5) will be described. Steps S551 to S556 shown in FIGS. 32 to 34 are diagrams for explaining state transitions in the information processing device 100 during the learning data generation processing.

Figure 32:
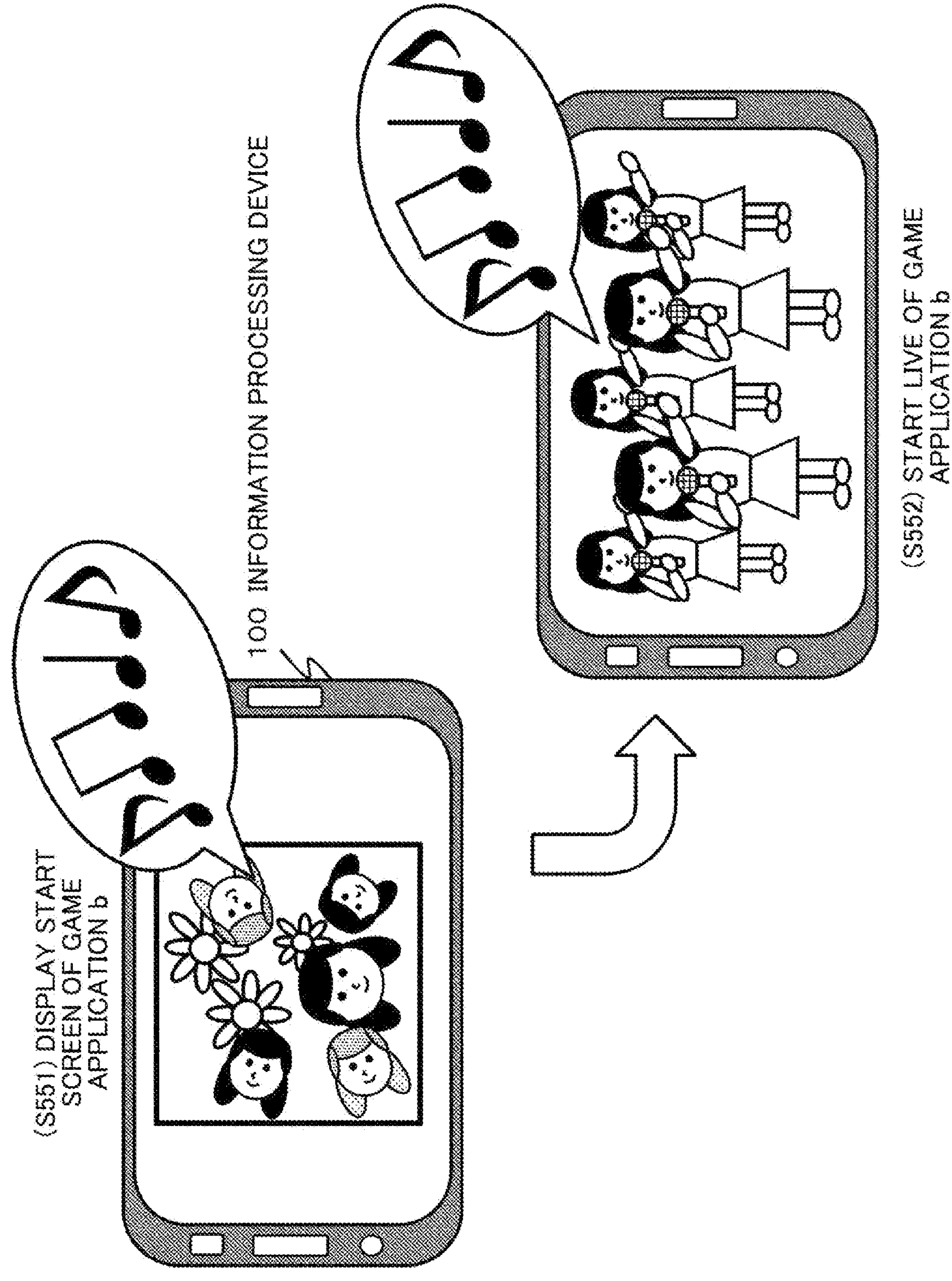
FIG. 32 is a diagram for explaining a learning data generation processing sequence.
Figure 33:
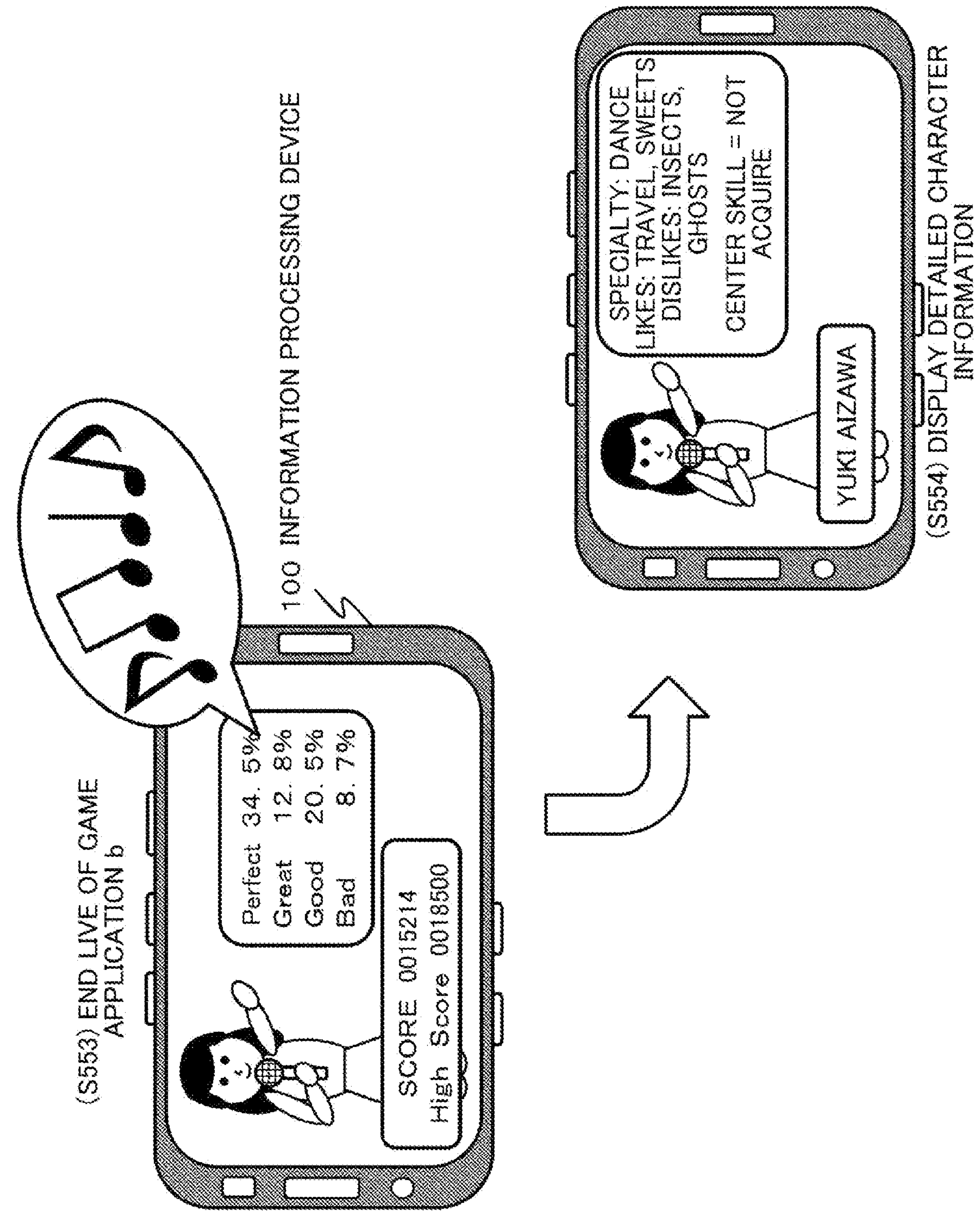
FIG. 33 is a diagram for explaining a learning data generation processing sequence.
Figure 34:
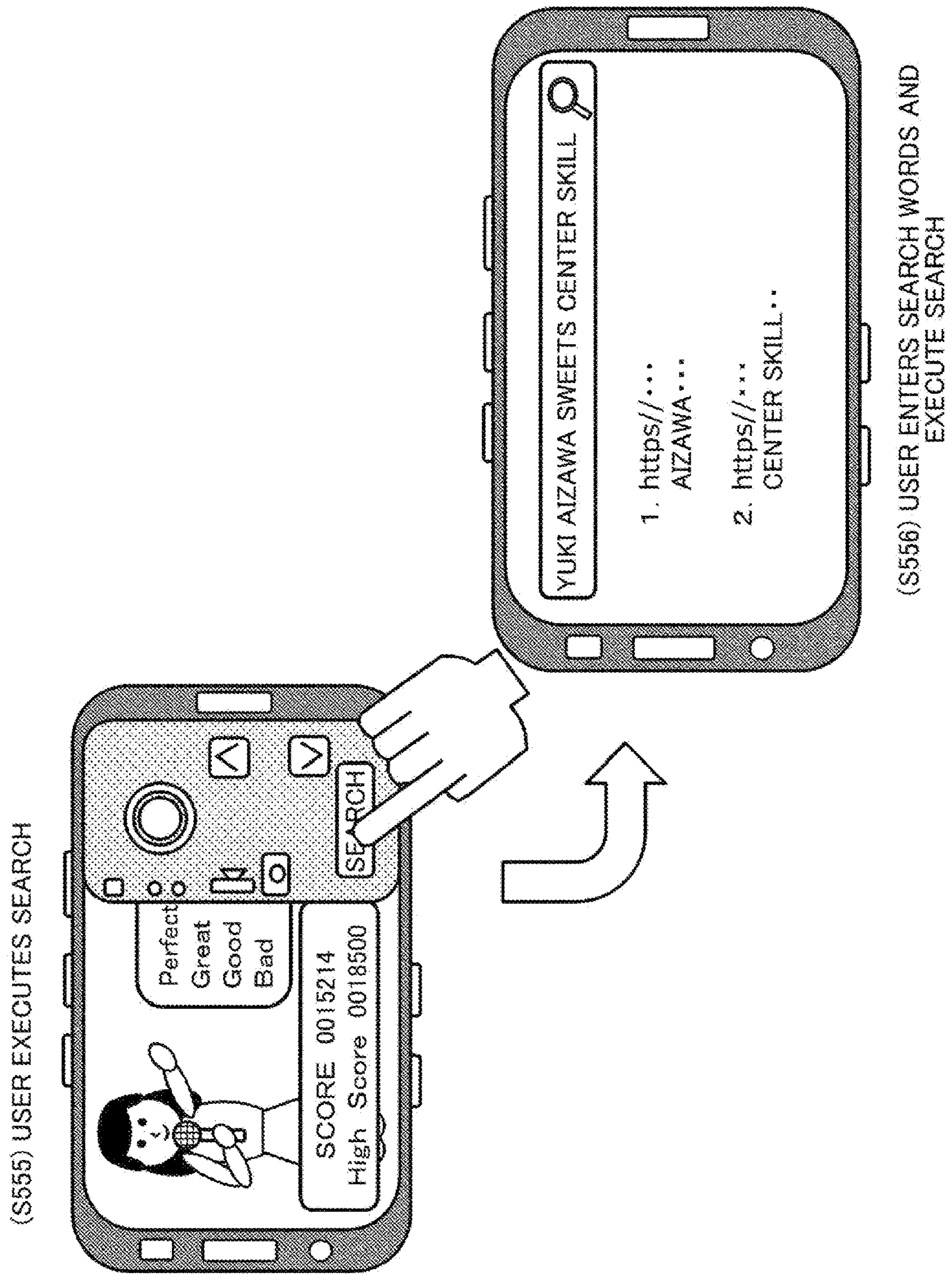
FIG. 34 is a diagram for explaining a learning data generation processing sequence.

The terminal state information and the game situation in steps S551 to S556 shown in FIGS. 32 to 34 are sequentially transmitted from the information processing device 100 to the game management server 210, and the game management server 210 executes learning processing using the transmitted data.

Step S551 in FIG. 32 shows a state in which the start screen of the game application b is displayed in the information processing device 100.

Step S552 of FIG. 32 is a diagram showing a live execution state, which is one of the execution states of the game application b in the information processing device 100.

Step S553 in FIG. 33 shows a state in which the live of the game application b has ended.

Step S554 in FIG. 33 shows a state in which detailed information of a character in which the user is interested is displayed.

Step S555 in FIG. 34 shows a state in which the user displays the operation unit UI for data search and operates the search icon to transition to the search screen.

Step S556 in FIG. 34 shows a state in which the user has entered a search word on the search screen to start search processing.

The game management server 210 receives the terminal state information and the game situation information in steps S551 to S556 shown in FIGS. 32 to 34 from the information processing device 100 via a communication network and executes learning processing for estimating the optimal control based on the received data.

The game management server 210 first executes analysis processing of analyzing data received from the information processing device 100.

As a result of analysis, it is analyzed that at the end of the live of the game application b, the user displayed the detailed information of one character, displayed the operation unit UI for data search, operated the search icon to transition to the search screen, entered a search word on the search screen, and started the search processing.

It is analyzed that these state transitions have occurred.

The game management server 210 checks that this state transition has occurred in many information processing devices.

The game management server 210 then estimates the optimal control of the terminal.

An example of a transition observed as a transition of the terminal state or game state is as follows.

End of live in game application b→display detailed character information→display operation unit UI for data search and operate search icon→enter search word on search screen and start search Based on the fact that these state transitions occur in many information processing devices (user terminals), the game management server 210 performs the following optimal control processing when the end of the live of the game application b is confirmed.

Optimal control="display detailed character information, enter search word on search screen, and start search processing."

That is, the game management server 210 registers the following data as learning data.

Input value (terminal state information, game situation information)=end of live in game application b Output value (optimal control information)=display detailed character information, enter search word on search screen, and start search processing Registration data in which such an input value (terminal state information, game situation information) and such an output value (optimal control information) are associated is stored in the storage unit as learning data.

The control unit of the information processing device 100 executes optimal control processing based on this learning data.

Figure 35:
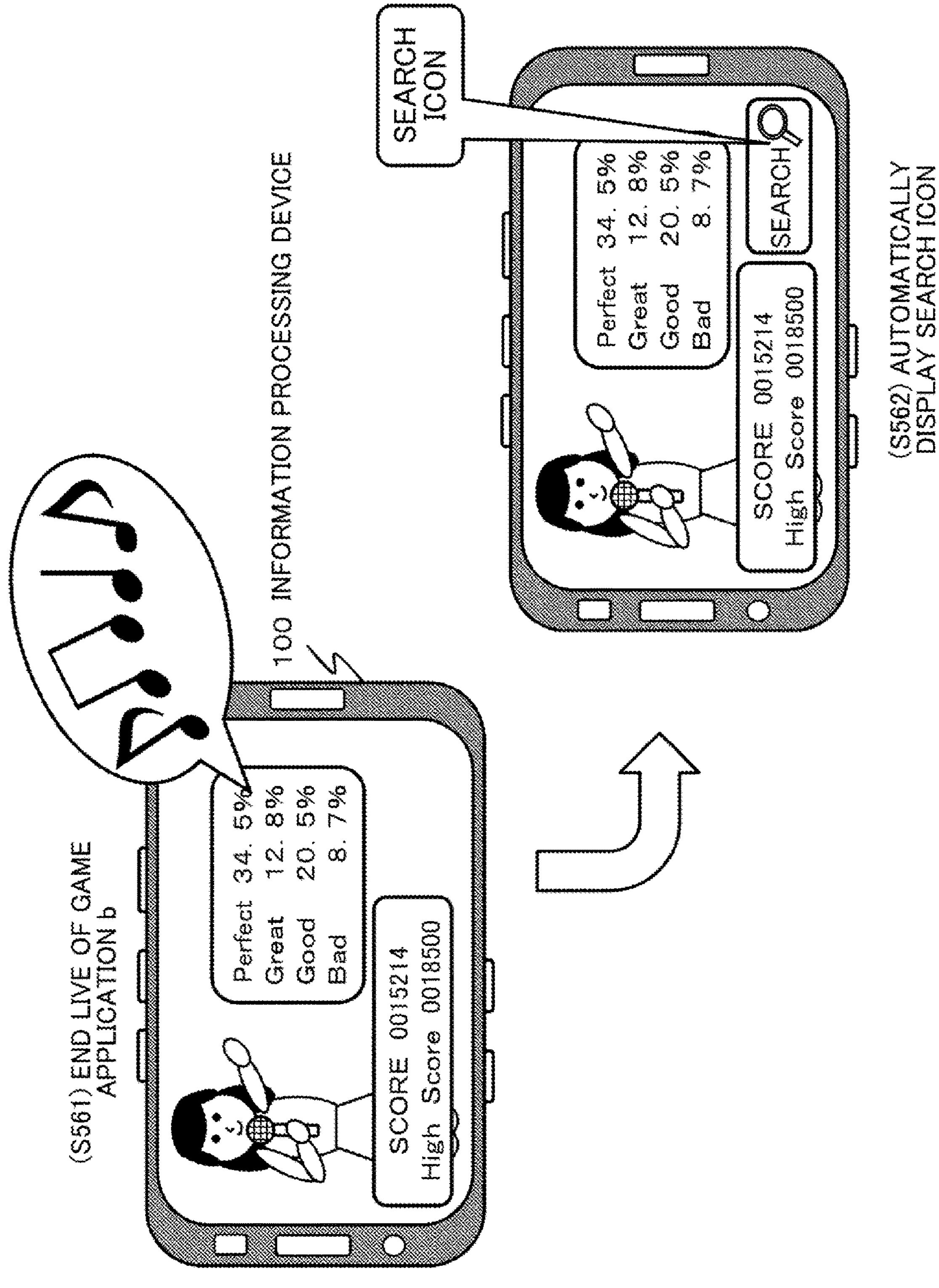
FIG. 35 is a diagram for explaining processing executed by an information processing device based on registered learning data.
Figure 36:
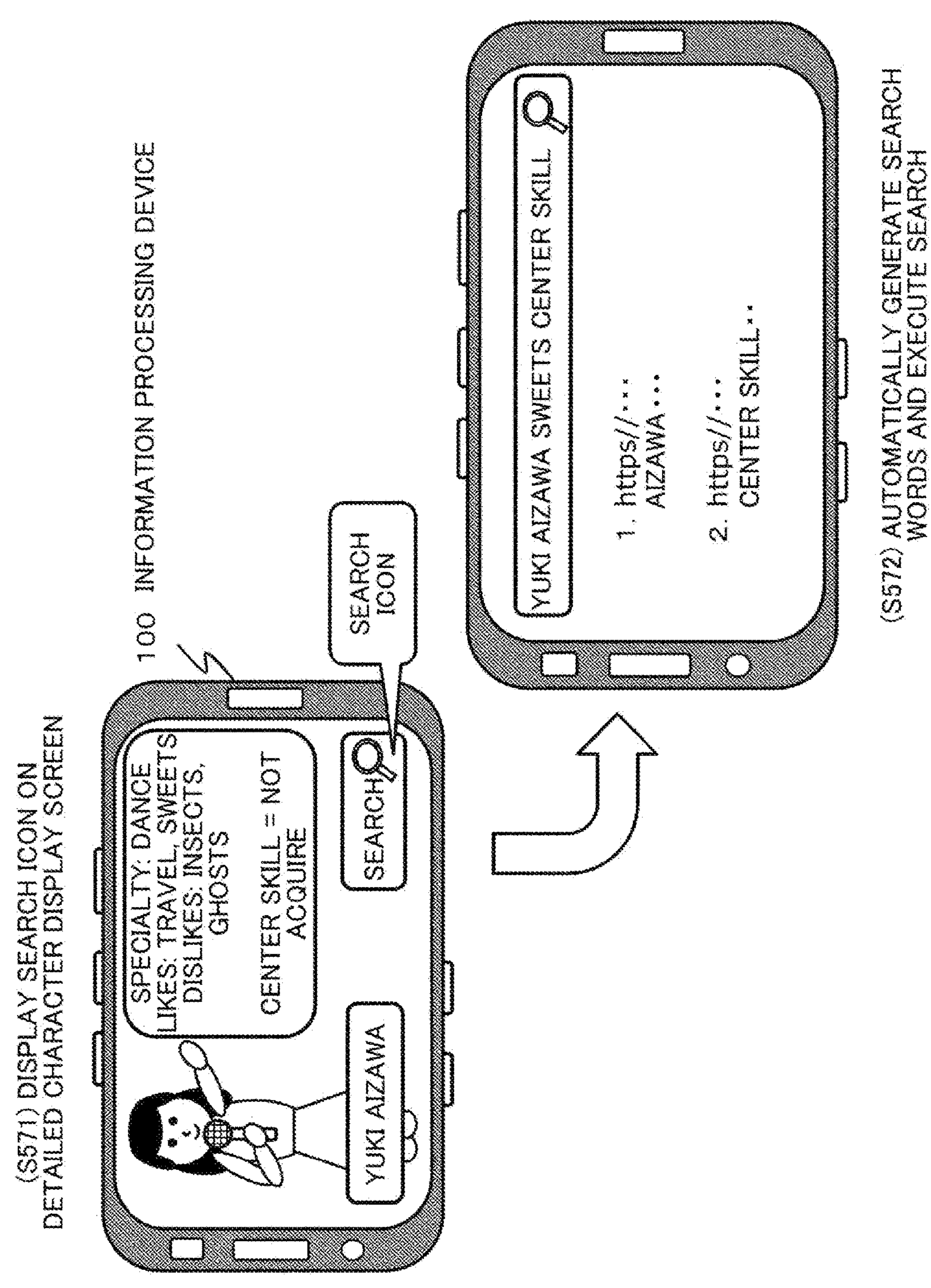
FIG. 36 is a diagram for explaining processing executed by an information processing device based on registered learning data.

FIGS. 35 and 36 are diagrams showing processing executed by the information processing device 100 based on registered learning data.

FIG. 35 (step S561) shows a state in which the live end screen of the game application b is displayed on the information processing device 100.

The control unit 110 of the information processing device 100 detects a state in which the live end screen of the game application b is displayed.

The processing of detecting the live end screen of the game application b is performed based on, for example, the monitoring processing of monitoring the execution state of the game application b by the control unit 110, the screen analysis processing of analyzing the screen displayed on the display unit of the information processing device 100, and the like.

When the control unit 110 of the information processing device 100 detects the state in which the live end screen of the game application b is displayed, the control unit 110 automatically displays the search icon in step S562.

Furthermore, the control unit 110 of the information processing device 100 displays detailed information of the character that the user is interested in, as shown in step S571 of FIG. 36.

Note that the processing of selecting a character that the user is interested in is executed using learning data for each user generated by learning processing that has been executed in advance, for example. Alternatively, the line of sight of the user during live execution of the game application b may be detected, and processing of selecting and displaying the character with the highest degree of user attention may be performed.

Next, as shown in step S572 in FIG. 36, the control unit 110 of the information processing device 100 automatically inputs a search word on the search screen to start search processing.

For example, the control unit 110 of the information processing device 100 selects a search word from the detailed character information displayed in step S571 of FIG. 36, and executes search processing using the selected search word. For example, the search word includes "Aizawa Yuki" which is the character name, "sweets" which is one of the items displayed on the screen, and the word "center skill" for examining the character's ability to be acquired by the character in the future.

Even if the information is not displayed as characters on the game screen, information obtained by analyzing images on the game screen may be used as search words.

Alternatively, words acquired in past learning processing, that is, search words used by various users in searches executed in the past may be registered as learning data, and search processing may be performed by setting these registered words.

By performing these kinds of processing, the users are freed from troublesome operations and processing such as the processing for determining search words and the word input processing.

4. Learning Processing Sequence and Execution Sequence of Optimal Control Processing That Applies Learning Data Next, the learning processing sequence and the execution sequence of the optimal control processing that applies learning data will be described.

Figure 37:
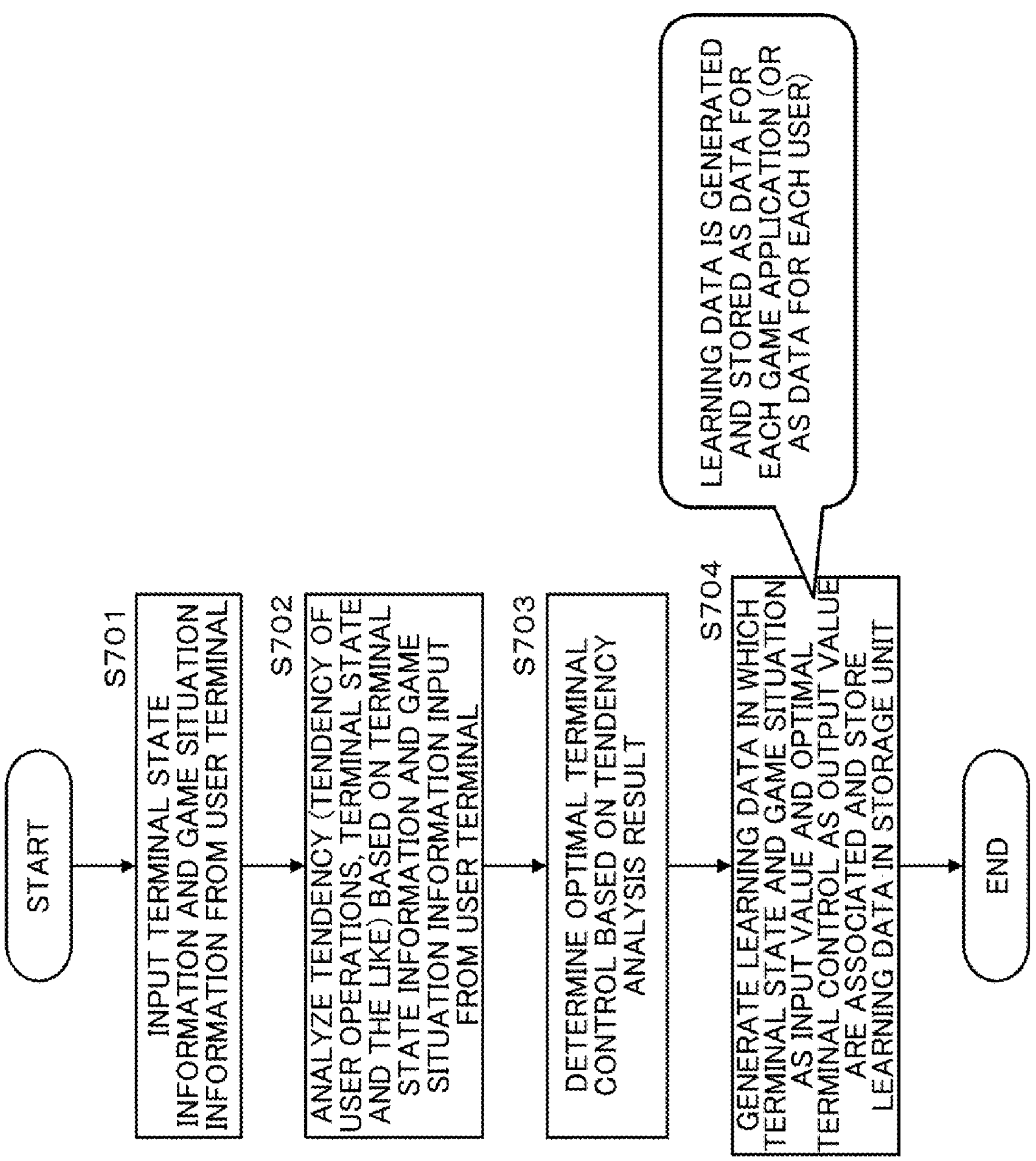
FIG. 37 is a diagram showing a flowchart for explaining the processing sequence of learning processing.

FIG. 37 is a flowchart for explaining the sequence of learning processing.

As described above with reference to FIG. 9 and other figures, the game management server 210 executes learning (machine learning) processing using the terminal state information and the game situation information received from many information processing devices 100, and generates and stores learning data 250 in the storage unit.

The learning data 250 is learning data for obtaining optimal control according to the terminal state and the game situation during execution of the game application in the information processing device 100.

That is, the learning data is learning data in which the input is the terminal state and the game situation of the information processing device 100 and the output is the optimal control in the information processing device 100.

The flowchart shown in FIG. 37 is a flowchart for explaining the sequence of this learning processing.

The processing according to the flow shown in FIG. 37 can be executed by a control unit (data processing unit) configured by a CPU or the like having a program execution function of the game management server 210 according to a program stored in a storage unit.

Hereinafter, processing of each step of the flow shown in FIG. 37 will be described in order.

(Step S701)

First, in step S701, the game management server 210 receives the terminal state information and the game situation information from the information processing device 100, which is a user terminal.

The game management server 210 receives the terminal state information and the game situation information from many different information processing devices 100.

(Step S702)

Next, in step S702, the game management server 210 analyzes tendencies (tendencies of user operations, terminal states, and the like) based on the terminal state information and game state information input from many user terminals (information processing devices 100).

(Step S703)

Next, in step S703, the game management server 210 determines optimal control to be executed in the user terminal (information processing device 100) based on the tendency analysis result in step S702.

(Step S704)

Next, in step S704, the game management server 210 generates learning data in which at least one of the terminal state and the game situation being used as an input value and optimal control of the user terminal (information processing device 100) being used as an output value are associated and stores the same in the storage unit.

The game management server 210 generates learning data according to these kinds of processing sequences.

Note that, as described above, the learning data is generated as learning data for each game application. A user ID or a terminal ID (information processing device ID) may be received from the user terminal (information processing device 100), and learning data may be generated for each user or for each terminal.

The processing described with reference to FIG. 37 is the processing of generating and storing learning data based on the learning processing executed in the game management server 210. However, as described above, the learning data may be generated independently by the information processing device 100 rather than the game management server 210 and stored in the storage unit within the information processing device 100.

Next, a sequence of processing using learning data executed by the information processing device 100 will be described with reference to the flowchart shown in FIG. 38.

Figure 38:
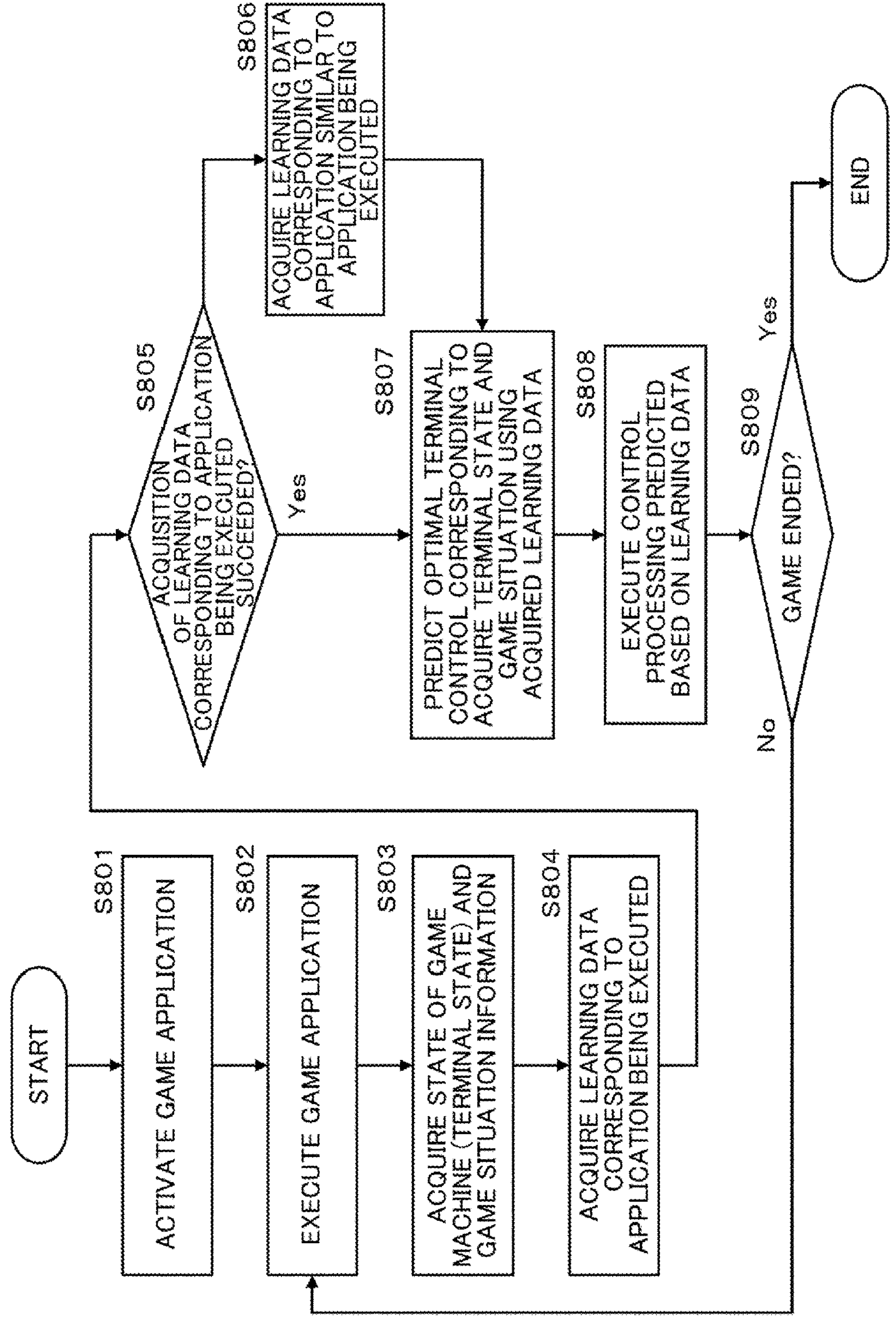
FIG. 38 is a diagram showing a flowchart for explaining an optimal control execution processing sequence using learning data.

Note that the basic sequence of processing using learning data executed by the information processing device 100 has been described above with reference to the flow shown in FIG. 14, but the flow shown in FIG. 38 is a squeegee that takes the processing when the learning data corresponding to the application is not generated into consideration.

Note that the processing according to the flow shown in FIG. 38 can be executed by a control unit (data processing unit) 110 configured by a CPU or the like having a program execution function of the information processing device 100 according to a program stored in a storage unit.

Hereinafter, processing of each step of the flow shown in FIG. 38 will be described in order.

(Step S801)

First, a game application is activated in the information processing device 100. For example, the control unit 110 of the information processing device 100 performs processing of activating the game application selected by the user.

(Step S802)

Next, in step S802, the control unit 110 of the information processing device 100 executes the game application activated in step S801.

For example, a car racing game application a, a game application b which is a live application, or the like is executed.

(Step S803)

Next, in step S803, the control unit 110 of the information processing device 100 acquires the terminal state, which is the state of the information processing device (game machine), and the game situation.

(Step S804)

Next, in step S804, the control unit 110 of the information processing device 100 determines optimal control for the terminal corresponding to the acquired terminal state and the game situation using the learning data generated in advance.

(Step S805)

Next, in step S805, the control unit 110 of the information processing device 100 determines whether acquisition of learning data corresponding to the application being executed has succeeded.

In the case of an existing game application that has already been performed by many users, there is a high possibility that learning data has been generated and the acquisition of learning data will succeed. In the case of a new application that has not been performed by many users, there is a high possibility that learning data has not been generated. In this case, acquisition of learning data fails.

If it is determined in step S805 that acquisition of learning data corresponding to the application being executed has succeeded, the processing proceeds to step S807. On the other hand, if it is determined in step S805 that acquisition of learning data corresponding to the application being executed has failed, the processing proceeds to step S806.

(Step S806)

If it is determined in step S805 that acquisition of learning data corresponding to the application being executed has failed, the processing proceeds to step S806 to execute the following processing.

In this case, the information processing device 100 acquires learning data corresponding to an application similar to the application being executed in step S806.

In addition, as the similar application selection processing, for example, processing of selecting an application having a similar game category is performed. For example, games of the same genre, such as role-playing, fighting, racing, and puzzle games, or games with the same series title are applied as similarity determination criteria to determine similar game applications, and the learning data of the game application determined to match is acquired.

However, since the genre of each game may be arbitrarily determined, the user's operation tendency with respect to a new application may be detected, and applications with similar operation tendencies may be estimated as similar games.

(Step S807)

If it is determined in step S805 that acquisition of learning data corresponding to the application being executed has succeeded, or if it is determined in step S805 that acquisition of learning data corresponding to the application being executed has failed, and the learning data of a similar application is acquired in step S806, the processing proceeds to step S807 after these kinds of processing are performed.

In step S807, the control unit 110 of the information processing device 100 determines optimal control for the terminal based on the acquired learning data.

(Step S808)

Next, in step S808, the control unit 110 of the information processing device 100 executes optimal terminal control determined based on the learning data.

(Step S809)

Next, in step S809, the control unit 110 of the information processing device 100 determines whether the game has ended.

If the game has not ended, the processing returns to step S802 to continue executing the game application.

On the other hand, when the game has ended, the processing ends.

5. Example of Optimal Control Processing of Information Processing Device When Game Application is Not Executed Next, an example of the optimal control processing of the information processing device when a game application is not executed will be described.

The above-described embodiment is an example of processing for determining and executing optimal control for the information processing device 100 executing a game application using learning data.

However, the processing of determining and executing the optimal control for the information processing device 100 using learning data can be performed even when the game application is not being executed.

For example, in processing such as image capturing processing using a camera application of the information processing device 100 such as a smartphone, still image and video playback processing using an image playback application, music playback processing using a music playback application, it is possible to generate learning data corresponding to each application, and determine and execute optimal control using the generated learning data.

Furthermore, learning data corresponding to each of various kinds of processing executed in the information processing device 100 such as a smartphone, such as website browsing processing, telephone, e-mail, manner mode setting processing, and network setting processing can be generated, and the optimal control can be determined and executed using the generated learning data.

Figure 39:
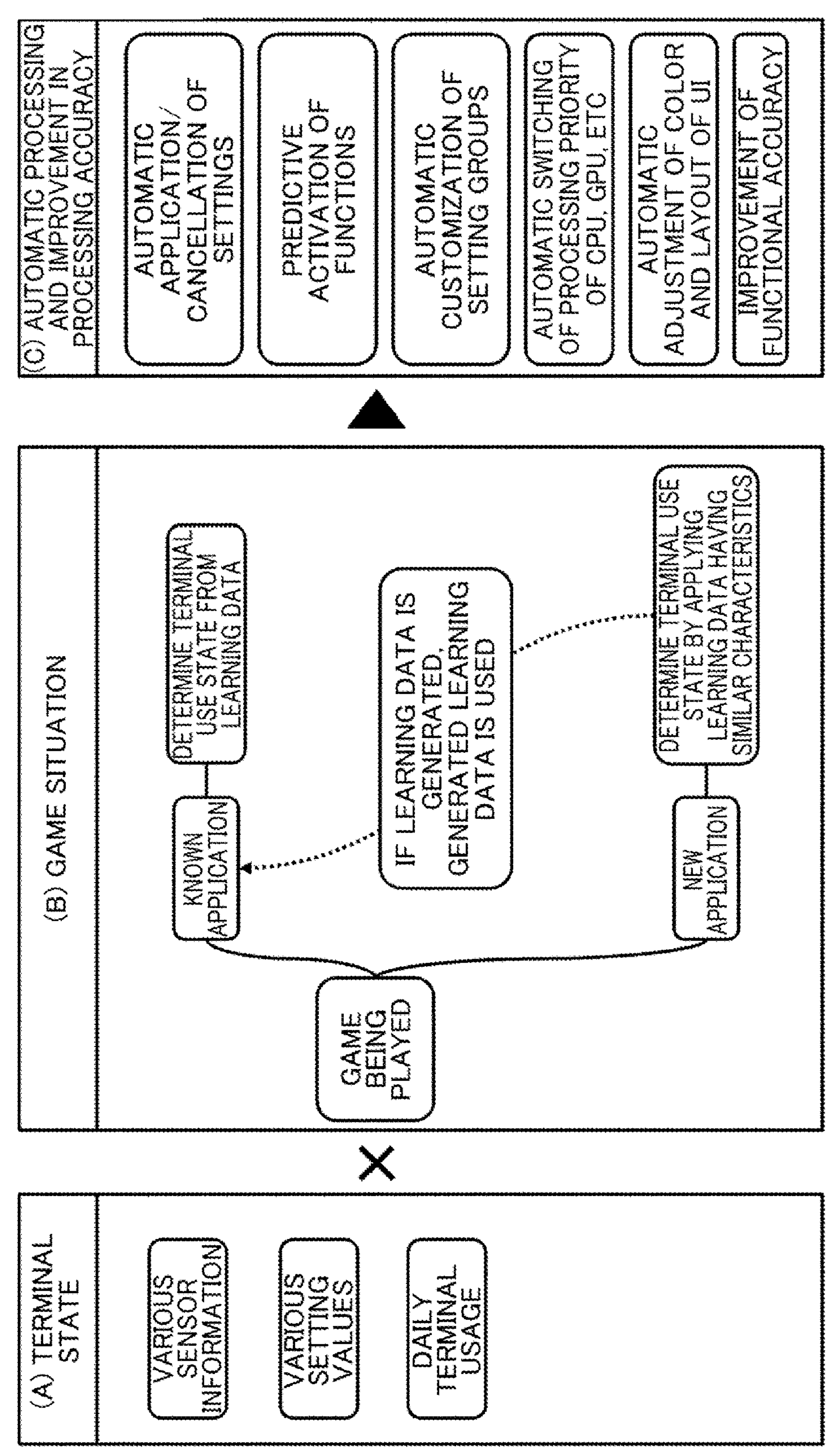
FIG. 39 is a diagram for explaining the data configuration and the like used for automatic processing according to various kinds of processing executed in an information processing device such as a smartphone and for improving processing accuracy.

FIG. 39 is a diagram for explaining a data configuration and the like used for automatic processing according to various kinds of processing executed in the information processing device 100 such as a smartphone and for improving processing accuracy.

The state of the information processing device 100, which is a user terminal, includes information on various sensors provided in the information processing device 100, various setting values, information on how the user uses the information processing device 100 on a daily basis, and the like.

For example, the server acquires such information for many users from the information processing device 100, which is a user terminal.

By using the information obtained from the information processing device 100 and the learning data described above, it is possible to estimate and determine the current game situation.

Then, it is possible to execute automatic processing according to the game situation and improve the processing accuracy.

Specifically, as shown in the figure, automatic application/cancellation of settings, predictive activation of functions, customization of setting groups, automatic switching of processing priority of CPU/GPU and the like, automatic adjustment of UI color and layout, improvement of functional accuracy, and the like can be realized.

Automatic application/cancellation of settings is processing of automatically applying or canceling specific settings in a specific device situation.

Predictive activation of functions is processing of predicting and executing an operation function performed by a user in a scene in which the user uses a certain device.

Customization of setting groups is, for example, customization of a plurality of functions applied to the collective restriction settings described above.

For example, it is a setting of which functions are to be set collectively.

Automatic switching of processing priority of CPU/GPU and the like is processing of automatically switching the processing priority according to the device situation. Automatic adjustment of the UI color and layout of the operation unit UI is processing of automatically adjusting the color and layout of the operation unit UI according to the device situation to provide a user-friendly UI.

For example, even if the activation operation position of the operation unit UI is not set by the user, it is automatically set to an appropriate position.

Improvement in functional accuracy is processing that makes it easier for the user to obtain desired results by setting various functions of the information processing device according to the device state.

By performing such processing, for example, it is possible to provide a more comfortable game environment for the user who uses the information processing device 100.

In addition to the configuration in which learning is performed by the server, a configuration in which learning is performed within the information processing device 100 that is the user terminal of each user may be used.

6. Configuration Example of Information Processing Device

Next, a configuration example of the information processing device will be described.

Figure 40:
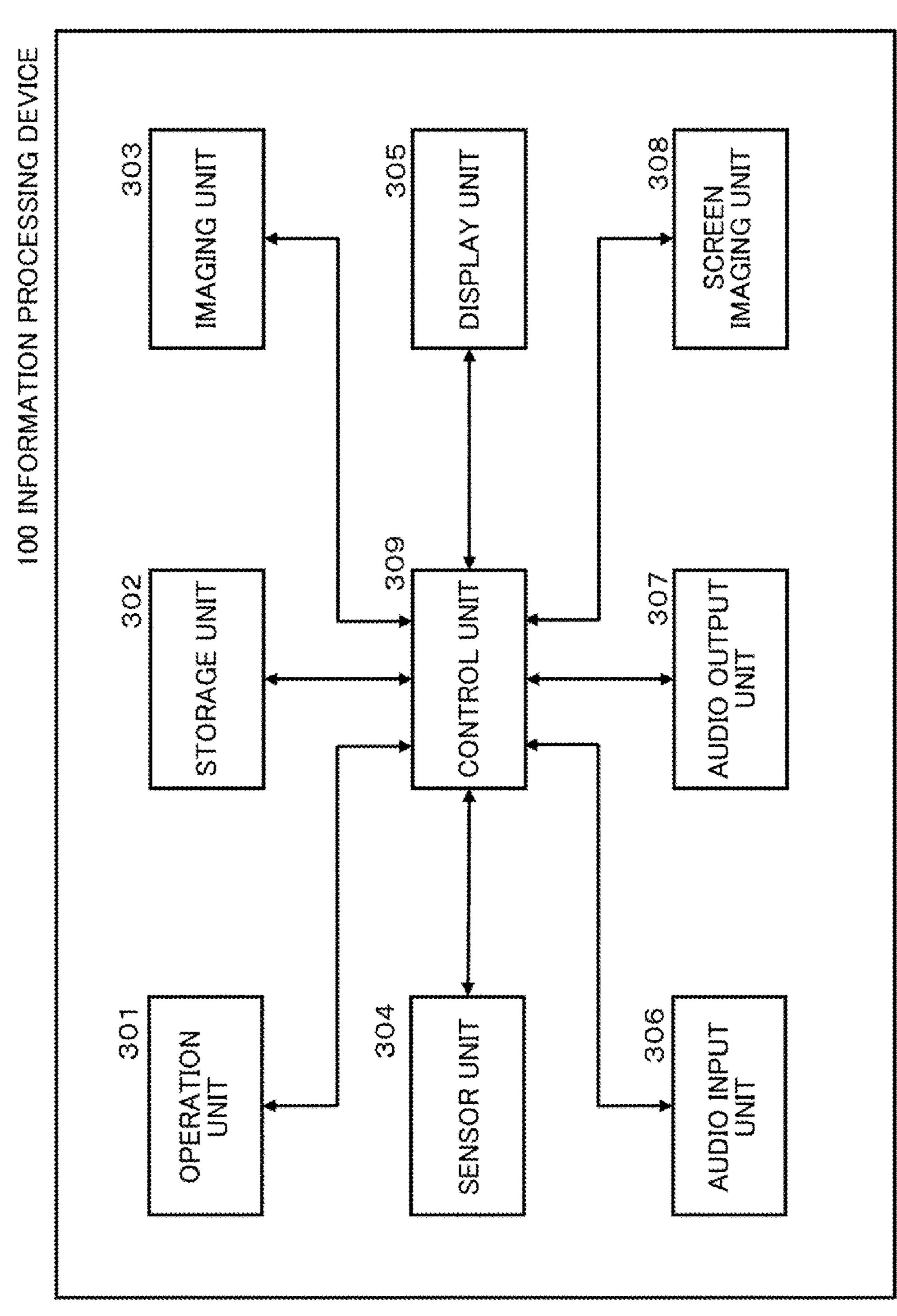
FIG. 40 is a diagram for explaining a configuration example of an information processing device such as a smartphone.

FIG. 40 is a block diagram showing the functional configuration of the information processing device 100 of the present disclosure, that is, the information processing device 100 that is a user terminal such as a smartphone.

As shown in FIG. 40, the information processing device 100 includes an operation unit 301, a storage unit 302, an imaging unit 303, a sensor unit 304, a display unit 305, an audio input unit 306, an audio output unit 307, a screen imaging unit 308, and a control unit 309.

The operation unit 301 detects various user operations such as device operations for applications.

The device operations described above include, for example, touch operations and insertion of an earphone terminal into the information processing device 100.

Here, the touch operation refers to various contact operations on the display unit 305, such as tapping, double-tapping, swiping, and pinching.

Further, the touch operation includes an action of bringing an object such as a finger close to the display unit 305.

For this purpose, the operation unit 301 includes, for example, a touch panel, buttons, a keyboard, a mouse, a proximity sensor, and the like. The operation unit 301 also inputs information related to the detected user's operation to the control unit 309.

The storage unit 302 is a storage area for temporarily or permanently storing various programs and data.

For example, the storage unit 302 stores programs and data for the information processing device 100 to execute various functions. As a specific example, the storage unit 302 stores programs for executing various applications, management data for managing various settings, and the like. However, the above is just an example, and the type of data stored in the storage unit 302 is not particularly limited.

The imaging unit 303 images, for example, the face of the user who operates the information processing device 100 under the control of the control unit 309.

The imaging unit 303 includes an imaging element. A smartphone, which is an example of the information processing device 100, includes a front camera for photographing a user's face on the display unit 305 side, and a main camera for photographing scenery on the back side of the display unit 305. In the present embodiment, as an example, imaging with the front camera is controlled.

The sensor unit 304 has a function of collecting sensor information related to user behavior using various sensors. The sensor unit 304 includes, for example, an acceleration sensor, a gyro sensor, a geomagnetic sensor, a vibration sensor, a GNSS (Global Navigation Satellite System) signal receiver, and the like.

The sensor unit 304 detects, for example, that the user holds the information processing device 100 sideways using a gyro sensor, and inputs the detected information to the control unit 309.

The display unit 305 displays various pieces of visual information under the control of the control unit 309. The display unit 305 may display, for example, images and characters related to the application.

The display unit 305 may include various display devices such as a liquid crystal display (LCD) device and an organic light emitting diode (OLED) display device.

The display unit 305 can also superimpose and display the UI of another application on a layer higher than the screen of the application being displayed.

The audio input unit 306 collects voices uttered by the user based on the control of the control unit 309. The audio input unit 306 includes a microphone and the like.

The audio output unit 307 outputs various sounds.

The audio output unit 307 according to the present embodiment outputs voices and sounds according to the state of the application under the control of the control unit 309, for example.

The audio output unit 307 has a speaker and an amplifier.

Under the control of the control unit 309, the screen imaging unit 308 takes screenshots (SS) or videos of the screen displayed on the display unit 305, and stores them in the storage unit 302.

The control unit 309 controls each component included in the information processing device 100. The control unit 309 can control applications and restrict various functions.

Although the functional configuration example of the information processing device 100 has been described so far, the functional configuration described above with reference to FIG. 40 is merely an example, and the functional configuration of information processing device 100 according to the present embodiment is not limited to this example.

For example, the information processing device 100 may not include all of the configurations shown in FIG. 40, and each configuration such as the audio input unit 306 may be included in a device different from the information processing device 100.

The functional configuration of the information processing device 100 according to the present embodiment can be flexibly modified according to specifications and operations.

In addition, the functions of each component may be realized when an arithmetic unit such as a CPU (Central Processing Unit) reads a control program from a storage medium such as a ROM (Read Only Memory) or RAM (Random Access Memory) that stores the control program that describes the processing procedure for realizing the functions and analyze and executes the program.

Therefore, the configuration to be used can be appropriately changed according to the technical level when the present embodiment is implemented.

Figure 41:
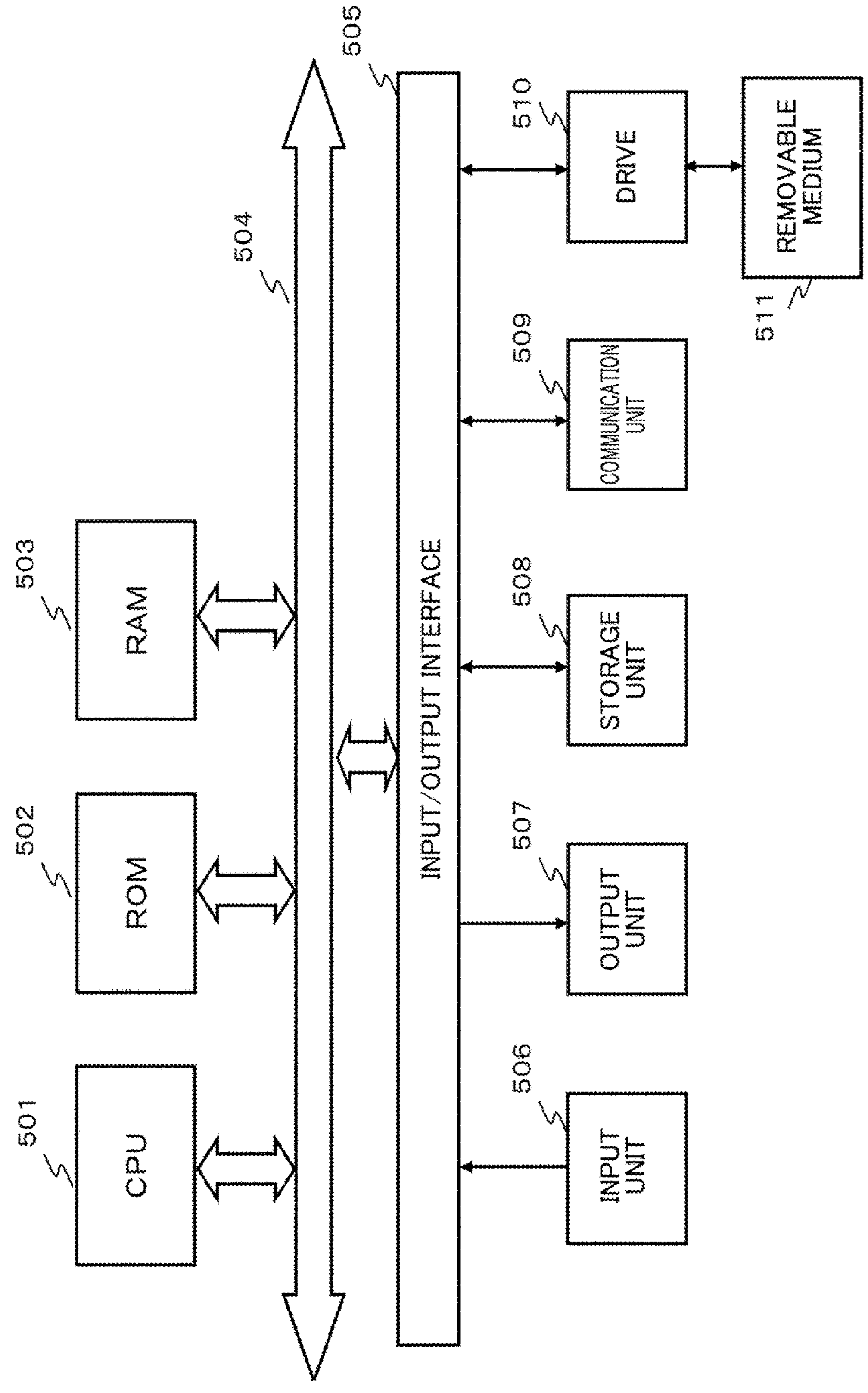
FIG. 41 is a diagram showing a hardware configuration example of an information processing device such as a smartphone or a device that can be used as a server.

7. Hardware Configuration Example of Information Processing Device and Server Next, a hardware configuration example of a device that can be used as the information processing device 100 or the game management server 210 will be described with reference to FIG. 41.

A CPU (Central Processing Unit) 501 functions as a control unit and a data processing unit that execute various kinds of processing according to programs stored in a ROM (Read Only Memory) 502 or a storage unit 508. For example, the processing according to the sequence described in the above embodiment is executed. A RAM (Random Access Memory) 503 stores programs and data executed by the CPU 501. The CPU 501, the ROM 502, and the RAM 503 are connected to each other by a bus 504.

The CPU 501 is connected to an input/output interface 505 via the bus 504. The input/output interface 505 is connected to an input unit 506 including various switches, a keyboard, a mouse, a microphone, and the like, and an output unit 507 for outputting data to a display unit, a speaker, and the like. The CPU 501 executes various kinds of processing in response to a command input from the input unit 506, and outputs the processing results to, for example, the output unit 507.

A storage unit 508 connected to the input/output interface 505 includes, for example, a hard disk, and stores programs executed by the CPU 501 and various pieces of data. A communication unit 509 functions as a transmitting/receiving unit for Wi-Fi communication, Bluetooth (registered trademark) (BT) communication, and other data communication via networks such as the Internet and local area networks, and communicates with external devices.

A drive 510 connected to the input/output interface 505 drives a removable medium 511 such as a magnetic disk, an optical disc, a magneto-optical disc, or a semiconductor memory such as a memory card, and records or reads data.

8. Summary of Configuration of Present Disclosure

Embodiments of the present disclosure have been described above in detail with reference to a specific embodiment. However, it will be apparent to those skilled in the art that modification and substation of the embodiments can be made without departing from the gist of the technology disclosed in the present disclosure. That is, the present invention has been disclosed according to an illustrative form, but the present disclosure should not be restrictively construed. The gist of the present disclosure should be determined in consideration of the claims.

The technology disclosed in the present specification can have the following configuration.

(1) An information processing device including: a control unit that controls the information processing device, wherein the control unit determines optimal control processing according to at least one of a processing state of an application being executed in the information processing device and a device state using learning data generated in advance, and executes the determined optimal control processing.

(2) The information processing device according to (1), wherein the learning data is learning data for each application, and the control unit determines optimal control processing by referring to learning data of an application that is the same as or similar to the application being executed in the information processing device, and executes the determined optimal control processing.

(3) The information processing device according to (1) or (2), wherein the control unit acquires at least one of a game situation and a device state during execution of a game application in the information processing device, selects learning data in which data closest to the acquired game situation or device state is registered, and executes optimal control processing registered in the selected data.

(4) The information processing device according to any one of (1) to (3), wherein when it is detected that a specific screen is displayed during execution of a game application in the information processing device, the control unit determines and executes optimal control processing according to the learning data.

(5) The information processing device according to (4), wherein the optimal control processing determined according to the learning data is screenshot processing, and the control unit executes screenshot when it is detected that a specific screen is displayed during execution of a game application in the information processing device.

(6) The information processing device according to any one of (1) to (5), wherein the control unit determines and executes processing of disabling a specific function of the information processing device as the optimal control processing determined according to the learning data.

(7) The information processing device according to (6), wherein the processing of disabling a specific function of the information processing device is processing of disabling a camera activation switch.

(8) The information processing device according to (6), wherein the processing of disabling the specific function of the information processing device is processing of setting a touch insensitive body.

(9) The information processing device according to any one of (1) to (8), wherein the control unit determines and executes processing of setting a specific function of the information processing device as the optimal control processing determined according to the learning data.

(10) The information processing device according to (9), wherein the processing of setting the specific function of the information processing device is processing of setting functions including processing of non-displaying notifications and incoming calls for the information processing device.

(11) The information processing device according to any one of (1) to (10), wherein the control unit determines and executes processing of taking a screenshot in the information processing device and uploading the taken image to an SNS as the optimal control processing determined according to the learning data.

(12) The information processing device according to any one of (1) to (11), wherein the control unit determines a display mode of a UI to be displayed on the information processing device and displays the UI according to the determined display mode as the optimal control processing determined according to the learning data.

(13) The information processing device according to any one of (1) to (12), wherein the control unit determines and executes search processing as the optimal control processing determined according to the learning data.

(14) The information processing device according to any one of (1) to (13), wherein the control unit transmits at least one of the processing state of an application being executed in the information processing device and the device state to a server that generates learning data.

(15) The information processing device according to any one of (1) to (14), wherein the control unit generates learning data using at least one of the processing state of an application being executed in the information processing device and the device state.

(16) An information processing system including a user terminal for executing an application and a server for providing learning data to the user terminal, wherein the user terminal determines optimal control processing according to at least one of a processing state of an application being executed in the user terminal and a device state using learning data stored in the server, and executes the determined optimal control processing.

(17) The information processing system according to (16), wherein the user terminal transmits at least one of the processing state of the application being executed in the user terminal and the device state to the server, and the server executes learning processing using at least one of the processing state of the application and the device state received from the user terminal to execute learning data generation processing and update processing.

(18) An information processing method executed in an information processing device, the method including:

allowing a control unit to determine optimal control processing according to at least one of a processing state of an application being executed in the information processing device and a device state using learning data generated in advance, and execute the determined optimal control processing.

(19) An information processing method executed in an information processing system including a user terminal for executing an application and a server for providing learning data to the user terminal, the method including:

allowing the user terminal to transmit at least one of a processing state of an application being executed in the user terminal and a device state to the server;

allowing the server to execute learning processing using at least one of the processing state of the application and the device state received from the user terminal to execute learning data generation processing and update processing; and allowing the user terminal to determine optimal control processing according to at least one of the processing state of the application being executed in the user terminal and the device state using learning data stored in the server, and execute the determined optimal control processing.

(20) A program for causing an information processing device to execute information processing including:

allowing a control unit to determine optimal control processing according to at least one of a processing state of an application being executed in the information processing device and a device state using learning data generated in advance, and execute the determined optimal control processing.

The series of processing described in this specification can be executed by hardware, software, or a composite configuration of both. If the series of processing is to be executed by software, the series of processing can be executed by installing a program recording the processing sequence into a memory in a computer embedded in dedicated hardware, or by installing the program into a general-purpose computer capable of executing various kinds of processing. For example, the program can be pre-recorded on a recording medium. Rather than being installed into a computer from a recording medium, the program can be received via a network such as a local area network (LAN) or the Internet, and installed into a built-in recording medium such as a hard disk.

The various processes described in this specification can be performed consecutively in the described order or may be performed in parallel or individually depending on the processing capability of the device performing the processes or as needed. In the present specification, the system is a logical set of configurations of a plurality of devices, and the devices having each configuration are not limited to those in the same housing.

INDUSTRIAL APPLICABILITY

As described above, according to the configuration of the embodiment of the present disclosure, a device and a method for determining the optimal control corresponding to the processing state of the application being executed in the information processing device and the device state based on the learning data and executing the determined processing are realized.

Specifically, for example, a control unit that controls the information processing device uses learning data to determine optimal control processing according to the processing state of the application being executed and the device state, and executes the determined processing. The learning data is learning data for each application, and the control unit determines optimal control by referring to the learning data of an application that is the same as or similar to the application being executed in the information processing device, and executes the determined optimal control processing. For example, screenshots and search processing are automatically executed.

By these kinds of processing, a device and a method for determining optimal control according to the processing state of an application being executed in an information processing device and the device state based on learning data and executing the determined processing are realized.

REFERENCE SIGNS LIST

10 Information processing device
20 Operation UI
21 Boost operation icon
22 Back key icon
23 Search icon
100 Information processing device
110 Control unit (data processing unit)
120 Learning data
171 Camera activation switch
172 Back key
173 Boost key
180 UI
181 Transparent UI
200 Information processing system
210 Game management server
250 Learning data
301 Operation unit
302 Storage unit
303 Imaging unit
304 Sensor unit
305 Display unit
306 Audio input unit
307 Audio output unit
308 Screen imaging unit
309 Control unit
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing device, comprising:
a control unit configured to:
detect execution of a first application;
acquire a terminal state of the information processing device and a game situation during the execution of the first application in the information processing device;
select first learning data, from learning data, that includes registration data that matches the acquired terminal state and the game situation, wherein
the learning data is generated in advance, and
the selected first learning data is associated with a control processing; and
execute the control processing associated with the selected first learning data.

2. The information processing device according to claim 1, wherein
the learning data is learning data for each application of a plurality of applications,
the plurality of applications includes the first application and a second application, and
the control unit is further configured to determine, in a case where the first learning data corresponding to the first application is unavailable, the control processing based on reference to second learning data, from the learning data, of the second application that is one of the same as or similar to the first application being executed in the information processing device.

3. The information processing device according to claim 1, wherein the first application is a game application.

4. The information processing device according to claim 3, wherein the control unit is further configured to:
detect display of a specific screen during the execution of the game application in the information processing device; and
execute the control processing based on the selected first learning data and the detection of the display of the specific screen.

5. The information processing device according to claim 4, wherein
the control processing is screenshot processing, and
the control unit is further configured to execute the screenshot processing based on the detection of the display of the specific screen during the execution of the game application in the information processing device.

6. The information processing device according to claim 1, wherein the control unit is further configured to execute a disabling processing, to disable a specific function of the information processing device, as the control processing associated with the first learning data.

7. The information processing device according to claim 6, wherein the execution of the disabling processing is to disable a camera activation switch.

8. The information processing device according to claim 6, wherein the execution of the disabling processing to set a touch insensitive body.

9. The information processing device according to claim 1, wherein the control unit is further configured to execute a setting processing, to set a specific function of the information processing device, as the optimal control processing associated with the selected first learning data.

10. The information processing device according to claim 9, wherein the setting processing is a processing to set functions including processing of non-displaying notifications and incoming calls for the information processing device.

11. The information processing device according to claim 1, wherein the control unit is further configured to execute each of a processing to take a screenshot in the information processing device and a processing to upload the taken screenshot to an SNS, as the control processing.

12. The information processing device according to claim 1, wherein the control unit is further configured to:

determine a display mode of a user interface (UI) to display on the information processing device; and control display of the UI based on the determined display mode, as the control processing.

13. The information processing device according to claim 1, wherein the control unit is further configured to execute a search processing as the control processing.

14. The information processing device according to claim 1, wherein the control unit is further configured to transmit at least one of a processing state of the first application being executed in the information processing device and the terminal state to a server that generates the learning data.

15. The information processing device according to claim 1, wherein the control unit is further configured to generate second learning data based on at least one of a processing state of the first application being executed in the information processing device and the terminal state.

16. An information processing system, comprising:

a user terminal configured to execute an application; and a server configured to output learning data to the user terminal, wherein the user terminal is further configured to:

detect the execution of the application;

acquire a terminal state of the user terminal and a game situation during the execution of the application in the user terminal;

select specific learning data, from the learning data, that includes registration data that matches the acquired terminal state and the game situation, wherein the selected specific learning data is associated with a control processing; and execute the control processing associated with the selected specific learning data.

17. The information processing system according to claim 16, wherein the user terminal is further configured to transmit at least one of a processing state of the application being executed in the user terminal and the terminal state to the server, and the server is further configured to execute learning processing based on the at least one of the processing state of the application and the terminal state received from the user terminal to execute learning data generation processing and update processing.

18. An information processing method, comprising:

in an information processing device:

detecting execution of an application;

acquiring a terminal state of the information processing device and a game situation during the execution of the application in the information processing device;

selecting specific learning data, from learning data, that includes registration data that matches the acquired terminal state and the game situation, wherein the learning data is generated in advance, and the selected specific learning data is associated with a control processing; and executing the control processing associated with the selected specific learning data.

19. An information processing method, comprising:

in an information processing system that includes a user terminal for executing an application, and a server for outputting learning data to the user terminal:

transmitting, by the user terminal, a game situation of the application being executed in the user terminal and a terminal state of the user terminal to the server;

executing, by the server, learning processing based on the game situation of the application and the terminal state received from the user terminal to execute learning data generation processing and update processing;

selecting, by the user terminal, specific learning data, from the learning data, that includes registration data that matches the terminal state and the game situation, wherein the selected specific learning data is associated with a control processing; and executing, by the user terminal, the control processing associated with the selected specific learning data.

20. A non-transitory computer-readable medium having stored thereon computer-executable instructions that, when executed by a computer of an information processing device, cause the computer to execute operations, the operations comprising:

detecting execution of an application;

acquiring a terminal state of the information processing device and a game situation during the execution of the application in the information processing device;

selecting specific learning data, from learning data, that includes registration data that matches the acquired terminal state and the game situation, wherein the learning data is generated in advance, and the selected specific learning data is associated with a control processing; and executing the control processing associated with the selected first learning data.

* * * * *